US012749825B2

(12) United States Patent
Watanabe et al.

(10) Patent No.: US 12,749,825 B2
(45) Date of Patent: Sep. 29, 2026

(54) ARRAY ANTENNA DEVICE

(71) Applicant: Mitsubishi Electric Corporation, Tokyo (JP)

(72) Inventors: Hikaru Watanabe, Tokyo (JP); Toru Takahashi, Tokyo (JP); Kazunari Kihira, Tokyo (JP); Toru Fukasawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 747 days.

(21) Appl. No.: 18/297,888

(22) Filed: Apr. 10, 2023

(65) Prior Publication Data

US 2023/0246346 A1 Aug. 3, 2023

Related U.S. Application Data

(63) Continuation of application No. PCT/JP2021/044175, filed on Dec. 2, 2021.

(30) Foreign Application Priority Data

Dec. 10, 2020 (WO) .................. PCT/JP2020/045946

(51) Int. Cl.

| | |
|---|---|
| ***H01Q 1/48*** | (2006.01) |
| ***H01Q 21/06*** | (2006.01) |
| ***H01Q 21/24*** | (2006.01) |

(52) U.S. Cl.

CPC ............ *H01Q 21/061* (2013.01); *H01Q 1/48* (2013.01); *H01Q 21/24* (2013.01)

(58) Field of Classification Search

CPC ........ H01Q 1/48; H01Q 1/523; H01Q 13/085; H01Q 15/14; H01Q 19/30; H01Q 19/104;

(Continued)

(56) References Cited

U.S. PATENT DOCUMENTS

| | | | |
|---|---|---|---|
| 3,594,806 A | 7/1971 | Black | |
| 5,434,581 A * | 7/1995 | Raguenet ............ | H01Q 21/205 343/846 |

(Continued)

FOREIGN PATENT DOCUMENTS

| | | |
|---|---|---|
| GB | 830754 A | 3/1960 |
| JP | 4-121110 U | 10/1992 |

(Continued)

OTHER PUBLICATIONS

Extended European Search Report for European Application No. 21903272.9, dated May 13, 2024.

(Continued)

*Primary Examiner* — Tung X Le

(74) *Attorney, Agent, or Firm* — Birch, Stewart, Kolasch & Birch, LLP

(57) ABSTRACT

An array antenna device includes: a ground plate that is a flat-plate shaped conductor; an element antenna array in which a plurality of tapered slot antennas are linearly arranged on the ground plate along an electric field direction; and a metal plate provided at both ends or one end of an antenna aperture formed in the element antenna array arranged on the ground plate along the electric field direction, the metal plate having a height from the ground plate higher than a height of the tapered slot antenna.

31 Claims, 46 Drawing Sheets

(58) Field of Classification Search
CPC .... H01Q 19/108; H01Q 21/08; H01Q 21/061; H01Q 21/062; H01Q 21/064; H01Q 21/065; H01Q 21/24; H01Q 21/0025
See application file for complete search history.

(56) References Cited

U.S. PATENT DOCUMENTS

| | | | | |
|---|---|---|---|---|
| 5,880,695 | A | 3/1999 | Brown et al. | |
| 6,317,094 | B1 * | 11/2001 | Wu | H01Q 21/0087 343/770 |
| 7,106,268 | B1 * | 9/2006 | Angelucci | H01Q 13/08 343/770 |
| 8,462,071 | B1 * | 6/2013 | Rudish | H01Q 21/062 343/810 |
| 12,027,774 | B2 * | 7/2024 | Ha | H04B 1/40 |
| 12,272,873 | B2 * | 4/2025 | Kähkönen | H01Q 13/085 |
| 2005/0030244 | A1 | 2/2005 | Durham et al. | |
| 2010/0136924 | A1 | 6/2010 | Ito et al. | |
| 2017/0246440 | A1 * | 8/2017 | Kalghatgi | H05H 1/2406 |
| 2017/0331199 | A1 * | 11/2017 | Svensson | H01Q 21/0006 |
| 2018/0166782 | A1 | 6/2018 | Farzaneh et al. | |
| 2020/0052390 | A1 | 2/2020 | Ahmadloo | |
| 2020/0176878 | A1 | 6/2020 | Fraysse et al. | |
| 2020/0411991 | A1 | 12/2020 | Park et al. | |
| 2021/0143536 | A1 * | 5/2021 | Park | H01Q 1/243 |
| 2021/0184344 | A1 * | 6/2021 | Furuhi | H01Q 21/065 |
| 2022/0021421 | A1 * | 1/2022 | Park | H04B 7/0469 |

FOREIGN PATENT DOCUMENTS

| | | | |
|---|---|---|---|
| JP | 9-275317 | A | 10/1997 |
| JP | 10-242745 | A | 9/1998 |
| JP | 2003-152433 | A | 5/2003 |
| JP | 2008-227723 | A | 9/2008 |
| JP | 2010-135907 | A | 6/2010 |
| KR | 10-2134752 | B1 | 7/2020 |
| WO | WO 2020/021594 | A1 | 1/2020 |

OTHER PUBLICATIONS

Partial Supplementary European Search Report for European Application No. 21903272.9, dated Mar. 7, 2024.

International Search Report (PCT/ISA/210) issued in PCT/JP2020/045946, dated Mar. 2, 2021.

International Search Report (PCT/ISA/210) issued in PCT/JP2021/044175, dated Feb. 22, 2022.

* cited by examiner

ARRAY ANTENNA DEVICE

CROSS REFERENCE TO RELATED APPLICATIONS

This application is a continuation of PCT International Application No. PCT/JP2021/044175, filed on Dec. 2, 2021, which claims priority under 35 U.S.C. 119(a) to Patent Application No. PCT/JP2020/045946, filed in Japan on Dec. 10, 2020, all of which are hereby expressly incorporated by reference into the present application.

TECHNICAL FIELD

The present disclosure relates to an array antenna device.

BACKGROUND ART

In an array antenna in which a plurality of element antennas are arranged, it is necessary to densely arrange the plurality of element antennas so that grating lobes are not generated in the visible region when beam scanning is performed. In addition, in an ultrawide-band array antenna that operates in an ultrawide-band frequency band, an antenna aperture having a size at which the antenna operates at a lower limit frequency having the longest wavelength is required in order to achieve impedance matching on the low frequency side of the operating frequency band and obtain good reflection characteristics.

As a conventional ultra-wideband array antenna in which grating lobes are not generated in a visible region and reflection characteristics are improved on a low frequency side of an operating frequency band, for example, a parallel plate-loaded single tapered slot antenna (Hereinafter, it is described as parallel plate loaded STSA.) described in Patent Literature 1 is known.

The parallel plate loaded STSA is an array antenna having a structure in which a tapered conductor plate is sandwiched between parallel plates, and the electrical element antenna width is regarded as about twice the physical element antenna width according to the mirror image theory. Therefore, even if the actual element antenna width is physically small, good reflection characteristics can be achieved on the low frequency side of the operating frequency band.

CITATION LIST

Patent Literature

Patent Literature 1: JP 2008-227723 A

SUMMARY OF INVENTION

Technical Problem

However, the conventional ultra-wide band array antenna has a problem that an actual antenna aperture is smaller than an antenna aperture required to improve the reflection characteristics on the low frequency side of the operating frequency band, and when a difference between the antenna apertures is large, the reflection characteristics on the low frequency side of the operating frequency band are not sufficiently improved even if the electrical element antenna width is considered to be about twice the physical element antenna width.

The present disclosure solves the above problem, and an object thereof is to obtain an array antenna device capable of improving reflection characteristics on a low frequency side of an operating frequency band even when an antenna aperture is small.

Solution to Problem

An array antenna device according to the present disclosure includes: a ground plate that is a flat-plate shaped conductor; an element antenna array in which a plurality of element antennas are linearly arranged on the ground plate along an electric field direction; and a conductor member that is provided at only both ends or only one end of an antenna aperture formed in the element antenna array arranged on the ground plate along the electric field direction, the conductor member having a height from the ground plate higher than a height of the element antenna.

Advantageous Effects of Invention

According to the present disclosure, there is provided a conductor member that is provided at both ends or one end of an antenna aperture along an electric field direction, the antenna aperture being formed in an element antenna array arranged on a ground plate, the conductor member having a height from the ground plate higher than that of an element antenna. Since the mirror image of the element antenna array is formed adjacent to the real image of the element antenna array between the conductor members, and an aperture larger than the actual antenna aperture is virtually formed, impedance matching can be achieved on the low frequency side of the operating frequency band. As a result, the array antenna device according to the present disclosure can improve the reflection characteristics on the low frequency side of the operating frequency band even if the antenna aperture is small.

DESCRIPTION OF EMBODIMENTS

First Embodiment

Figure 1:
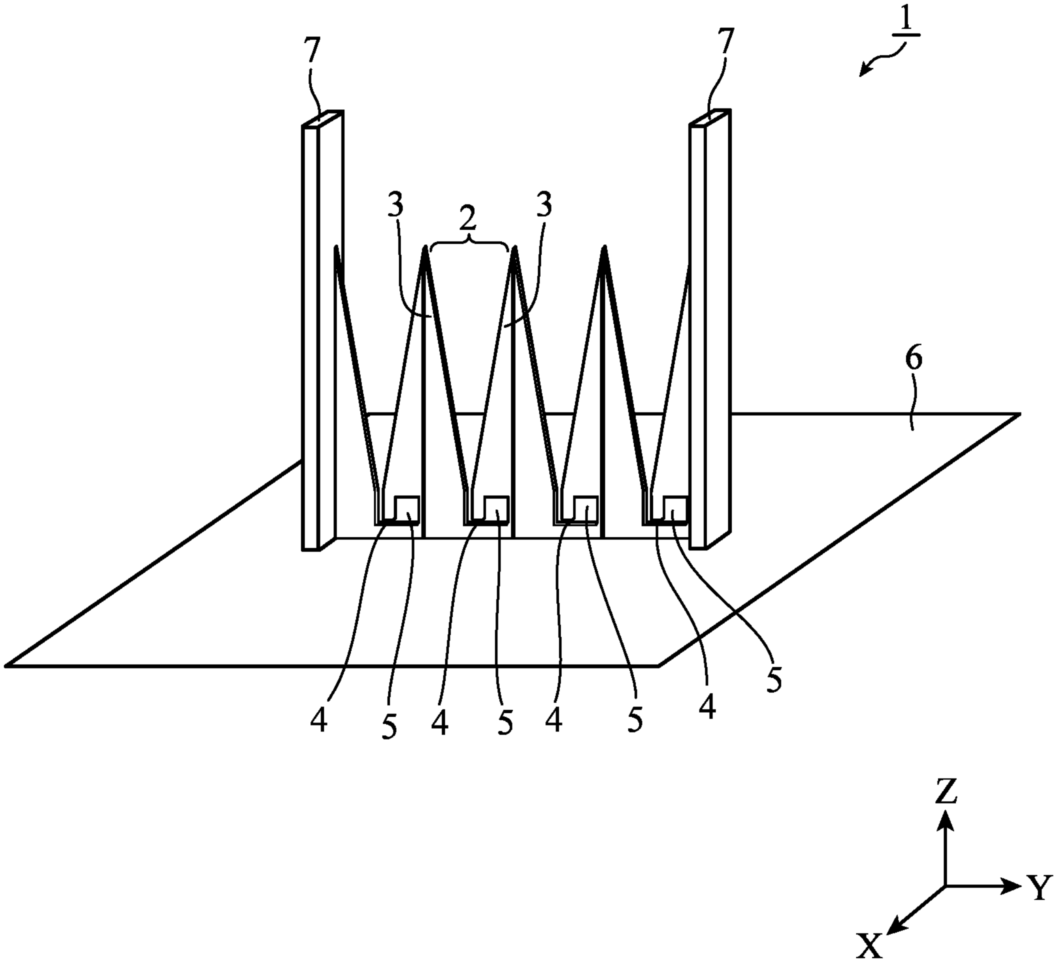
FIG. 1 is a perspective view illustrating an array antenna device according to a first embodiment.
Figure 2:
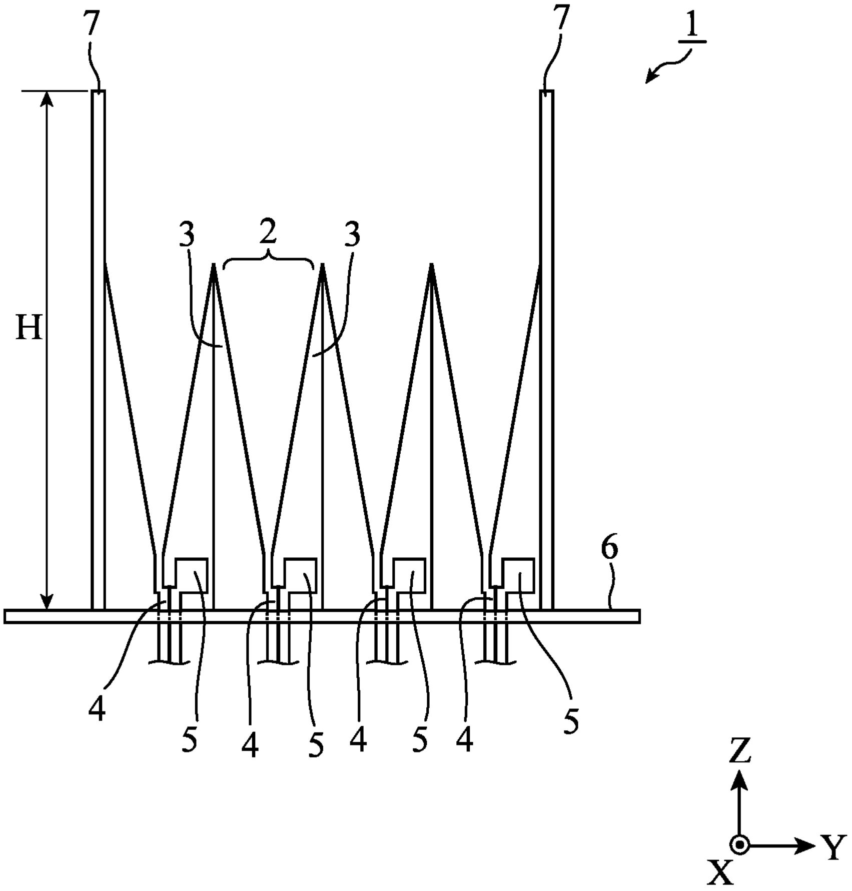
FIG. 2 is a side view illustrating the array antenna device according to the first embodiment.
Figure 3:
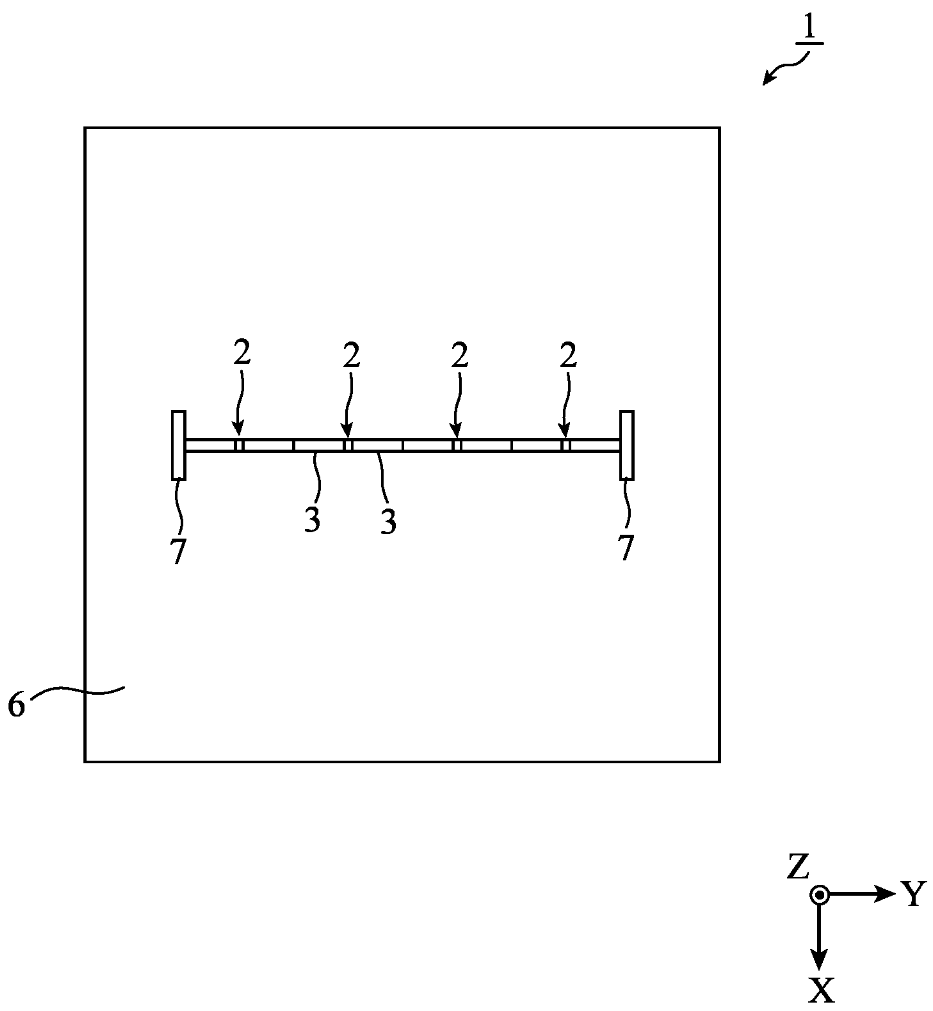
FIG. 3 is a top view illustrating the array antenna device according to the first embodiment.

FIG. 1 is a perspective view illustrating an array antenna device 1 according to a first embodiment. FIG. 2 is a side view illustrating the array antenna device 1. FIG. 3 is a top view illustrating the array antenna device 1. The array antenna device 1 includes a plurality of tapered slot antennas 2. The tapered slot antenna 2 is an element antenna constituting the array antenna device 1, and includes a pair of tapered conductor plates 3, a power feeding unit 4, and a matching stub 5.

The plurality of tapered slot antennas 2 are configured as planes parallel to the Y-Z plane of XYZ coordinates shown in FIGS. 1, 2, and 3. A ground plate 6 is formed in a plane parallel to the X-Y plane. A metal plate 7 is formed in a plane parallel to the Z-X plane. The main radiation direction in the array antenna device 1 is the +Z direction. The radio wave fed to the tapered conductor plate 3 by the power feeding unit 4 is radiated to free space via the tapered conductor plate 3, the ground plate 6, and the metal plate 7.

A plurality of tapered slot antennas 2 are provided on the ground plate 6 that is a flat-plate shaped conductor, and constitute an "element antenna array" linearly arranged along the electric field direction (Y direction). The tapered conductor plates 3 included in each of the tapered slot antennas 2 are a pair of conductor plates each having a tapered shape in which a width thereof is narrowed in a direction away from the ground plate 6. In the tapered slot antenna 2, as illustrated in FIGS. 1 and 2, the pair of tapered conductor plates 3 are arranged in such a way that a distance therebetween is widened in a direction away from the ground plate 6.

The power feeding unit 4 is a power feeding unit having a coaxial line structure, and feeds power to the pair of tapered conductor plates 3 included in the tapered slot antenna 2. An outer conductor of the coaxial line of the power feeding unit 4 is electrically conducted with the ground plate 6, and an inner conductor of the coaxial line of the power feeding unit 4 is electrically connected to the tapered conductor plate 3. The tapered conductor plate 3 is fed with power via the inner conductor of the coaxial line of the power feeding unit 4.

The matching stub 5 is a conductor for matching the power feeding unit 4. A desired power feeding impedance is obtained in the power feeding unit 4 by the matching stub 5. The ground plate 6 is a conductor plate that functions as a common reflector for the plurality of tapered slot antennas 2, and forms a ground potential in the array antenna device 1. Note that the bottom surface portion of the tapered conductor plate 3, the outer conductor of the coaxial line of the power feeding unit 4, the ground plate 6, and the metal plate 7 are electrically grounded.

As illustrated in FIG. 2, the metal plate 7 is a flat-plate shaped conductor member in which a height H from the ground plate 6 is higher than that of the tapered slot antenna 2, and is provided at both ends in the element antenna array along the arrangement direction of the tapered slot antennas 2. The arrangement direction of the tapered slot antennas 2 is an electric field direction (Y direction) of the antenna aperture formed in the element antenna array. That is, as shown in FIG. 3, the metal plate 7 is orthogonal to the electric field direction of the antenna aperture formed in the element antenna array, and as shown in FIG. 2, the metal plate 7 is orthogonal to the ground plate 6. The height H (height in the Z direction) of the metal plate 7 is a height that is an odd multiple of ¼ of the free space wavelength $\lambda_L$ at the lower limit frequency of the operating frequency band of the array antenna device 1. For example, the metal plate 7 has a height that is ¾ of the free space wavelength XL at the lower limit frequency of the operating frequency band.

The array antenna device 1 includes the metal plate 7 having a height from the ground plate 6 higher than that of the tapered slot antenna 2, for example, a height that is ¾ of the free space wavelength XL at the lower limit frequency of the operating frequency band. The metal plates 7 are arranged at both ends of the antenna aperture formed in the element antenna array along the electric field direction. As a result, mirror images are electrically formed on both sides of the real image of the element antenna array via the metal plate 7.

Figure 4:
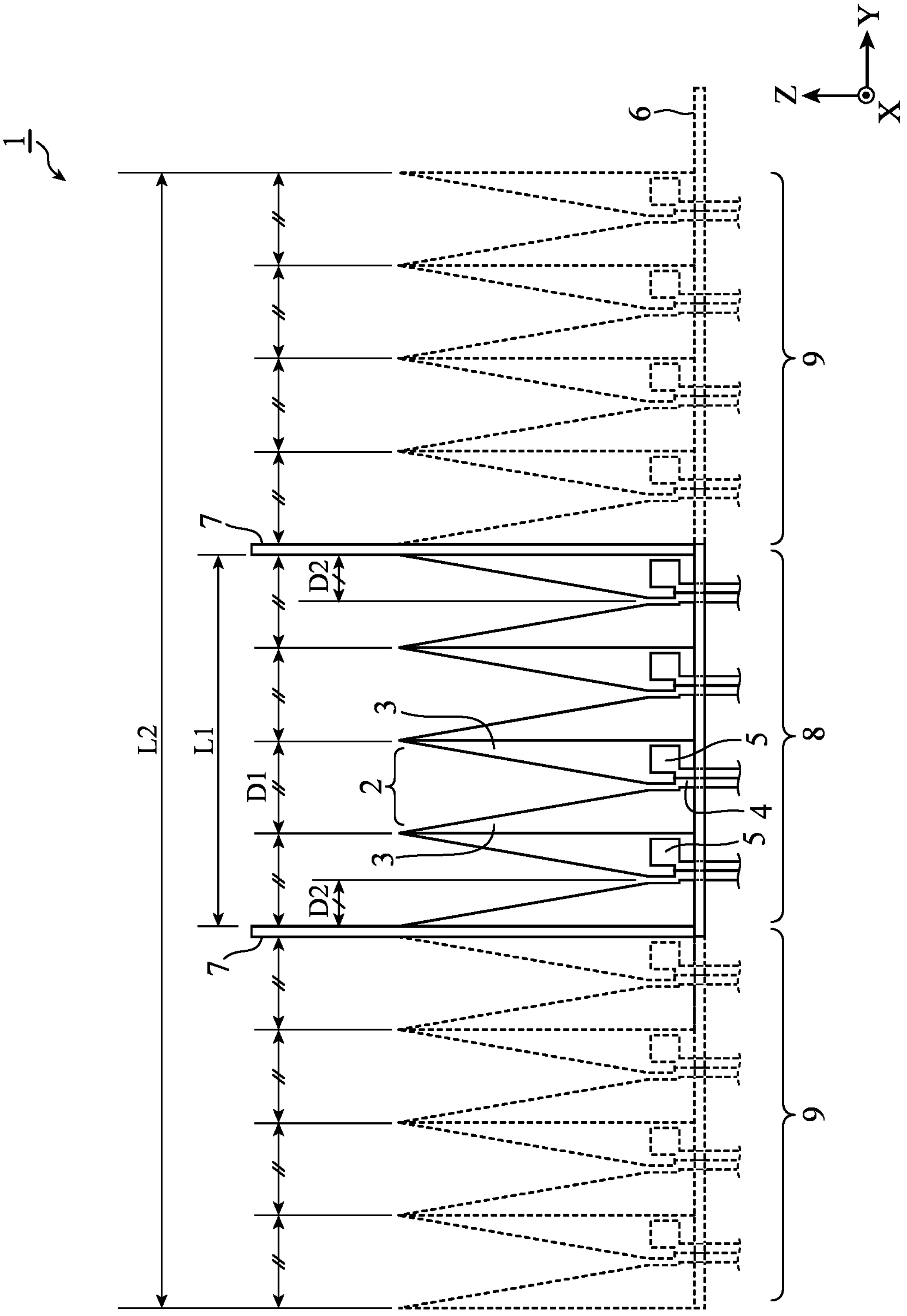
FIG. 4 is a diagram illustrating an outline of a real image and a mirror image of an element antenna array in the array antenna device according to the first embodiment.

FIG. 4 is a diagram illustrating an outline of a real image 8 and a mirror image 9 of the element antenna array in the array antenna device 1. As indicated by a solid line in FIG. 4, the actual physical structure of the element antenna array is only the real image 8. The mirror image 9 of the element antenna array is formed on both sides of the real image 8 by the metal plate 7 higher than the tapered slot antenna 2 as indicated by a broken line in FIG. 4. Since the array antenna device 1 is an array antenna having an antenna aperture length L2 larger than an antenna aperture length L1 of the real image 8 by the antenna aperture length of the mirror image 9, impedance matching can be achieved on the low frequency side (long wavelength side) of the operating frequency band.

As illustrated in FIG. 4, the metal plate 7 is provided at a position separated by a distance D2 that is a half of width D1 of each tapered slot antenna 2 from the center position of the tapered slot antenna 2 at the end of the element antenna array along the electric field direction. Since the array antenna device 1 is regarded as a periodic continuous structure in which a plurality of tapered slot antennas 2 including the mirror image 9 are arranged at equal intervals D1, variations in reflection characteristics of each tapered slot antenna 2 are suppressed.

The metal plate 7 having a height H higher than the tapered slot antenna 2 and equal to an odd multiple of ¼ of the free space wavelength $\lambda_L$ is short-circuited on the ground plate 6, and the tip portion of the metal plate 7 is electrically opened. For example, the metal plate 7 in which the height H is ¾ of the free space wavelength $\lambda_L$ suppresses leakage of a part of the electric field component generated in the tapered slot antenna 2 to the outside from the end of the antenna aperture of the element antenna array. Therefore, the array antenna device 1 can obtain a sufficient mirror image effect.

Figure 5:
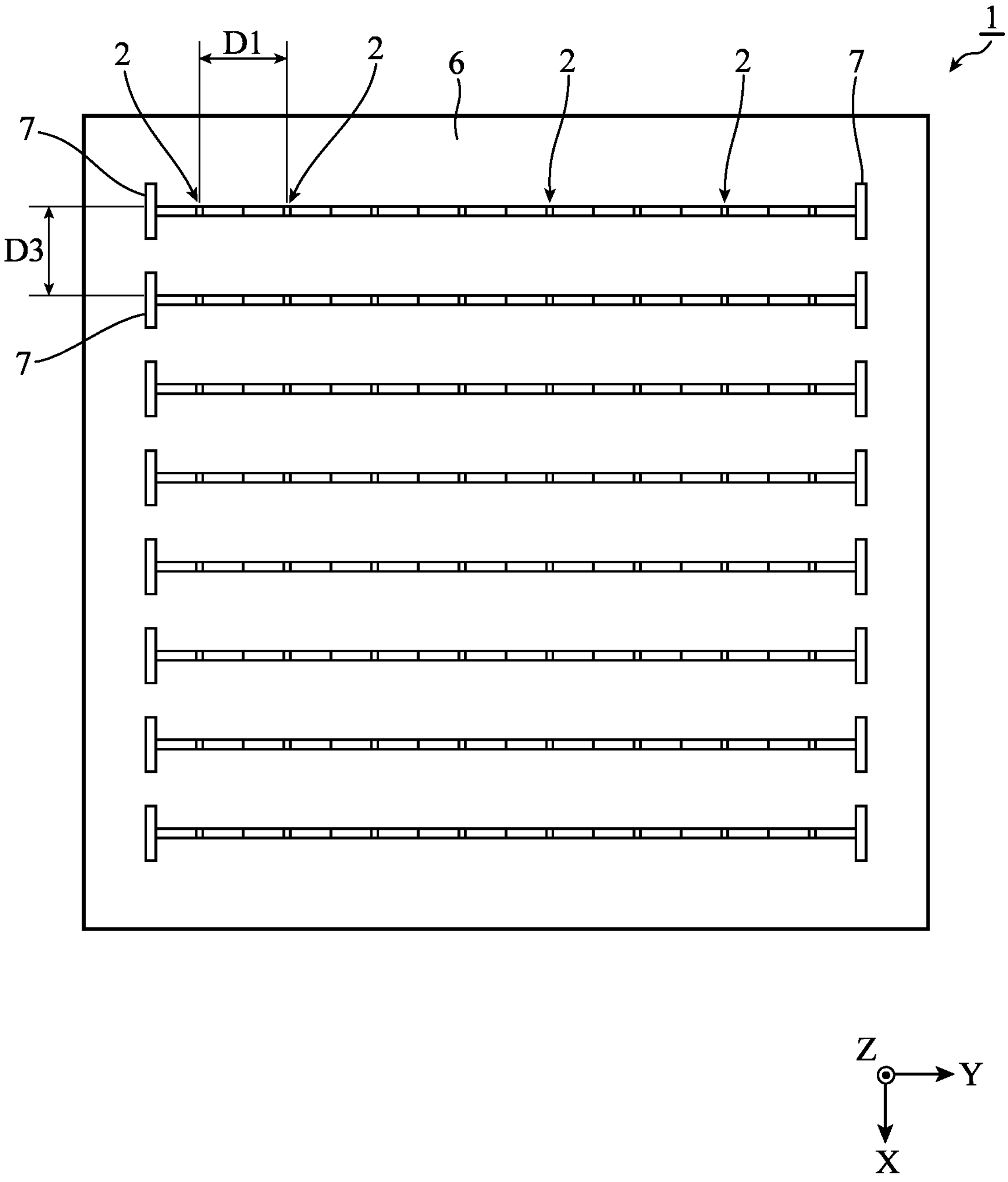
FIG. 5 is a top view illustrating an array of a plurality of element antenna arrays in the array antenna device according to the first embodiment.

FIG. 5 is a top view illustrating an arrangement of a plurality of element antenna arrays in the array antenna device 1. In FIG. 5, in the array antenna device 1, each of eight element antenna arrays is constituted by eight tapered slot antennas 2, and the eight element antenna arrays are arranged in a quadrangular shape along the X direction. In addition, the width D1 of the tapered slot antenna 2 that is an element antenna is an interval of the tapered slot antennas 2 in the electric field direction (Y direction). An interval D3 between adjacent element antenna arrays is an interval of the antenna apertures formed in the element antenna arrays in the magnetic field direction (X direction).

The lower limit frequency of the operating frequency band is set to $f_L$, and the upper limit frequency $f_H$ is set to 10 $f_L$ to set a 10 times band. In addition, the width D1 and the interval D3 are set to a distance 0.5 times the free space wavelength $\lambda_H$ at the upper limit frequency of the operating frequency band and a distance 0.05 times the free space wavelength $\lambda_L$ at the lower limit frequency.

Under the above setting conditions, a configuration in which the metal plate 7 included in the array antenna device 1 illustrated in FIG. 5 has a height that is ¾ of the free space wavelength $\lambda_L$ is referred to as an array antenna configuration (1). A configuration in which the metal plate 7 is excluded from the array antenna device 1 illustrated in FIG.

5 is referred to as an array antenna configuration (2). A configuration in which the metal plate 7 is provided between all the tapered slot antennas 2 constituting the element antenna array in the array antenna device 1 illustrated in FIG. 5 is referred to as an array antenna configuration (3). A configuration in which a state in which element antenna arrays are periodically arranged infinitely at an infinite period boundary is simulated in the array antenna device 1 illustrated in FIG. 5 is referred to as an array antenna configuration (4).

Figure 6:
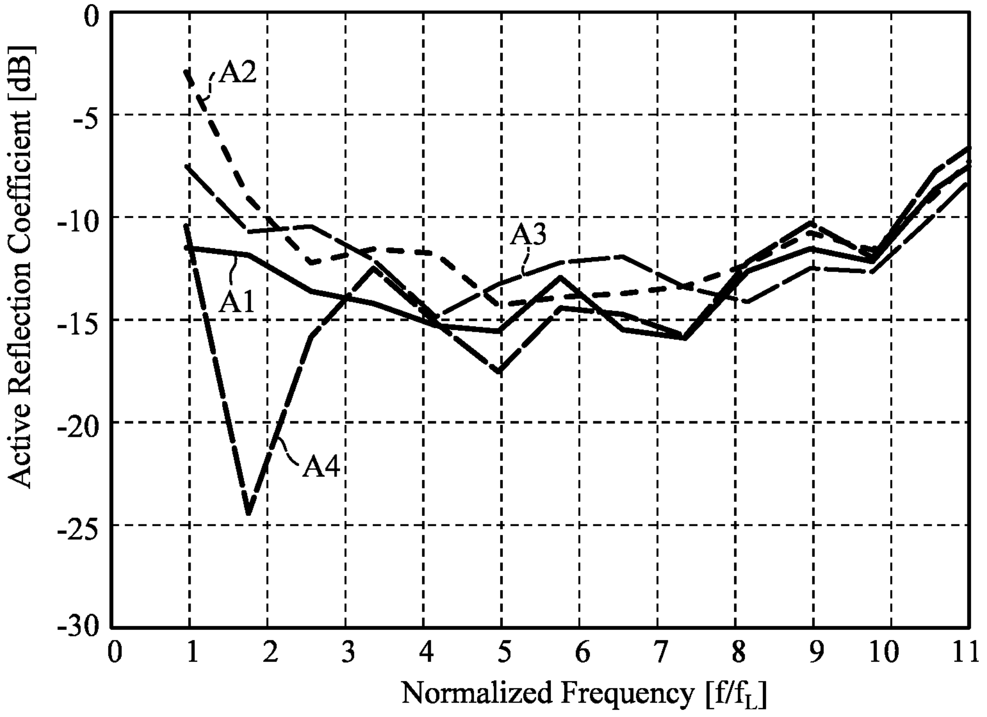
FIG. 6 is a graph showing calculation results of reflection characteristics in various array antenna configurations.

FIG. 6 is a graph showing calculation results of reflection characteristics in various array antenna configurations, and shows a relationship between an active reflection coefficient and a normalized frequency for the array antenna configurations (1) to (4). In FIG. 6, the active reflection coefficient is a total element average value of active reflection coefficients when power is fed to all the tapered slot antennas 2 constituting the eight element antenna arrays in the array antenna configurations (1) to (4). The normalized frequency indicates a frequency normalized by the lower limit frequency $f_L$ of the operating frequency band.

In FIG. 6, a characteristic relationship A1 indicates a relationship between the active reflection coefficient and the normalized frequency of the array antenna configuration (1), and a characteristic relationship A2 indicates a relationship between the active reflection coefficient and the normalized frequency of the array antenna configuration (2). A characteristic relationship A3 indicates a relationship between the active reflection coefficient and the normalized frequency in the array antenna configuration (3), and a characteristic relationship A4 indicates a relationship between the active reflection coefficient and the normalized frequency in the array antenna configuration (4). In the array antenna configurations (2) and (3) corresponding to the characteristic relationships A2 and A3, respectively, the active reflection coefficient in the range of the normalized frequency of 1.0 to 2.0 is larger than that in the array antenna configuration (4) corresponding to the characteristic relationship A4, and is deteriorated.

In addition, in the array antenna device 1 having the array antenna configuration (1) corresponding to the characteristic relationship A1, the active reflection coefficient in the range where the normalized frequency that is the low frequency side of the operating frequency band is 1.0 to 2.0 is a small value as compared with the array antenna configuration (2) corresponding to the characteristic relationship A2 or the array antenna configuration (3) corresponding to the characteristic relationship A3, and is improved.

Furthermore, in the array antenna device 1, the active reflection coefficient at the normalized frequency 1.0 corresponding to the lower limit frequency of the operating frequency band has a value similar to that of the array antenna configuration (4) corresponding to the characteristic relationship A4.

Note that the array antenna device 1 is not limited to the configuration in which the metal plates 7 are provided at both ends of the antenna aperture in the element antenna array. For example, when the metal plates 7 are not provided at both ends of the antenna aperture in the element antenna array due to the space of the platform on which the array antenna device 1 is disposed, the metal plate 7 may be provided only at one end of the element antenna array. Also in this case, in the array antenna device 1, since the mirror image of the element antenna array is formed by the metal plate 7, the reflection characteristics on the low frequency side of the operating frequency band can be improved even if the antenna aperture is small.

In the array antenna device 1, as the antenna aperture length of the element antenna array is shorter, for example, as the aperture length of the antenna in the electric field direction is less than or equal to the free space wavelength $\lambda_L$ of the lower limit frequency, the reflection characteristic in the low frequency band of the operating frequency band is improved.

As described above, the array antenna device 1 according to the first embodiment includes the metal plates 7 that are provided at both ends of the antenna aperture formed in the element antenna array along the electric field direction on the ground plate 6, and have a height H from the ground plate 6 higher than that of the tapered slot antenna 2. Since the mirror images 9 of the element antenna array are formed adjacent to the real image 8 of the element antenna array between the metal plates 7, and an aperture larger than the actual antenna aperture is virtually formed, impedance matching can be achieved on the low frequency side of the operating frequency band. As a result, the array antenna device 1 can improve the reflection characteristics on the low frequency side of the operating frequency band even if the antenna aperture is small.

Second Embodiment

Figure 7:
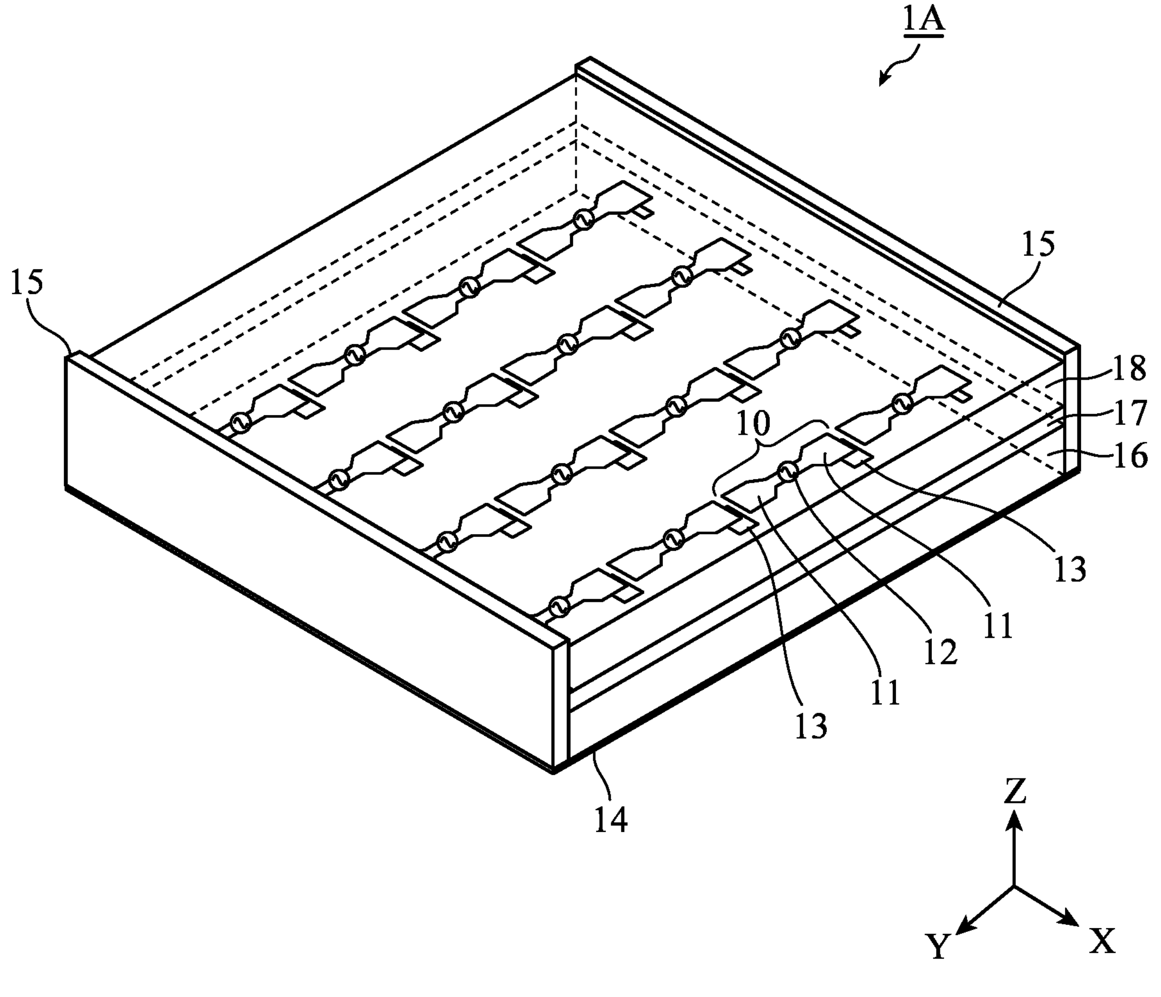
FIG. 7 is a perspective view illustrating an array antenna device according to a second embodiment.
Figure 8:
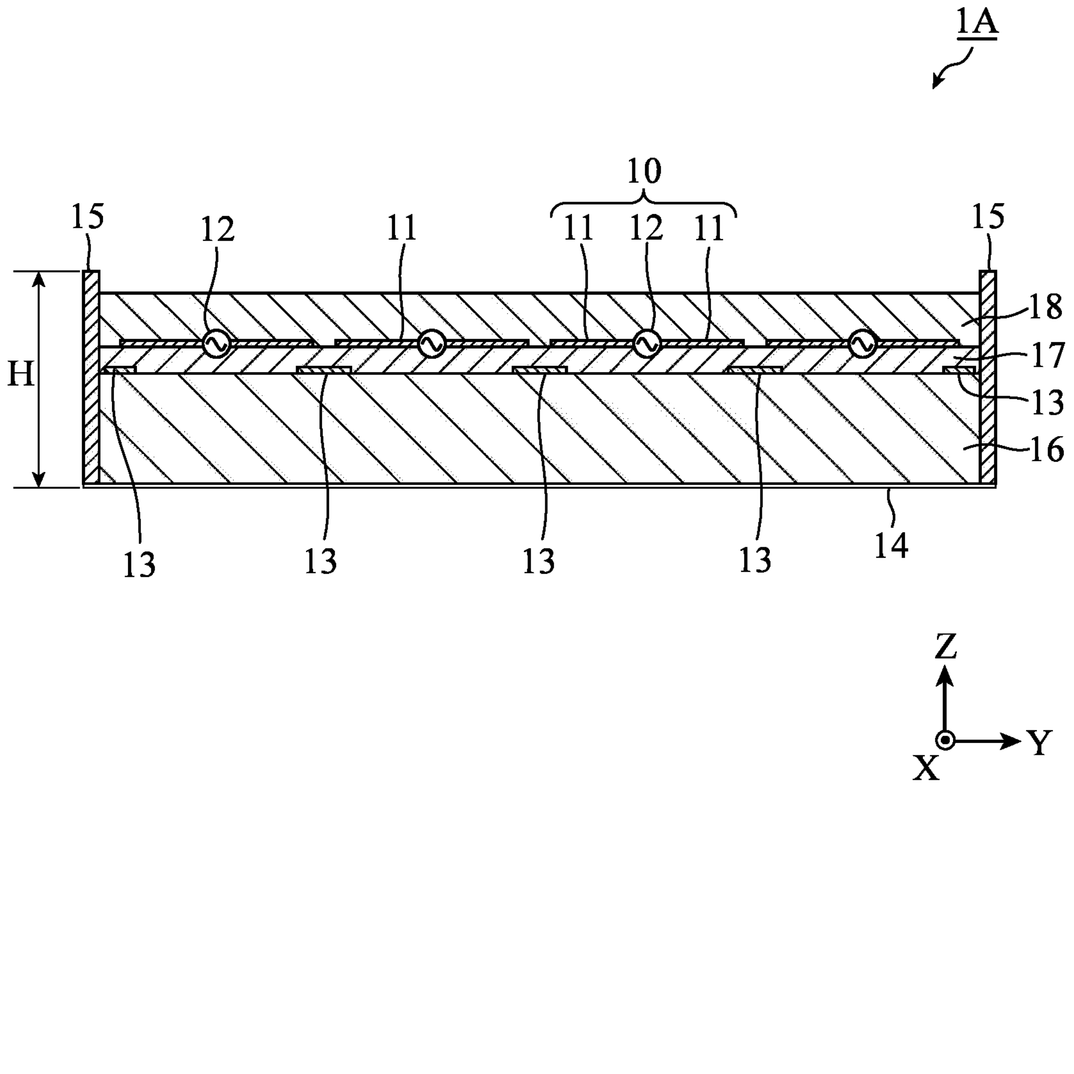
FIG. 8 is a side view illustrating the array antenna device according to the second embodiment.
Figure 9:
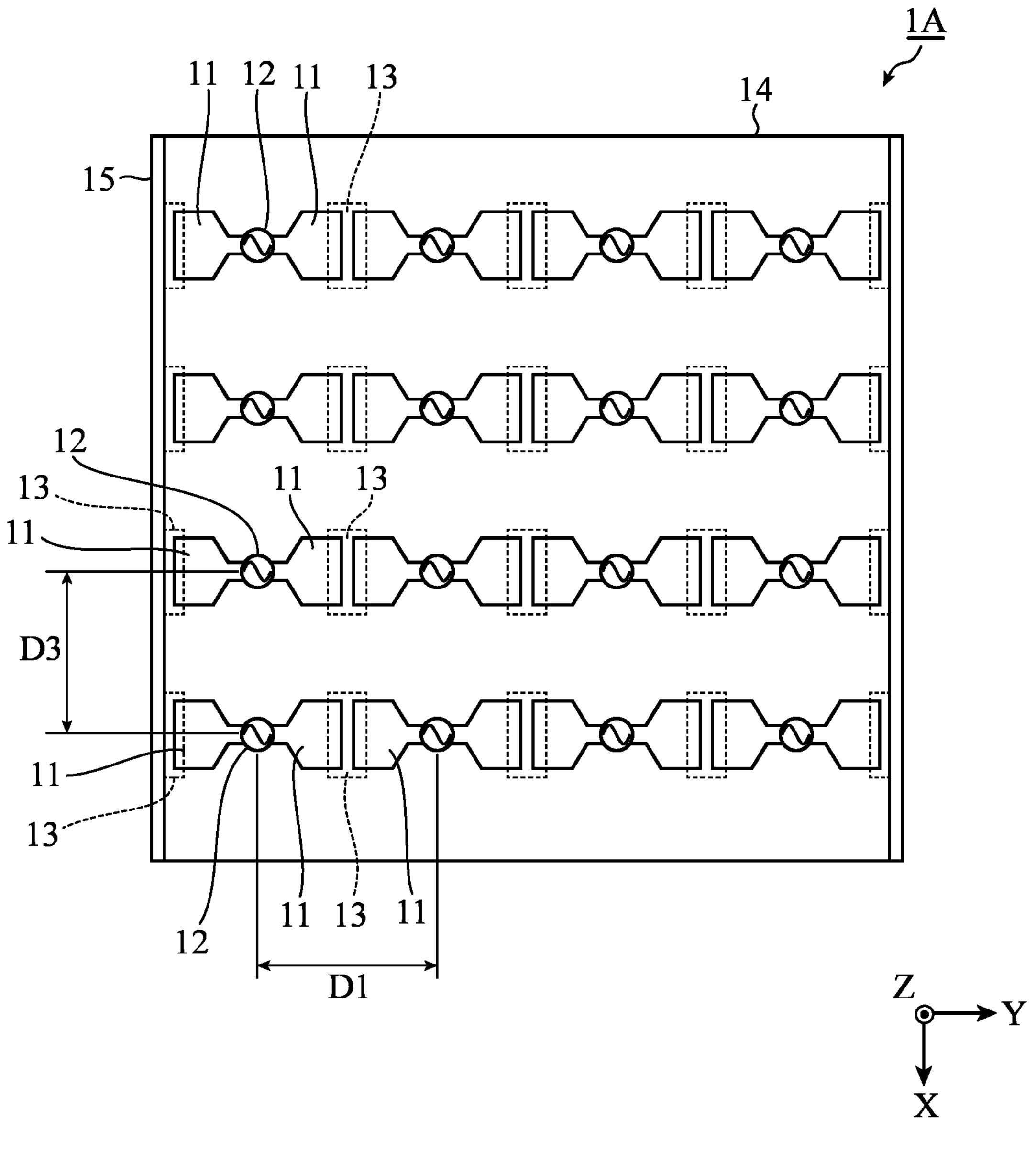
FIG. 9 is a top view illustrating the array antenna device according to the second embodiment.

FIG. 7 is a perspective view illustrating an array antenna device 1A according to a second embodiment. FIG. 8 is a side view illustrating the array antenna device 1A. FIG. 9 is a top view illustrating the array antenna device 1A. The array antenna device 1A includes a plurality of dipole antennas 10. Furthermore, the dipole antenna 10 is an element antenna constituting the array antenna device 1A, and includes a pair of dipole elements 11, a power feeding unit 12, and a coupling element 13.

The array antenna device 1A includes a dielectric substrate 16, a dielectric substrate 17, and a dielectric substrate 18. In FIGS. 7 and 9, the dielectric substrate 16, the dielectric substrate 17, and the dielectric substrate 18 are transparently illustrated in order to make the components of the dipole antenna 10 visible. In the dielectric substrate 16, a ground plate 14 is provided on one surface, and the dielectric substrate 17 is stacked on a surface opposite to the surface on which the ground plate 14 is provided. The dielectric substrate 18 is further stacked on the dielectric substrate 17 in the Z direction. The plurality of dipole antennas 10 are provided on the ground plate 14 with the dielectric substrate 16 and the dielectric substrate 17 interposed therebetween, and constitute an "element antenna array" linearly arranged along the electric field direction (Y direction).

As illustrated in FIG. 8, the pair of dipole elements 11 are metal thin films provided on the dielectric substrate 17. The power feeding unit 12 feeds power to the dipole element 11. The coupling element 13 is a conductor that is provided on a surface opposite to the surface on which the ground plate 6 is provided in the dielectric substrate 16, and adjusts mutual coupling of the dipole elements 11 to achieve matching.

The plurality of dipole antennas 10 are provided on a surface parallel to the X-Y plane of the XYZ coordinates illustrated in FIGS. 7, 8, and 9. The ground plate 14 provided on one surface of the dielectric substrate 16 parallel to the X-Y plane is a conductor plate that functions as a common reflector for the plurality of dipole antennas 10, and forms a ground potential of the array antenna device 1A. A metal plate 15 is provided on a surface parallel to the Z-X plane of the ground plate 14. The main radiation direction in the array antenna device 1A is the +Z direction. The radio wave fed to the dipole element 11 by the power feeding unit 12 is radiated to free space via the dipole element 11, the ground plate 14, and the metal plate 15.

As illustrated in FIG. 8, the metal plate 15 is a conductor member having a height H from the ground plate 14 higher than a position of the dielectric substrate 17 where the dipole antenna 10 is provided. Further, the metal plate 15 has a flat-plate shape elongated in the X direction, and is provided one by one at both ends of the dipole antennas 10 along the arrangement direction in the plurality of element antenna arrays (four element antenna arrays in FIGS. 7 and 9). That is, the common metal plate 15 is provided at both ends of the antenna aperture formed in each of the plurality of element antenna arrays. Mirror images are formed next to the real image in each of the plurality of element antenna arrays by the common metal plate 15.

The arrangement direction of the dipole antennas 10 is an electric field direction (Y direction) of an antenna aperture formed in the element antenna array. That is, the metal plate 15 is orthogonal to the electric field direction (Y direction) of the antenna aperture formed in the element antenna array as illustrated in FIG. 9, and is orthogonal to the ground plate 14 as illustrated in FIG. 8. The height H (height in the Z direction) of the metal plate 15 is 0.1 times the free space wavelength $\lambda_L$ at the lower limit frequency of the operating frequency band of the array antenna device 1A.

In FIGS. 7 and 9, in the array antenna device 1A, each of the four element antenna arrays includes four dipole antennas 10, and the four element antenna arrays are arranged in a quadrangular shape along the X direction. As illustrated in FIG. 9, the width D1 of the dipole antenna 10 is an interval of the dipole antennas 10 in the electric field direction (Y direction). An interval D3 between adjacent element antenna arrays is an interval of the antenna apertures formed in the element antenna arrays in the magnetic field direction (X direction).

Figure 10:
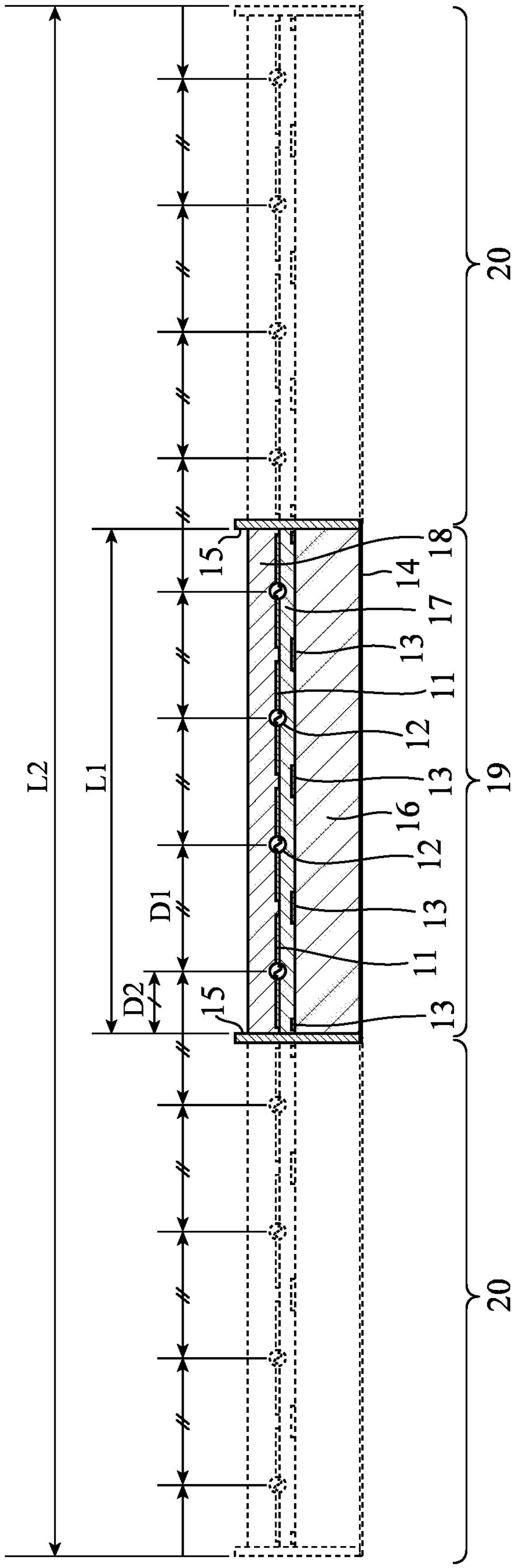
FIG. 10 is a diagram illustrating an outline of a real image and a mirror image of an element antenna array in the array antenna device according to the second embodiment.

FIG. 10 is a diagram illustrating an outline of a real image 19 and a mirror image 20 of the element antenna array in the array antenna device 1A. As indicated by a solid line in FIG. 10, the actual physical structure of the element antenna array is only the real image 19. By the metal plate 15 having the height H higher than that of the dipole antenna 10, the mirror image 20 of the element antenna array is formed on both sides of the real image 19 as indicated by a broken line in FIG. 10. Since the array antenna device 1A is an array antenna having the antenna aperture length L2 larger than the antenna aperture length L1 of the real image 19 by the antenna aperture length of the mirror image 20, impedance matching can be achieved on the low frequency side of the operating frequency band.

As illustrated in FIG. 10, the metal plates 15 are provided at positions separated from the center positions of the dipole antennas 10 at both ends of the element antenna array along the electric field direction by a distance D2 that is half the width D1 of each dipole antenna 10. Since the array antenna device 1A is regarded as a periodic continuous structure in which the plurality of dipole antennas 10 including the mirror images 20 are arranged at equal intervals D1, variations in the reflection characteristics of each dipole antenna 10 are suppressed.

The array antenna device 1 includes a metal plate 7 that is higher than the element antenna and has a height H that is an odd multiple of ¼ of the free space wavelength $\lambda_L$. On the other hand, in the array antenna device 1A, the plurality of dipole antennas 10 are provided in a structure in which the dielectric substrate 16, the dielectric substrate 17, and the dielectric substrate 18 are stacked. Therefore, due to the wavelength shortening effect of the dielectric, even when the height H of the metal plate 15 from the ground plate 14 is 0.1 times the free space wavelength $\lambda_L$ lower than ¼ of the free space wavelength $\lambda_L$, leakage of a part of the electric field component generated in the dipole antenna 10 to the outside from the antenna aperture end of the element antenna array is suppressed. As a result, the array antenna device 1A can obtain a sufficient mirror image effect.

The lower limit frequency of the operating frequency band is set to $f_L$, and the upper limit frequency $f_H$ is set to 4.5 $f_L$ to set a 4.5 times band. In addition, the width D1 of the element antenna array of the dipole antenna 10 in the Y direction (the electric field direction of the antenna) and the interval D3 in the X direction (the magnetic field direction of the antenna) are set to a distance 0.5 times the free space wavelength $\lambda_H$ at the upper limit frequency $f_H$ of the operating frequency band and set to a distance 0.11 times the free space wavelength $\lambda_L$ at the lower limit frequency $f_L$.

Under the above setting conditions, a configuration in which the metal plate 15 included in the array antenna device 1A illustrated in FIG. 9 has a height 0.1 times the free space wavelength $\lambda_L$ is referred to as an array antenna configuration (1*a*). A configuration in which the metal plate 15 is excluded from the array antenna device 1A illustrated in FIG. 9 is referred to as an array antenna configuration (2*a*). A configuration in which a state in which element antenna arrays are periodically arranged infinitely at an infinite period boundary is simulated in the array antenna device 1A illustrated in FIG. 9 is referred to as an array antenna configuration (3*a*).

Figure 11:
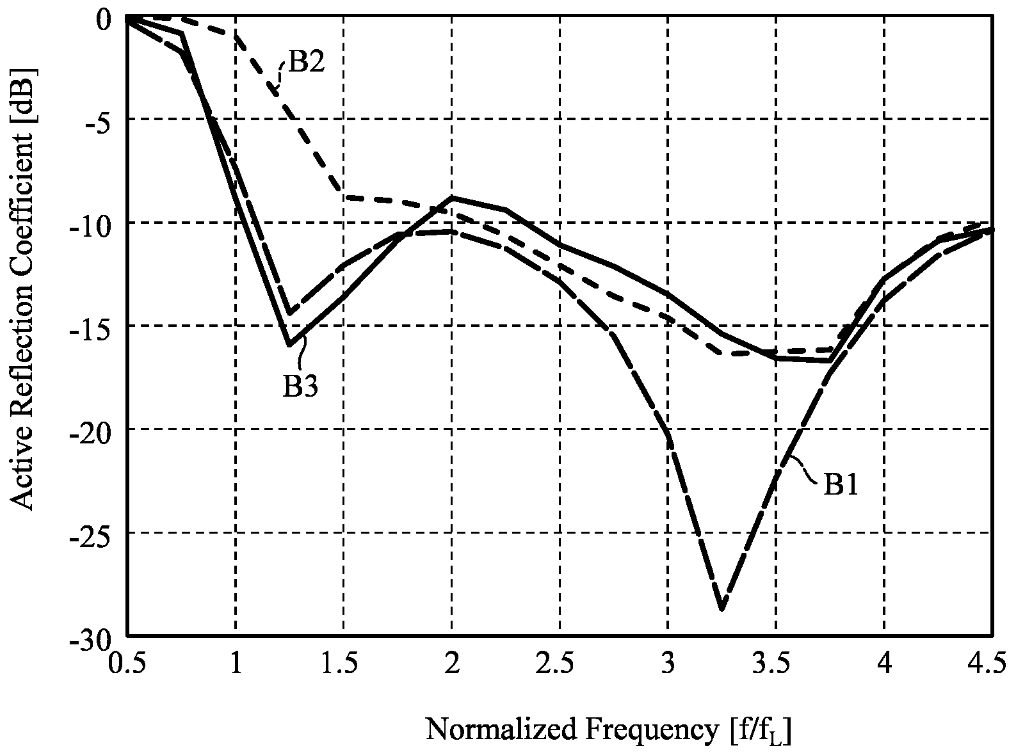
FIG. 11 is a graph showing calculation results of reflection characteristics in various array antenna configurations.

FIG. 11 is a graph showing calculation results of reflection characteristics in various array antenna configurations, and shows a relationship between an active reflection coefficient and a normalized frequency for the array antenna configurations (1*a*) to (3*a*). In FIG. 11, the active reflection coefficient is a total element average value of active reflection coefficients when power is fed to all dipole antennas 10 constituting four element antenna arrays in the array antenna configurations (1*a*) to (3*a*). The normalized frequency indicates a frequency normalized by the lower limit frequency $f_L$ of the operating frequency band.

In FIG. 11, a characteristic relationship B1 indicates a relationship between the active reflection coefficient and the normalized frequency of the array antenna configuration (1*a*), and a characteristic relationship B2 indicates a relationship between the active reflection coefficient and the normalized frequency of the array antenna configuration (2*a*). A characteristic relationship B3 indicates a relationship between the active reflection coefficient and the normalized frequency of the array antenna configuration (3*a*). In the array antenna configuration (2*a*) corresponding to the characteristic relationship B2, the active reflection coefficient in the range of the normalized frequency of 1.5 to 2.0 is larger than the value of the array antenna configuration (3*a*) corresponding to the characteristic relationship B3, and is deteriorated.

In addition, in the array antenna device 1A having the array antenna configuration (1*a*) corresponding to the characteristic relationship B1, the active reflection coefficient in the range where the normalized frequency that is the low frequency side of the operating frequency band is 1.0 to 1.5 is a small value as compared with the array antenna configuration (2*a*) corresponding to the characteristic relationship B2, and is improved. Furthermore, in the array antenna device 1A, it can be considered that a plurality of dipole antennas 10 are arranged electrically continuously by the mirror image 20 formed by the metal plate 15. Therefore, the active reflection coefficient at the normalized frequency 1.0 corresponding to the lower limit frequency of the operating frequency band can have a value similar to that of the array antenna configuration (3*a*) corresponding to the characteristic relationship B3.

Note that the array antenna device 1A is not limited to the configuration in which the metal plate 15 is provided at both ends of the antenna aperture in the element antenna array. For example, in a case where the metal plates 15 are not provided at both ends of the antenna aperture in the element antenna array due to the space of the platform on which the array antenna device 1A is disposed, the metal plate 15 may be provided only at one end of the element antenna array. Also in this case, in the array antenna device 1A, since the mirror image of the element antenna array is formed by the metal plate 15, the reflection characteristics on the low frequency side of the operating frequency band can be improved even if the antenna aperture is small.

In the array antenna device 1A, as the antenna aperture length of the element antenna array is shorter, for example, as the aperture length of the antenna in the electric field direction is less than or equal to the free space wavelength $\lambda_L$ of the lower limit frequency, the reflection characteristic in the low frequency band of the operating frequency band is improved.

As described above, the array antenna device 1A according to the second embodiment includes the metal plate 15 provided at both ends of the antenna aperture formed in the element antenna array along the electric field direction on the ground plate 14 and having a height H from the ground plate 14 higher than that of the dipole antenna 10. Since the mirror images 20 of the element antenna array are formed adjacent to the real image 19 of the element antenna array between the metal plates 15, and an aperture larger than the actual antenna aperture is virtually formed, impedance matching can be achieved on the low frequency side of the operating frequency band. As a result, the array antenna device 1A can improve the reflection characteristics on the low frequency side of the operating frequency band even if the antenna aperture is small.

Third Embodiment

Figure 12:
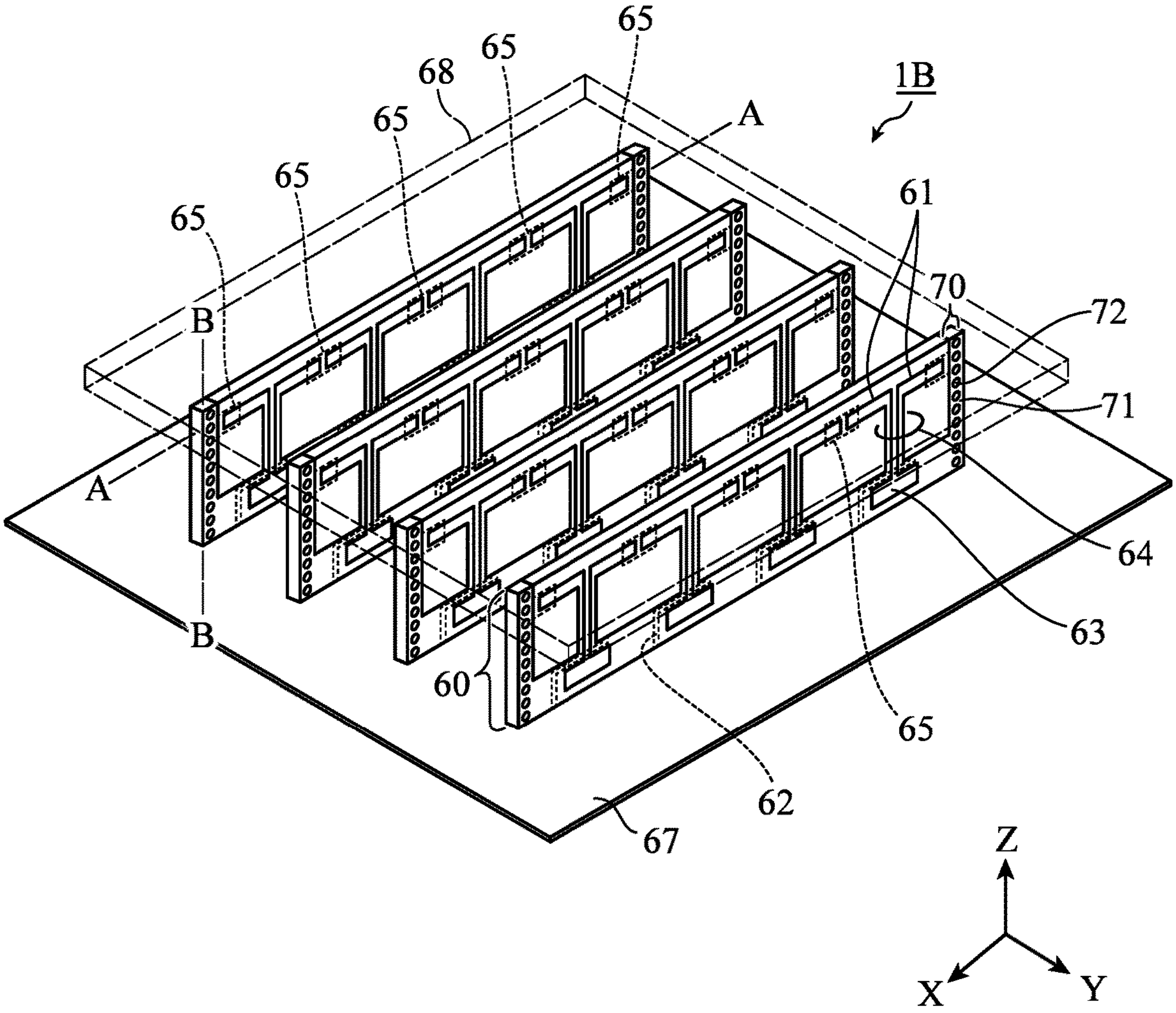
FIG. 12 is a perspective view illustrating an array antenna device according to a third embodiment.
Figure 13:
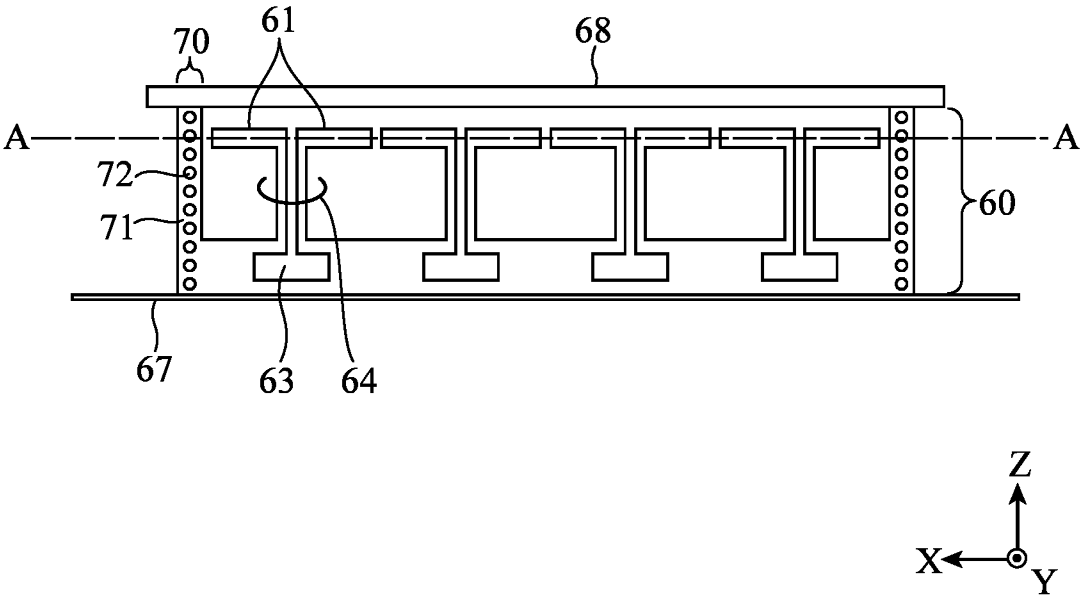
FIG. 13 is a side view illustrating the array antenna device according to the third embodiment as viewed from the +Y direction.
Figure 14:
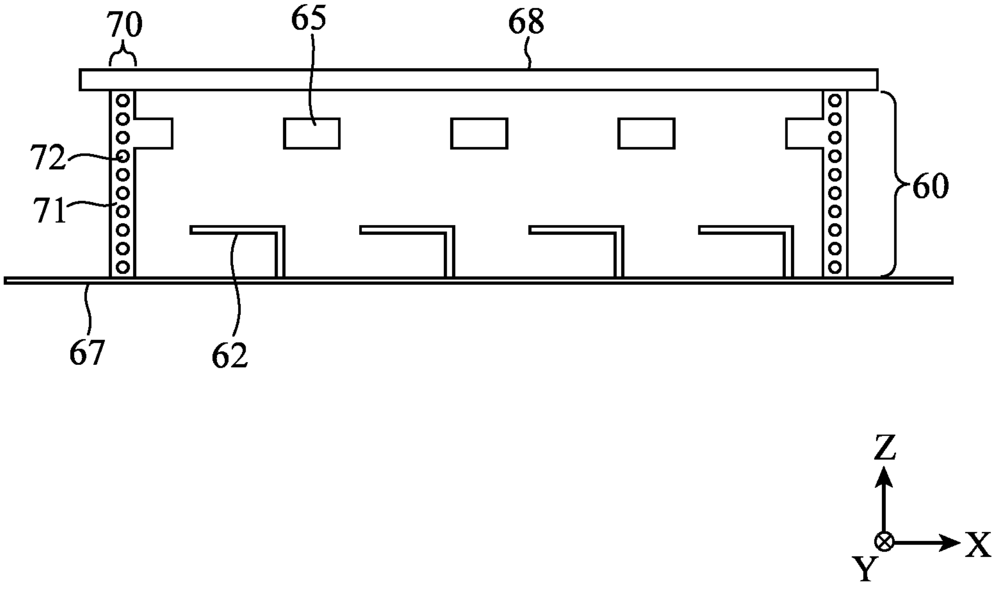
FIG. 14 is a side view illustrating the array antenna device according to the third embodiment as viewed from the −Y direction.
Figure 15:
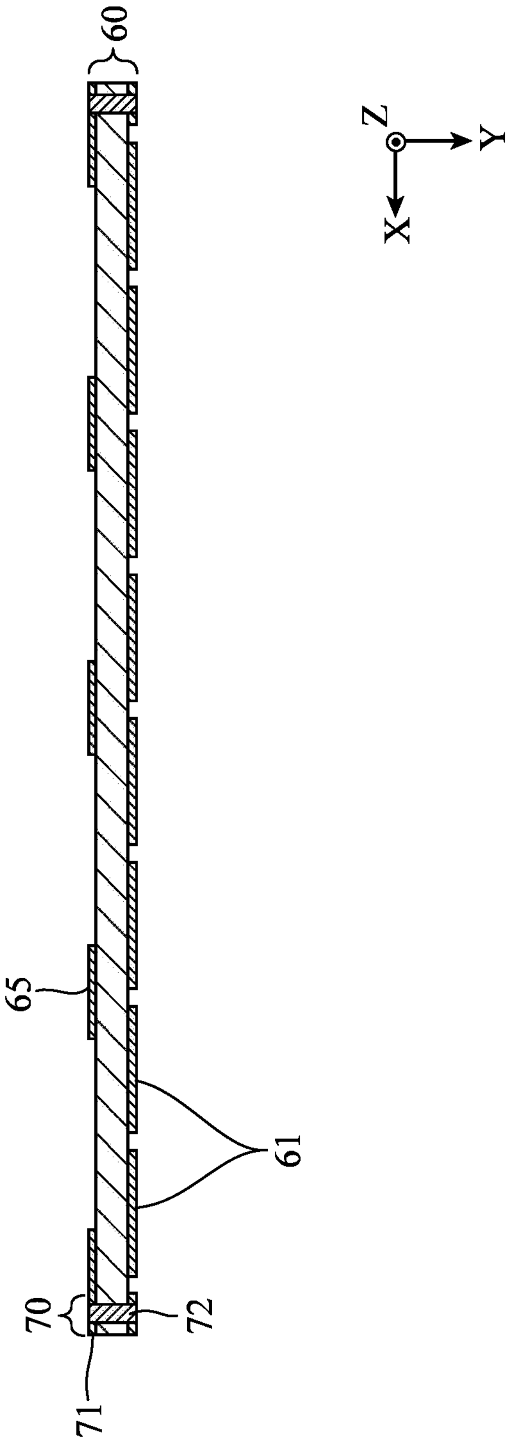
FIG. 15 is a cross-sectional view illustrating a cross section taken along line A-A of the array antenna device according to the third embodiment as viewed from the +Z direction.
Figure 16:
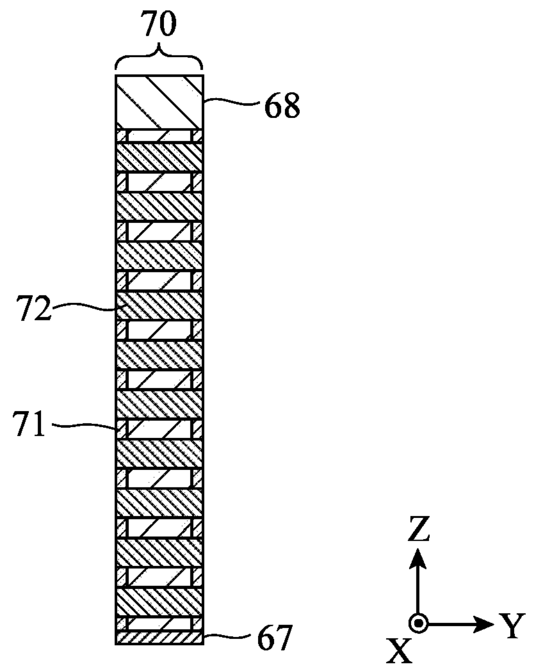
FIG. 16 is a cross-sectional view illustrating a cross section taken along line B-B of the array antenna device according to the third embodiment as viewed from the +X direction.

FIG. 12 is a perspective view illustrating an array antenna device 1B according to a third embodiment. Furthermore, FIG. 13 is a side view illustrating the array antenna device 1B when viewed from the +Y direction, and illustrates the surface of the Z-X plane of an antenna substrate 60 included in the array antenna device 1B. FIG. 14 is a side view illustrating the array antenna device 1B when viewed from the −Y direction, and illustrates the back surface of the Z-X surface of the antenna substrate 60. FIG. 15 is a cross-sectional view illustrating a cross section taken along line A-A of the array antenna device 1B when viewed from the +Z direction, and illustrates a cross section parallel to the X-Y plane of the antenna substrate 60. FIG. 16 is a cross-sectional view illustrating a cross section taken along line B-B of the array antenna device 1B when viewed from the +X direction, and illustrates a cross section parallel to the Y-Z plane of the antenna substrate 60. As illustrated in FIG. 12, the array antenna device 1B includes a plurality of antenna substrates 60, a ground plate 67, and a dielectric substrate 68. Each antenna substrate 60 includes a dielectric substrate, and the ground plate 67 and the dielectric substrate 68 sandwich the plurality of antenna substrates 60.

The array antenna device 1 according to the first embodiment and the array antenna device 1A according to the second embodiment are manufactured by separately manufacturing an element antenna array constituting an array antenna and a metal plate provided at both ends of the element antenna array and assembling them. For this reason, when a large gap is generated between the element antenna array and the metal plate due to manufacturing errors of both, a sufficient mirror image effect cannot be obtained, and impedance characteristics in the array antenna device may be deteriorated. On the other hand, in the array antenna device 1B, conductor walls 70 are integrally formed with the antenna substrate 60 at both ends of each of the plurality of antenna substrates 60 on which the element antenna array is formed. The conductor wall 70 is a component capable of obtaining the same effect as that of the metal plate in the first and second embodiments, and is provided for each antenna substrate 60. Therefore, in the array antenna device 1B, a gap between the element antenna array and the conductor wall 70 is not generated, and the above-described deterioration of the impedance characteristics can be prevented.

In the array antenna device 1B, the antenna substrate 60 includes a plurality of dipole antennas. The dipole antenna is an element antenna included in the array antenna device 1B, and includes a dipole element pair 61, a microstrip line 62, a matching stub 63, a parallel two-wire line 64, and a coupling element 65 as illustrated in FIGS. 12 and 13. As illustrated in FIG. 13, the dipole element pair 61, the matching stub 63, and the parallel two-wire line 64 are formed on the surface of the antenna substrate 60 (the surface of the antenna substrate 60 viewed from the +Y direction). As illustrated in FIG. 14, the microstrip line 62 and the coupling element 65 are conductor patterns formed on the back surface of the antenna substrate 60 (the surface of antenna substrate 60 viewed from the −Y direction). The microstrip line 62, the matching stub 63, and the parallel two-wire line 64 function as a power feeding unit of the dipole element pair 61.

The coupling element 65 is provided at a position corresponding to an interval between one dipole element and the other dipole element of the dipole element pair 61 adjacent on the surface of the antenna substrate 60 on the back side surface of the antenna substrate 60. That is, as illustrated in FIG. 12, the coupling element 65 projected on the surface of the antenna substrate 60 is arranged between the dipole elements adjacent to each other in the adjacent dipole element pair 61. In addition, in the dipole elements arranged on both end portions of the antenna substrate 60, the coupling element 65 projected on the surface of the antenna substrate 60 is arranged between the dipole element and the conductor wall 70.

The conductor walls 70 are formed at both ends of the antenna substrate 60. As illustrated in FIGS. 15 and 16, the conductor wall 70 includes a copper foil 71 provided on the front side surface of the antenna substrate 60, a copper foil 71 provided on the back side surface of the antenna substrate 60, and a plurality of through-holes 72 that conduct both. Both ends of the antenna substrate 60 on which the conductor wall 70 is provided are positions separated from the positions of the dipole elements at both ends in the E plane direction of the antenna substrate 60 by a distance of half the dipole element interval in the E plane direction of the dipole element pair 61. The E plane direction (X direction) is an electric field direction of the electromagnetic wave radiated from the antenna substrate 60. In addition, the height of the conductor wall 70 from the ground plate 67 is a height that is an odd multiple of ¼ of the effective wavelength of the dielectric in which the dipole element pair 61 that is an element antenna is formed at the lower limit frequency of the operating frequency band.

The array antenna device 1B according to the third embodiment operates as follows.

In the antenna substrate 60, the radio wave fed to the microstrip line 62 is fed to the dipole element pair 61 via the parallel two-wire line 64 and radiated to free space. Impedance matching of the plurality of dipole antennas included in the antenna substrate 60 is achieved by including the matching stub 63 and the coupling element 65.

As illustrated in FIG. 13, the height of the conductor wall 70 from the surface of the ground plate 67 is higher than the height of the dipole antenna in the Z direction, similarly to the metal plates described in the first and second embodiments. Therefore, since a mirror image of the plurality of dipole antennas provided on the antenna substrate 60 is generated by the conductor wall 70, it looks larger than the aperture length of the actual physical structure by the aperture length of the mirror image, impedance matching can be achieved even in a lower frequency band (long wavelength), and the array antenna device 1B operating even with a small aperture length is obtained.

Note that, in the array antenna device 1 according to the first embodiment, the height of the metal plate from the surface of the ground plate is set to be an odd multiple (For example, ¾ of the free space wavelength $\lambda_L$) of ¼ of the free space wavelength $\lambda_L$ at the lower limit frequency of the operating frequency band of the array antenna device 1. On the other hand, in the array antenna device 1B according to the third embodiment, similarly to the array antenna device 1A according to the second embodiment, the dipole antenna is constituted by a pattern of copper foil formed on a surface of a dielectric substrate, and a dielectric layer (dielectric substrate 68) is provided on an upper surface of the dipole antenna. As a result, the array antenna device 1B can suppress an unnecessary electric field component leaking to the outside of the aperture end even if the height from the surface of the ground plate is made lower than an odd multiple of ¼ of the free space wavelength $\lambda_L$ due to the wavelength shortening effect of the dielectric. As a result, a sufficient mirror image effect can be obtained.

In addition, in the first and second embodiments, the element antenna array and the metal plate disposed at the end of the element antenna array are provided separately. On the other hand, in the array antenna device 1B according to the third embodiment, the conductor wall 70 that can obtain the same effect as the metal plate is integrally formed with the antenna substrate 60 provided with the element antenna array. As a result, in the array antenna device 1B, a gap is not generated between the element antenna array and the conductor wall 70 in each of the plurality of antenna substrates 60, and deterioration of impedance characteristics due to the gap between the element antenna array and the metal plate can be prevented.

Next, characteristics of the array antenna device 1B will be described.

Figure 17:
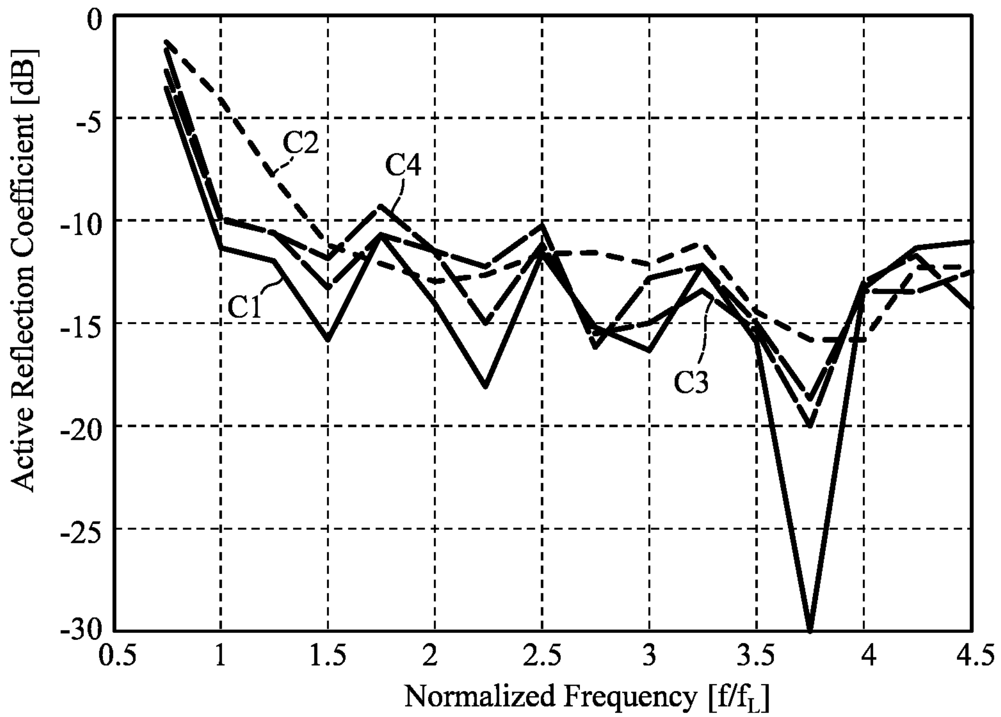
FIG. 17 is a graph showing calculation results of reflection characteristics in various array antenna configurations.

FIG. 17 is a graph showing calculation results of reflection characteristics in various array antenna configurations, and illustrates a total element average value of active reflection coefficients of array antennas when all elements of a dipole antenna are fed. In FIG. 17, the horizontal axis represents the frequency ($f/f_L$) normalized by the lower limit frequency of the operating frequency band of the array antenna, and the vertical axis represents the total element average value (dB) of the active reflection coefficients. A configuration in which a state in which element antenna arrays are periodically arranged infinitely at an infinite periodic boundary is simulated in the array antenna device 1B illustrated in FIG. 12 is referred to as an array antenna configuration (A). A configuration in which the conductor wall 70 is excluded and the metal plate is not provided in the array antenna device 1B is referred to as an array antenna configuration (B). In addition, an ideal array antenna device 1 in which the element antenna array and the metal plate are arranged without a gap is referred to as an array antenna configuration (C). Furthermore, the array antenna device 1B illustrated in FIG. 12 is referred to as an array antenna configuration (D).

In FIG. 17, the lower limit frequency of the operating frequency band is set to a frequency $f_L$, and the upper limit frequency $f_H$ is set to 4.5 $f_L$ to set a 4.5 times band. In addition, the width of the element antenna array of the dipole antenna in the X direction is set to a distance 0.5 times the free space wavelength $\lambda_H$ at the upper limit frequency $f_H$ of the operating frequency band, and the interval of the element antenna array of the dipole antenna in the Y direction is set to a distance 0.11 times the free space wavelength $\lambda_L$ at the lower limit frequency $f_L$ of the operating frequency band. A characteristic relationship C1 indicates a relationship between the active reflection coefficient and the normalized frequency of the array antenna configuration (A), and a characteristic relationship C2 indicates a relationship between the active reflection coefficient and the normalized frequency of the array antenna configuration (B). A characteristic relationship C3 indicates a relationship between the active reflection coefficient and the normalized frequency of the array antenna configuration (C), and a characteristic relationship C4 indicates a relationship between the active reflection coefficient and the normalized frequency of the array antenna configuration (D).

As indicated by the characteristic relationship C1, in the array antenna configuration (A), favorable characteristics in which the total element average value of the active reflection coefficients is −10 dB or less can be achieved up to the low frequency of the normalized frequency of 1.0. On the other hand, as indicated by the characteristic relationship C2, in the array antenna configuration (B), the total element average value of the active reflection coefficients deteriorates to about −4 dB at the low frequency of the normalized frequency of 1.0. On the other hand, as indicated by the characteristic relationships C3 and C4, in the array antenna configuration (D) of the array antenna device 1B, similarly to the array antenna configuration (C), the total element average value of the active reflection coefficients up to the low frequency with the normalized frequency of 1.0 is improved to about −10 dB or less.

Next, a modification of the array antenna device 1B will be described.

Figure 18:
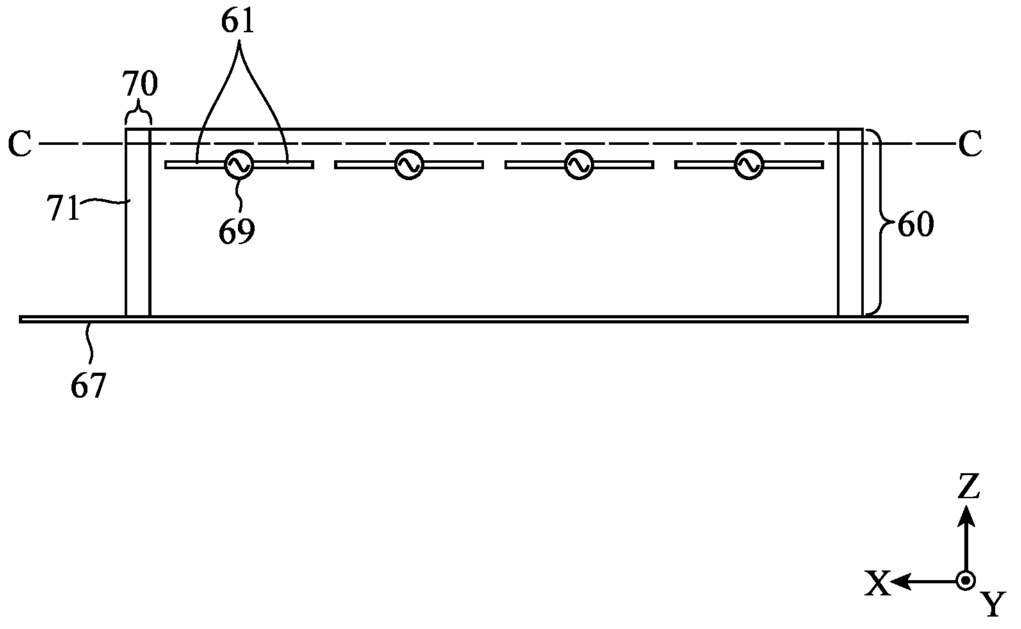
FIG. 18 is a side view illustrating a first modification of the array antenna device according to the third embodiment when viewed from the +Y direction.
Figure 19:
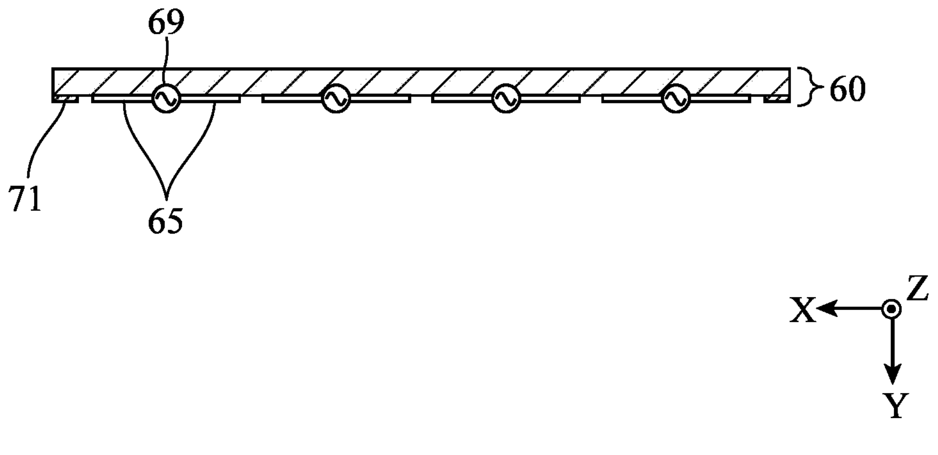
FIG. 19 is a cross-sectional view illustrating a cross section taken along line C-C of the first modification of the array antenna device according to the third embodiment when viewed from the +Z direction.

FIG. 18 is a side view illustrating a first modification of the array antenna device 1B, and illustrates a view of the antenna substrate 60 included in the first modification of the array antenna device 1B as viewed from the +Y direction. Furthermore, FIG. 19 is a cross-sectional view illustrating a cross section of the antenna substrate 60 of the first modification of the array antenna device 1B taken along line C-C illustrated in FIG. 18, illustrating a cross section of the antenna substrate 60 viewed from the +Z direction. As illustrated in FIGS. 18 and 19, the conductor wall 70 may be only the copper foil 71. The antenna substrate 60 is a substrate on which a dipole element pair 61 that is an element antenna is provided.

Power is fed to the dipole element pair 61 by a power feeding unit 69. The power feeding unit 69 may include the microstrip line 62, the matching stub 63, and the parallel two-wire line 64 illustrated in FIGS. 13 and 14. Also in the first modification of the array antenna device 1B configured as described above, since no gap is generated between the element antenna array and the conductor wall 70 in each of the plurality of antenna substrates 60, deterioration of impedance characteristics due to the gap between the element antenna array and the metal plate can be prevented.

Figure 20:
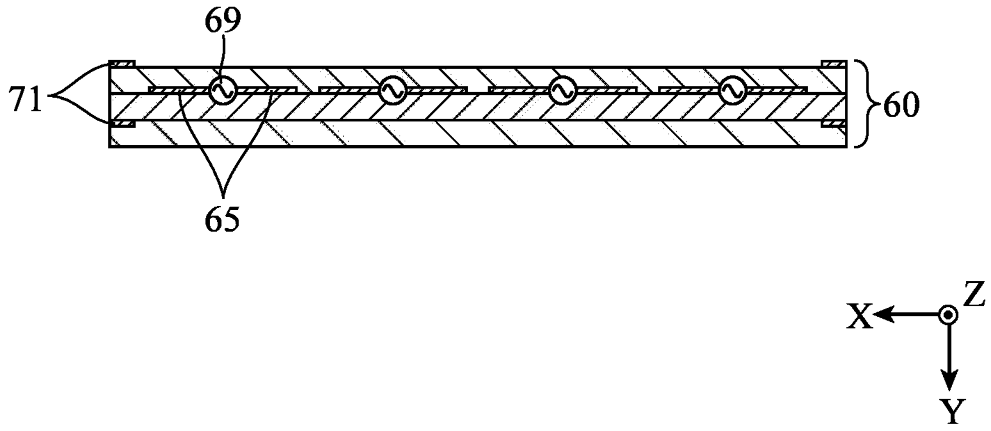
FIG. 20 is a cross-sectional view illustrating a cross section taken along line C-C of a second modification of the array antenna device according to the third embodiment when viewed from the +Z direction.

FIG. 20 is a cross-sectional view illustrating a cross section of the second modification of the array antenna device 1B taken along line C-C illustrated in FIG. 18, and illustrates a cross-sectional view of the antenna substrate 60 included in a second modification of the array antenna device 1B as viewed from the +Z direction. As illustrated in FIG. 20, the antenna substrate 60 is a substrate on which the dipole element pair 61 as an element antenna is provided, and is a substrate on which a plurality of dielectrics are stacked. The copper foil 71 functioning as the conductor wall 70 is formed in at least one dielectric layer among a plurality of stacked dielectric layers in the antenna substrate 60. Also in the second modification of the array antenna device 1B configured as described above, since no gap is generated between the element antenna array and the conductor wall 70 in each of the plurality of antenna substrates 60, deterioration of impedance characteristics due to the gap between the element antenna array and the metal plate can be prevented.

Figure 21:
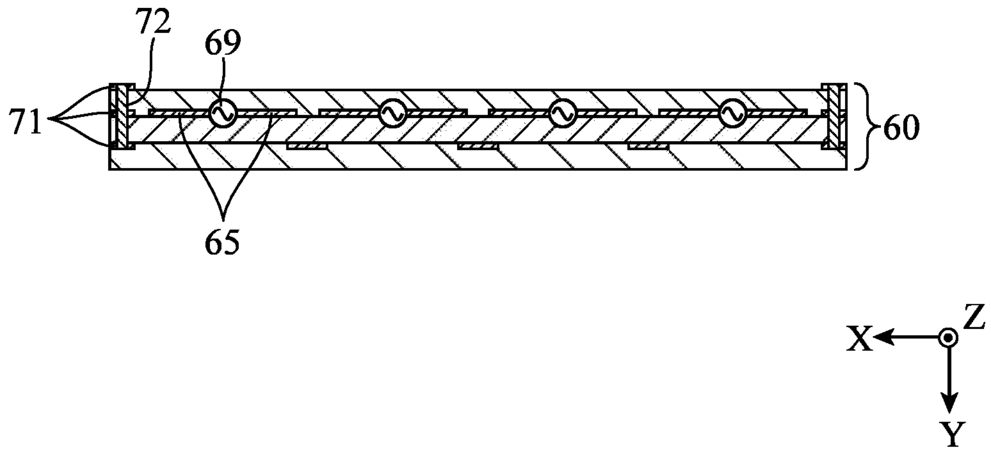
FIG. 21 is a cross-sectional view illustrating a cross section taken along line C-C of a third modification of the array antenna device according to the third embodiment when viewed from the +Z direction.

FIG. 21 is a cross-sectional view illustrating a cross section of the antenna substrate 60 included in the third modification of the array antenna device 1B taken along line C-C illustrated in FIG. 18, and illustrates a cross-sectional view of the antenna substrate 60 included in the third modification of the array antenna device 1B as viewed from the +Z direction. As illustrated in FIG. 21, the antenna substrate 60 is a substrate on which the dipole element pair 61 as an element antenna is provided, and is a substrate on which a plurality of dielectrics are stacked. The copper foil 71 functioning as the conductor wall 70 is formed on two or more dielectric layers among a plurality of stacked dielectric layers in the antenna substrate 60. Further, at least one through hole 72 for electrically connecting and short-circuiting the copper foils 71 formed in two or more dielectric layers is provided. Also in the third modification of the array antenna device 1B configured as described above, since no gap is generated between the element antenna array and the conductor wall 70 in each of the plurality of antenna substrates 60, deterioration of impedance characteristics due to the gap between the element antenna array and the metal plate can be prevented.

Figure 22:
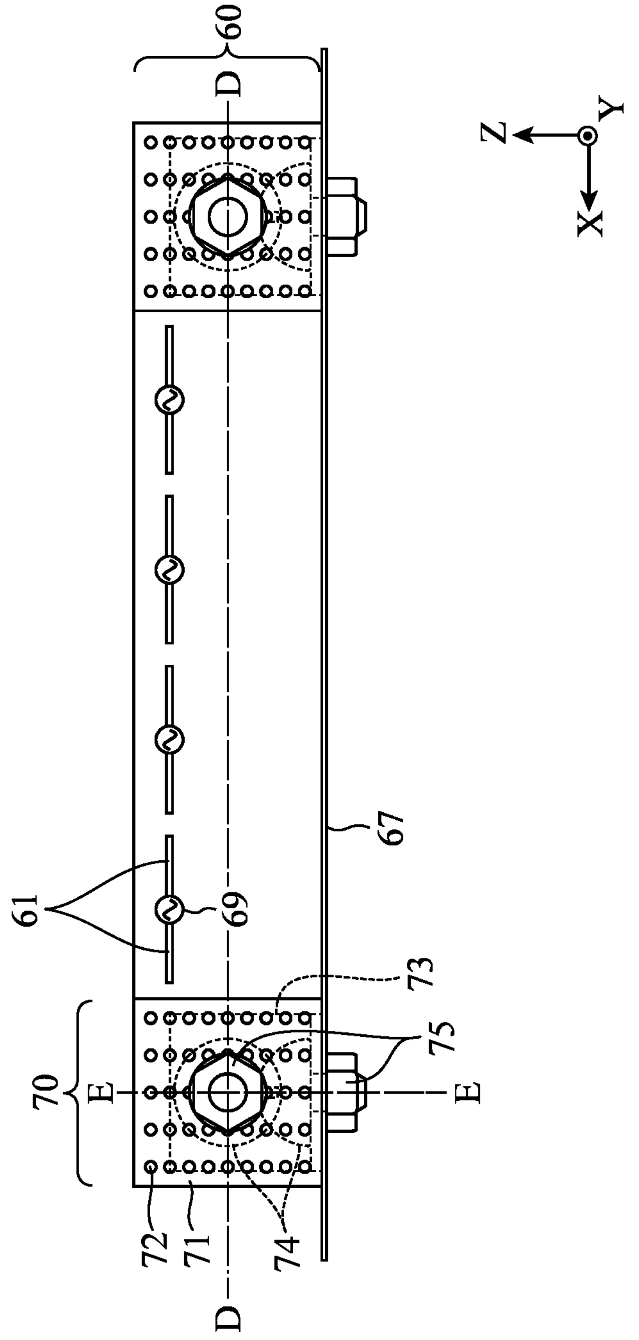
FIG. 22 is a side view illustrating a fourth modification of the array antenna device according to the third embodiment when viewed from the +Y direction.
Figure 23:
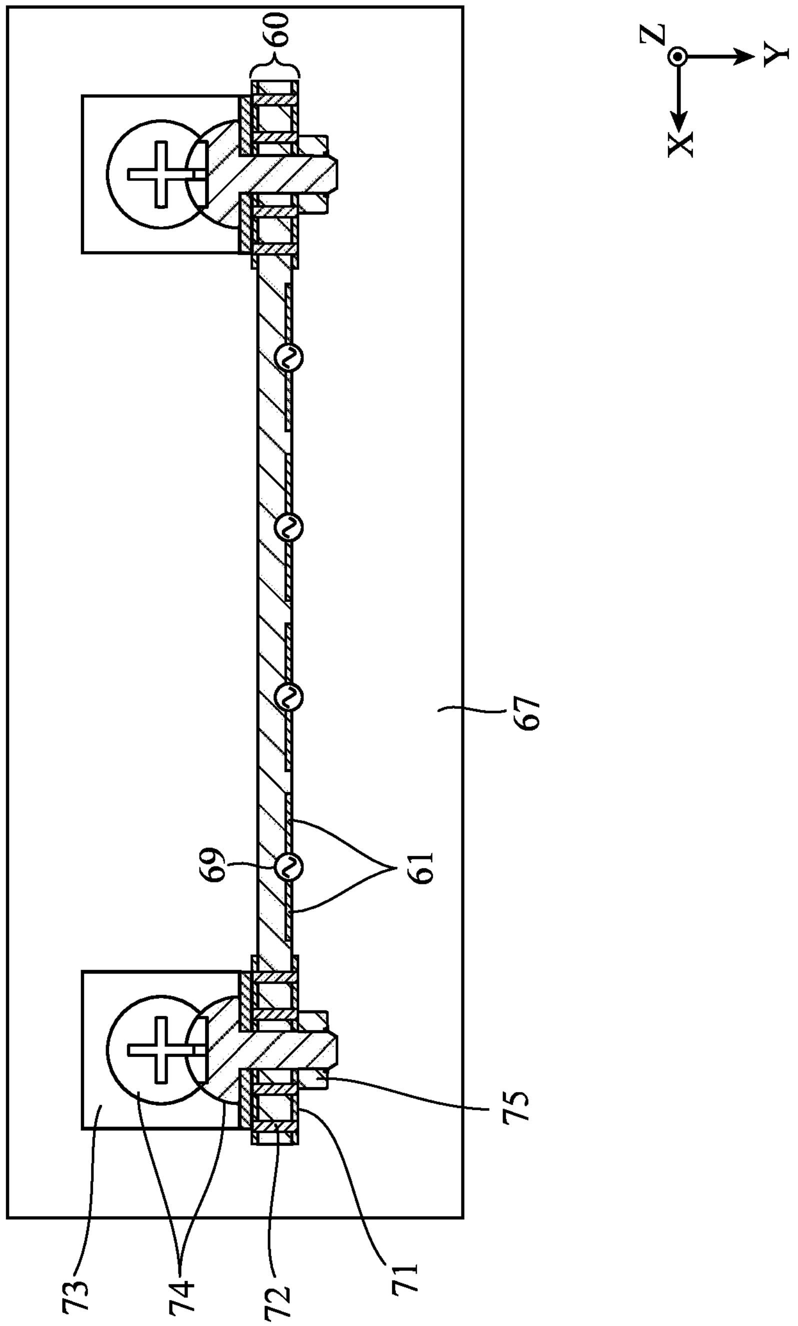
FIG. 23 is a cross-sectional view illustrating a cross section taken along line D-D of a fourth modification of the array antenna device according to the third embodiment when viewed from the +Z direction.

FIG. 22 is a side view illustrating a fourth modification of the array antenna device 1B, and illustrates a view of the antenna substrate 60 included in the fourth modification of the array antenna device 1B as viewed from the +Y direction. FIG. 23 is a cross-sectional view illustrating a cross section taken along line D-D of the fourth modification of the array antenna device 1B viewed from the +Z direction, and illustrates a cross-sectional view of the fourth modification of the array antenna device 1B viewed from the +Z direction. Furthermore, FIG. 24 is a cross-sectional view illustrating a cross section of the fourth modification of the array antenna device 1B taken along line E-E, and illustrates a cross-sectional view of the antenna substrate 60 included in the fourth modification of the array antenna device 1B as viewed from the +X direction.

Figure 24:
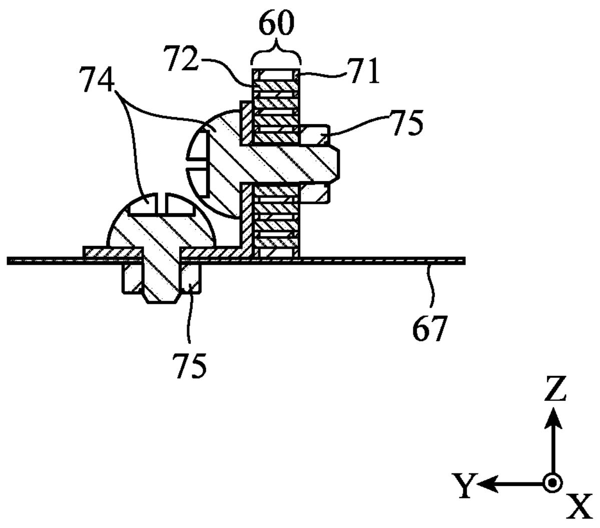
FIG. 24 is a cross-sectional view illustrating a cross section taken along line E-E of the fourth modification of the array antenna device according to the third embodiment when viewed from the +X direction.

As illustrated in FIGS. 22, 23, and 24, the fourth modification of the array antenna device 1B includes an antenna substrate 60 which is a substrate on which an element antenna is provided, a ground plate 67, an L-shaped metal fitting 73, a screw 74, and a nut 75. In addition, in FIGS. 22, 23, and 24, illustration of the dielectric substrate 68 is omitted. That is, the antenna substrate 60 is sandwiched between the ground plate 67 and the dielectric substrate 68. The metal fitting 73 is an L-shaped fixing member that fixes the antenna substrate 60 onto the ground plate 67 and short-circuits the conductor wall 70.

For example, the metal fitting 73 is provided with a through screw hole, and the ground plate 67 and the conductor wall 70 are also provided with screw holes. The screw hole of the metal fitting 73 is arranged to align with the screw holes of the ground plate 67 and the conductor wall 70. Then, the screw 74 is passed through the screw hole and fixed by the nut 75. As a result, the conductor wall 70 is short-circuited via the metal fitting 73. Also in the fourth modification of the array antenna device 1B configured as described above, since no gap is generated between the element antenna array and the conductor wall 70 in each of the plurality of antenna substrates 60, deterioration of impedance characteristics due to the gap between the element antenna array and the metal plate can be prevented.

Figure 25:
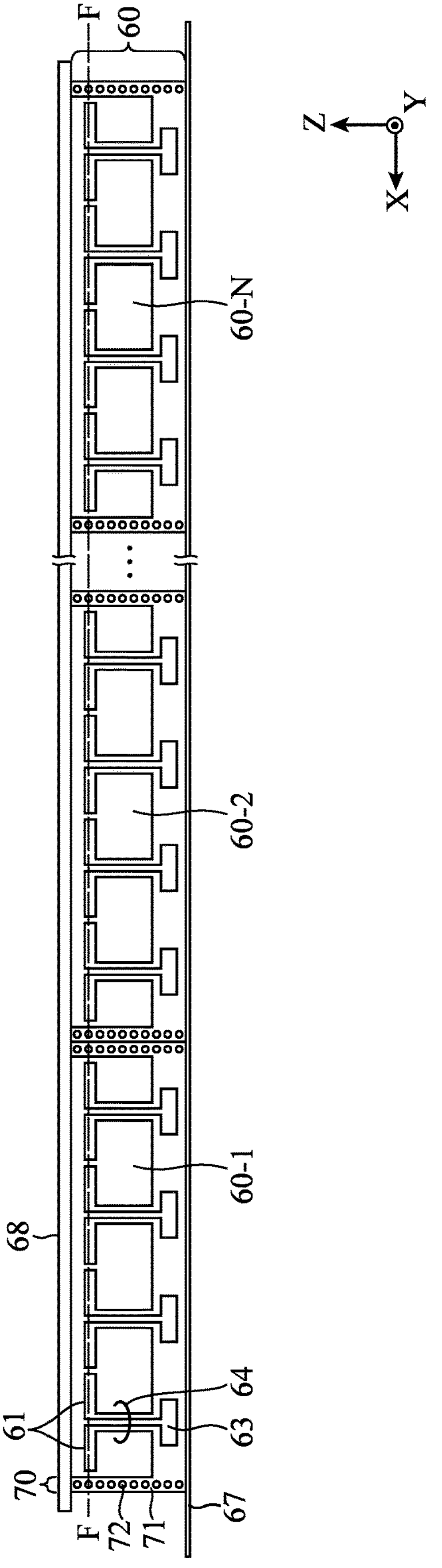
FIG. 25 is a side view illustrating a fifth modification of the array antenna device according to the third embodiment when viewed from the +Y direction.
Figure 26:
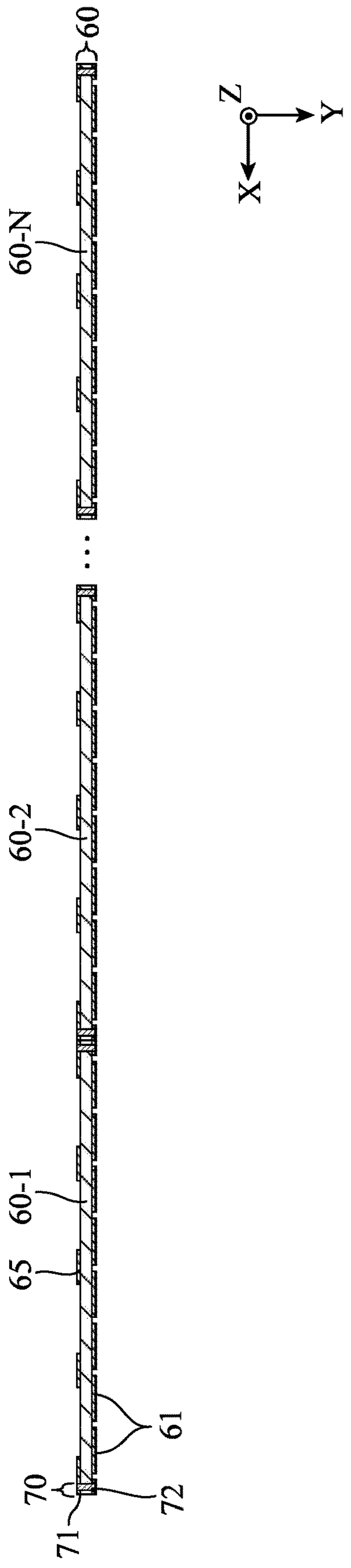
FIG. 26 is a cross-sectional view illustrating a cross section taken along line F-F of the fifth modification of the array antenna device according to the third embodiment when viewed from the +Z direction.

FIG. 25 is a side view illustrating a fifth modification of the array antenna device 1B, and illustrates a view of the antenna substrate 60 included in the fifth modification of the array antenna device 1B as viewed from the +Y direction. Furthermore, FIG. 26 is a cross-sectional view illustrating a cross section of the fifth modification of the array antenna device 1B taken along line C-C, and illustrates a cross-sectional view of the antenna substrate 60 included in the fifth modification of the array antenna device 1B as viewed from the +Z direction. In FIGS. 25 and 26, a plurality of antenna substrates 60 included in the fifth modification of the array antenna device 1B are arranged in such a way that the plurality of antenna substrates 60-1, 60-2, . . . , and 60-N are coupled in one direction. Here, N is a natural number of 2 or more.

Each of the antenna substrates 60-1, 60-2, . . . , and 60-N is provided with an element antenna array in which two or more dipole element pairs 61 as element antennas are arranged. In the antenna substrate 60 illustrated in FIGS. 25 and 26, the conductor wall 70 is provided for each element antenna array. Since the fifth modification of the array antenna device 1B is configured as described above, a mirror image effect can be obtained in the element antenna array in units of substrates. In addition, in the fifth modification of the array antenna device 1B, since no gap is generated between the element antenna array and the conductor wall 70 in each of the plurality of antenna substrates 60-1, 60-2, . . . , and 60-N, deterioration of impedance characteristics due to the gap between the element antenna array and the metal plate can be prevented.

In the first embodiment, the second embodiment, and the third embodiment, the element antennas included in the array antenna device may be as follows.

Figure 27:
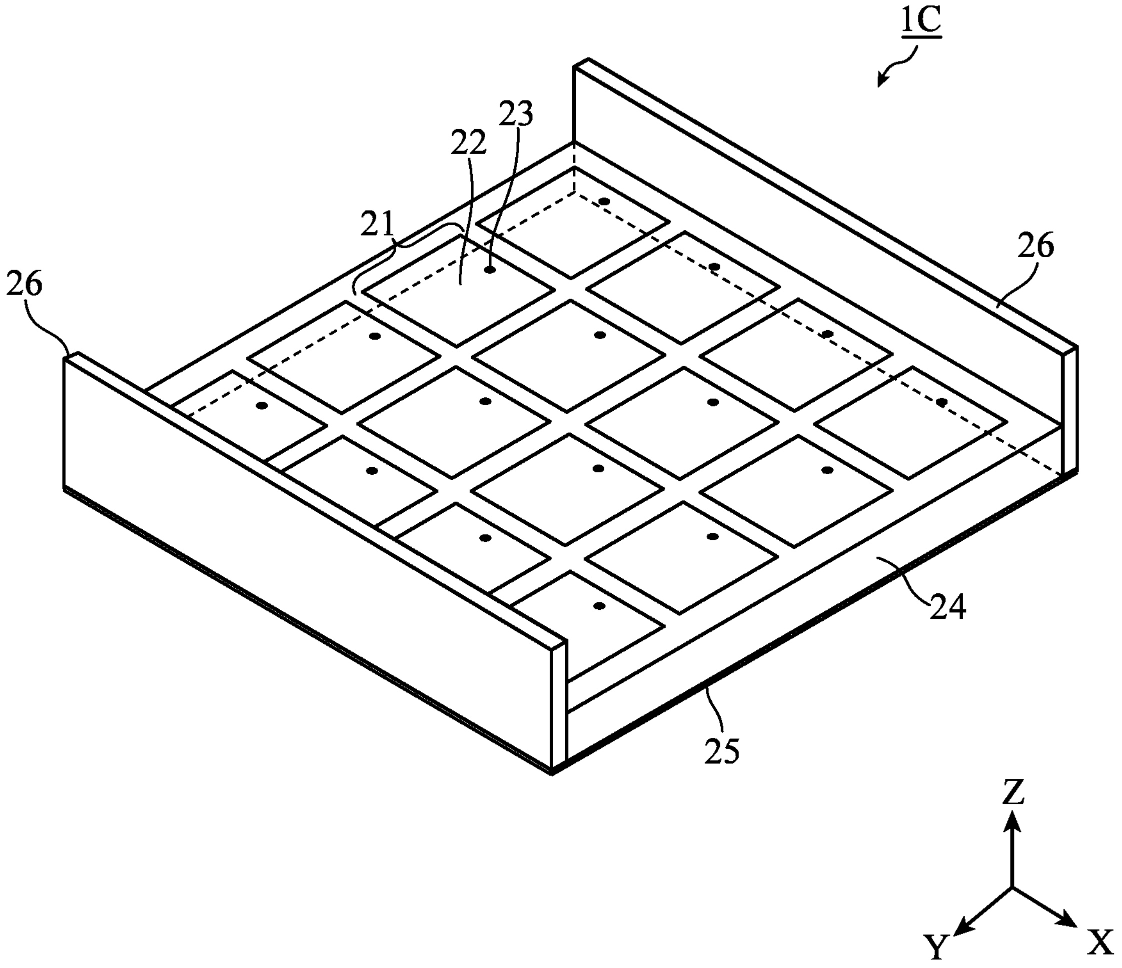
FIG. 27 is a perspective view illustrating an array antenna device in which an element antenna is a patch antenna.

FIG. 27 is a perspective view illustrating an array antenna device 1C in which element antennas are patch antennas 21. As illustrated in FIG. 27, the array antenna device 1C includes a plurality of patch antennas 21. The patch antenna 21 is an element antenna constituting the array antenna device 1C, and includes a patch element 22 and a power feeding unit 23. Furthermore, the array antenna device 1C includes a dielectric substrate 24. As illustrated in FIG. 27, the patch element 22 is a metal thin film provided on the dielectric substrate 24. The power feeding unit 23 feeds power to the patch element 22. In the dielectric substrate 24, a ground plate 25 is provided on one surface, and the patch element 22 is provided on a surface opposite to the surface on which the ground plate 25 is provided.

The plurality of patch antennas 21 are provided on a surface parallel to the X-Y plane of the XYZ coordinates. The ground plate 25 provided on one surface of the dielectric substrate 24 parallel to the X-Y plane is a conductor plate that functions as a common reflector for the plurality of patch antennas 21, and forms a ground potential of the array antenna device 1C. A metal plate 26 is provided on a surface parallel to the Z-X plane of the ground plate 25. The main radiation direction in the array antenna device 1C is the +Z direction. The radio wave fed to the patch element 22 by the power feeding unit 23 is radiated to free space through the patch element 22, the ground plate 25, and the metal plate 26.

The plurality of patch antennas 21 are provided on the ground plate 25 with the dielectric substrate 24 interposed therebetween, and constitute an "element antenna array" linearly arranged along the electric field direction (Y direction). As illustrated in FIG. 27, the metal plate 26 is a flat-plate shaped conductor member having a height H from the ground plate 25 higher than the position where the patch antennas 21 are provided in the dielectric substrate 24, and is provided at both ends in the element antenna array along the arrangement direction of the patch antennas 21. That is, as shown in FIG. 27, the metal plate 26 is orthogonal to the electric field direction (Y direction) of the antenna aperture formed in the element antenna array, and is orthogonal to the ground plate 25.

A mirror image of the element antenna array is formed on both sides of the real image by the metal plate 26 having a height higher than that of the patch antenna 21. Since the array antenna device 1C is an array antenna having an antenna aperture length larger than the antenna aperture length of the real image by the antenna aperture length of the mirror image, impedance matching can be achieved on the low frequency side (long wavelength side) of the operating frequency band.

In addition, the metal plate 26 has a flat plate shape elongated in the X direction, and is provided one by one at both ends along the arrangement direction of the patch antennas 21 in the plurality of element antenna arrays (four element antenna arrays in FIG. 27). That is, the common metal plate 26 is provided at both ends of the antenna aperture formed in each of the plurality of element antenna arrays. A mirror image is formed next to the real image of each of the plurality of element antenna arrays by the common metal plate 26. Since the aperture larger than the actual antenna aperture is virtually formed, impedance matching can be achieved on the low frequency side of the operating frequency band. As a result, the array antenna device 1C can improve the reflection characteristics on the low frequency side of the operating frequency band even if the antenna aperture is small.

Figure 28:
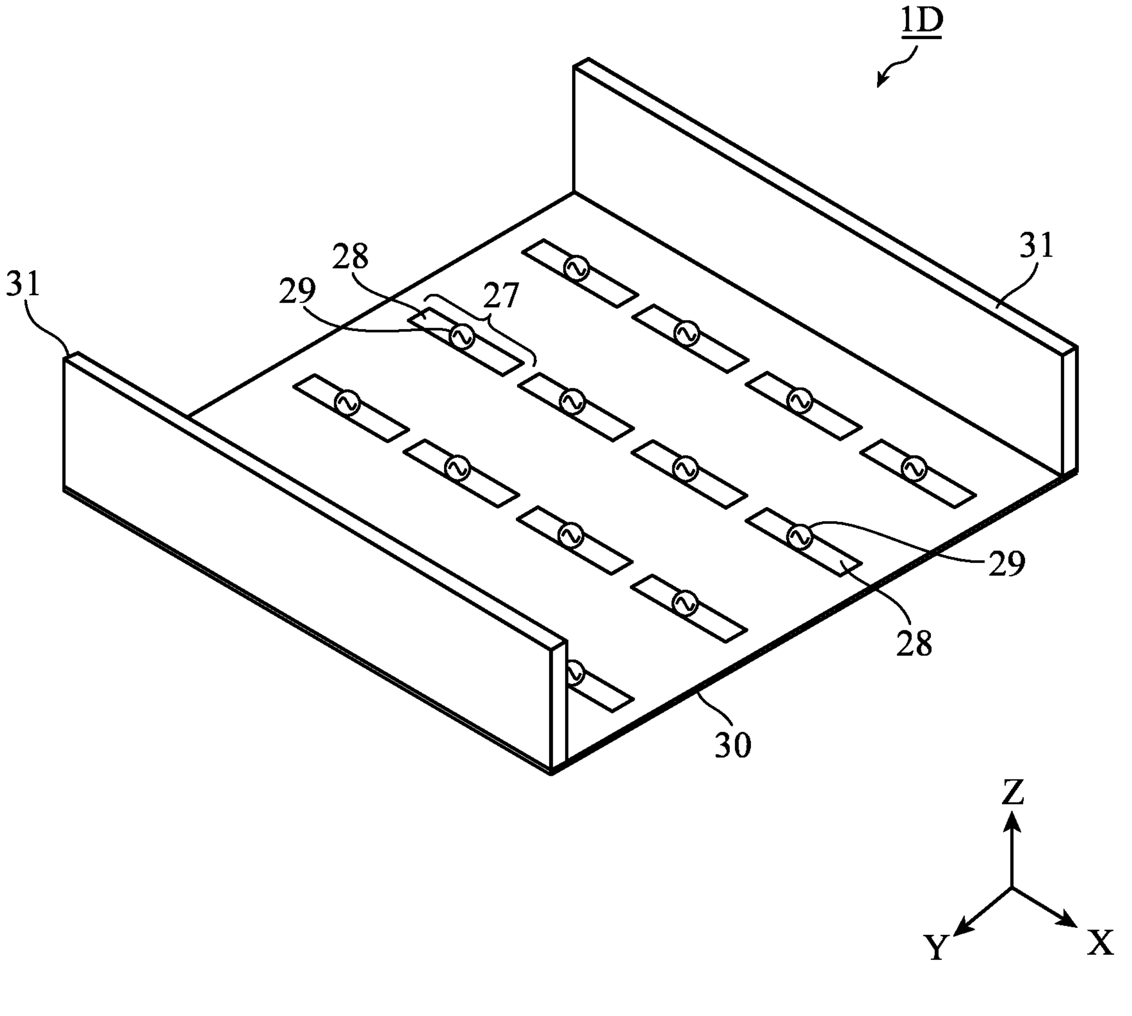
FIG. 28 is a perspective view illustrating an array antenna device in which an element antenna is a slot antenna.

FIG. 28 is a perspective view illustrating an array antenna device 1D in which the element antenna is a slot antenna 27. As illustrated in FIG. 28, the array antenna device 1D includes a plurality of slot antennas 27. The slot antenna 27 is an element antenna constituting the array antenna device 1D, and includes a slot 28 and a power feeding unit 29. As shown in FIG. 28, the slot 28 is a slit provided in a ground plate 30. The power feeding unit 29 feeds power to the slot 28.

The plurality of slot antennas 27 are provided on a surface parallel to the X-Y plane of the XYZ coordinates. The ground plate 30 provided on one surface parallel to the X-Y plane is a conductor plate that functions as a common reflector for the plurality of slot antennas 27, and forms a ground potential of the array antenna device 1D. A metal plate 31 is provided on a surface parallel to the Z-X plane of the ground plate 30. The main radiation direction in the array antenna device 1D is the +Z direction. The radio wave fed to the slot 28 by the power feeding unit 29 is radiated to free space via the slot 28, the ground plate 30, and the metal plate 31.

The plurality of slot antennas 27 are provided on the ground plate 30, and constitute an "element antenna array" linearly arranged along the electric field direction (Y direction). As illustrated in FIG. 28, the metal plate 31 is a flat-plate shaped conductor member having a height H from the ground plate 30 higher than the position where the slot antenna 27 is provided, and is provided at both ends in the element antenna array along the arrangement direction of the slot antennas 27. That is, as shown in FIG. 28, the metal plate 31 is orthogonal to the electric field direction (Y direction) of the antenna aperture formed in the element antenna array, and is orthogonal to the ground plate 30.

A mirror image of the element antenna array is formed on both sides of the real image by the metal plate 31 having a height higher than that of the slot antenna 27. Since the array antenna device 1D is an array antenna having an antenna aperture length larger than the antenna aperture length of the real image by the antenna aperture length of the mirror image, impedance matching can be achieved on the low frequency side (long wavelength side) of the operating frequency band.

In addition, the metal plate 31 has a flat plate shape elongated in the X direction, and is provided one by one at both ends along the arrangement direction of the slot antennas 27 in the plurality of element antenna arrays (four element antenna arrays in FIG. 28). That is, the common metal plate 31 is provided at both ends of the antenna aperture formed in each of the plurality of element antenna arrays. A mirror image is formed next to the real image of each of the plurality of element antenna arrays by the common metal plate 31. Since the aperture larger than the actual antenna aperture is virtually formed, impedance matching can be achieved on the low frequency side of the operating frequency band. As a result, the array antenna device 1D can improve the reflection characteristics on the low frequency side of the operating frequency band even if the antenna aperture is small.

Figure 29:
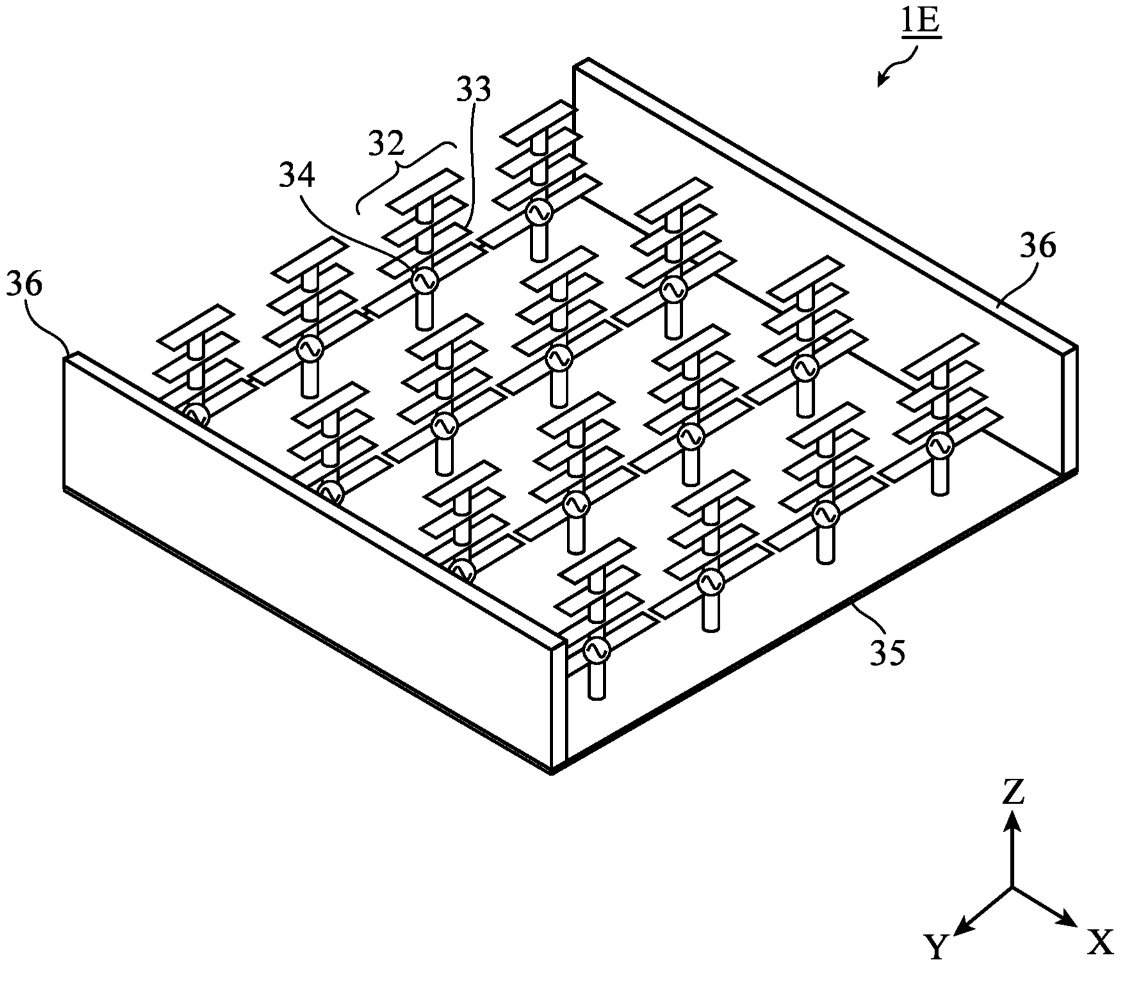
FIG. 29 is a perspective view illustrating an array antenna device in which an element antenna is a Yagi-Uda antenna.

FIG. 29 is a perspective view illustrating an array antenna device 1E in which the element antenna is a Yagi-Uda antenna 32. As illustrated in FIG. 29, the array antenna device 1E includes a plurality of Yagi-Uda antennas 32. The Yagi-Uda antenna 32 is an element antenna constituting the array antenna device 1E, and includes a radiation element 33 and a power feeding unit 34. As illustrated in FIG. 29, the radiation element 33 is provided on a ground plate 35. The power feeding unit 34 feeds power to the radiation element 33.

The plurality of Yagi-Uda antennas 32 are provided on a surface parallel to the X-Y plane of the XYZ coordinates illustrated in FIG. 29. The ground plate 35 provided on one surface parallel to the X-Y plane is a conductor plate that functions as a common reflector for the plurality of Yagi-Uda antennas 32, and forms a ground potential of the array antenna device 1E. A metal plate 36 is provided on a surface parallel to the Z-X plane of the ground plate 35. The main radiation direction in the array antenna device 1E is the +Z direction. The radio wave fed to the radiation element 33 by the power feeding unit 34 is radiated to free space through the radiation element 33, the ground plate 35, and the metal plate 36.

The plurality of Yagi-Uda antennas 32 are provided on the ground plate 35 and constitute an "element antenna array" linearly arranged along the electric field direction (Y direction). As illustrated in FIG. 29, the metal plate 36 is a flat-plate shaped conductor member having a height H from the ground plate 35 higher than that of the YAGI-UDA antenna 32, and is provided at both ends in the element antenna array along the arrangement direction of the YAGI-UDA antennas 32. That is, as shown in FIG. 29, the metal plate 36 is orthogonal to the electric field direction (Y direction) of the antenna aperture formed in the element antenna array, and is orthogonal to the ground plate 35.

A mirror image of the element antenna array is formed on both sides of the real image by the metal plate 36 having a height higher than that of the YAGI-UDA antenna 32. Since the array antenna device 1E is an array antenna having an antenna aperture length larger than the antenna aperture length of the real image by the antenna aperture length of the mirror image, impedance matching can be achieved on the low frequency side (long wavelength side) of the operating frequency band.

In addition, the metal plate 36 has a flat plate shape elongated in the X direction, and is provided one by one at both ends along the arrangement direction of the Yagi-Uda antennas 32 in the plurality of element antenna arrays (four element antenna arrays in FIG. 29). That is, the common metal plate 36 is provided at both ends of the antenna aperture formed in each of the plurality of element antenna arrays. A mirror image is formed next to the real image of each of the plurality of element antenna arrays by the common metal plate 36. Since the aperture larger than the actual antenna aperture is virtually formed, impedance matching can be achieved on the low frequency side of the operating frequency band. As a result, the array antenna device 1E can improve the reflection characteristics on the low frequency side of the operating frequency band even if the antenna aperture is small.

Figure 30:
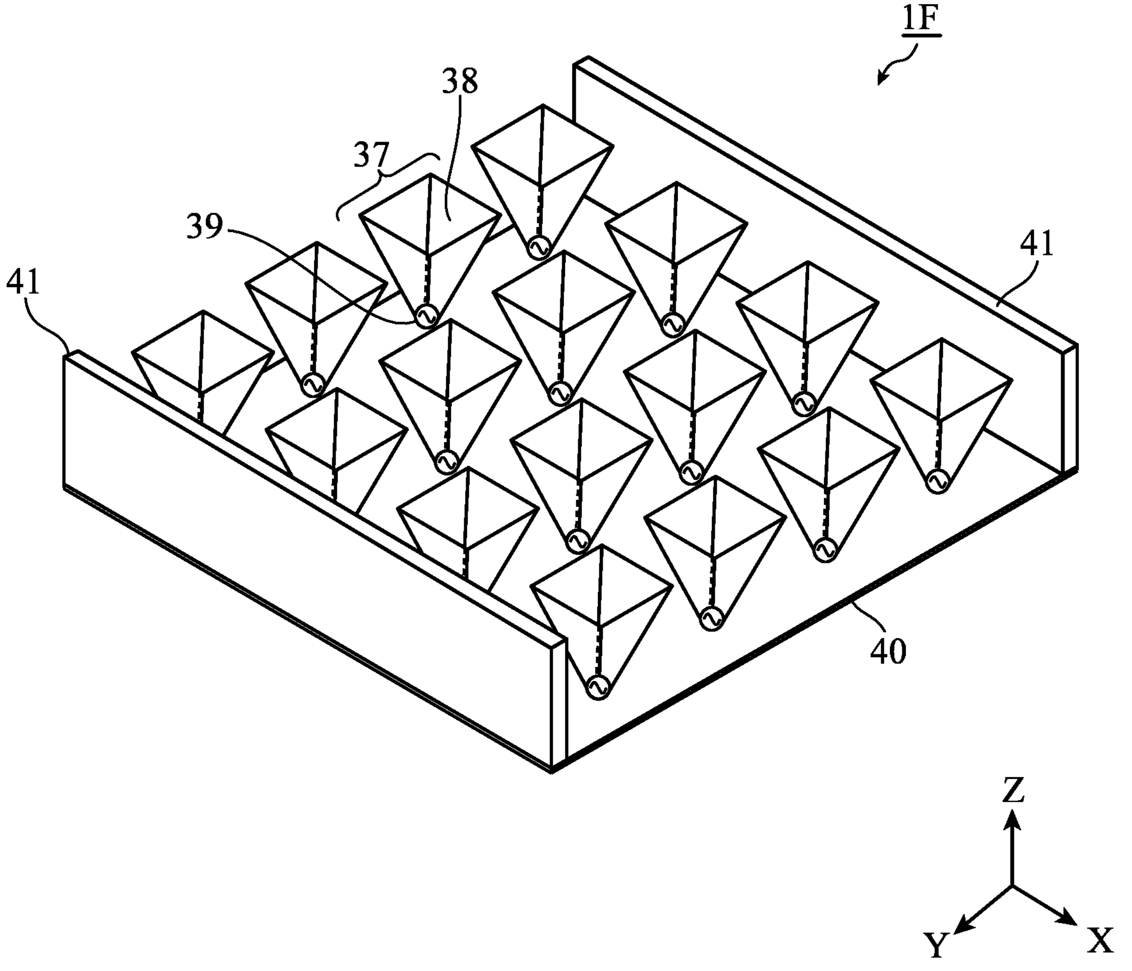
FIG. 30 is a perspective view illustrating an array antenna device in which an element antenna is a horn antenna.

FIG. 30 is a perspective view illustrating an array antenna device 1F in which the element antenna is a horn antenna 37. As illustrated in FIG. 30, the array antenna device 1F includes a plurality of horn antennas 37. The horn antenna 37 is an element antenna constituting the array antenna device 1F, and includes a horn element 38 and a power feeding unit 39. As illustrated in FIG. 30, the horn element 38 is provided on a ground plate 40. The power feeding unit 39 feeds power to the horn element 38.

The plurality of horn antennas 37 are provided on a surface parallel to the X-Y plane of the XYZ coordinates illustrated in FIG. 30. The ground plate 40 provided on one surface parallel to the X-Y plane is a conductor plate that functions as a common reflector for the plurality of horn antennas 37, and forms the ground potential of the array antenna device 1F. A metal plate 41 is provided on a surface parallel to the Z-X plane of the ground plate 40. The main radiation direction in the array antenna device 1F is the +Z direction. The radio wave fed to the horn element 38 by the power feeding unit 39 is radiated to free space via the horn element 38, the ground plate 40, and the metal plate 41.

The plurality of horn antennas 37 are provided on the ground plate 40 and constitute an "element antenna array" linearly arranged along the electric field direction (Y direction). As illustrated in FIG. 30, the metal plate 41 is a flat-plate shaped conductor member having a height H from the ground plate 40 higher than that of the horn antenna 37, and is provided at both ends in the element antenna array along the arrangement direction of the horn antennas 37. That is, as shown in FIG. 30, the metal plate 41 is orthogonal to the electric field direction (Y direction) of the antenna aperture formed in the element antenna array, and is orthogonal to the ground plate 40.

A mirror image of the element antenna array is formed on both sides of the real image by the metal plate 41 having a height higher than that of the horn antenna 37. Since the array antenna device 1F is an array antenna having an antenna aperture length larger than the antenna aperture length of the real image by the antenna aperture length of the mirror image, impedance matching can be achieved on the low frequency side (long wavelength side) of the operating frequency band.

In addition, the metal plate 41 has a flat plate shape elongated in the X direction, and is provided one by one at both ends along the arrangement direction of the horn antennas 37 in the plurality of element antenna arrays (four element antenna arrays in FIG. 30). That is, the common metal plate 41 is provided at both ends of the antenna aperture formed in each of the plurality of element antenna arrays. A mirror image is formed next to the real image of each of the plurality of element antenna arrays by the common metal plate 41. Since the aperture larger than the actual antenna aperture is virtually formed, impedance matching can be achieved on the low frequency side of the operating frequency band. As a result, the array antenna device 1F can improve the reflection characteristics on the low frequency side of the operating frequency band even if the antenna aperture is small.

Figure 31:
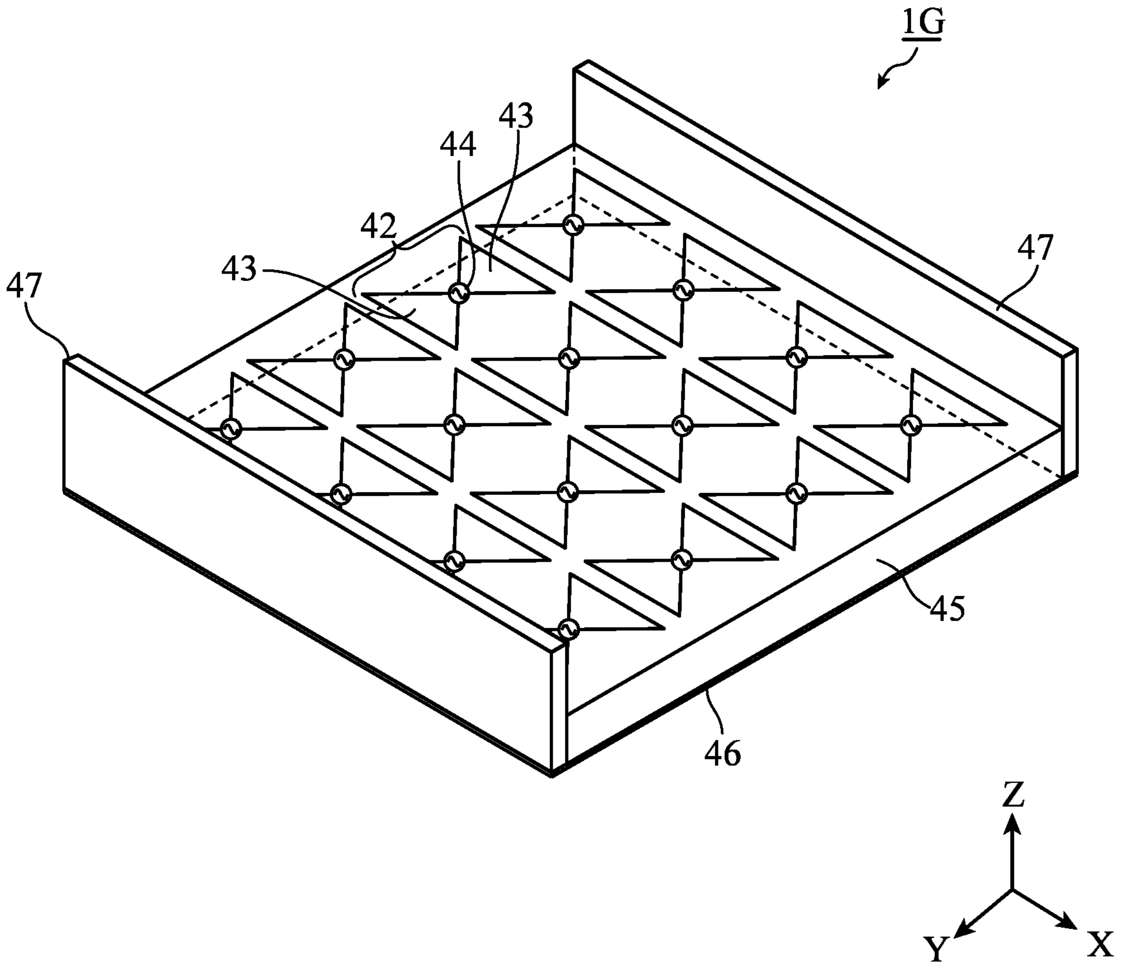
FIG. 31 is a perspective view illustrating an array antenna device in which an element antenna is a bowtie antenna.

FIG. 31 is a perspective view illustrating an array antenna device 1G in which the element antenna is a bowtie antenna 42. As illustrated in FIG. 31, the array antenna device 1G includes a plurality of bowtie antennas 42. The bowtie antenna 42 is an element antenna constituting the array antenna device 1G, and includes a conductor element 43 and a power feeding unit 44. Furthermore, the array antenna device 1G includes a dielectric substrate 45. As illustrated in FIG. 31, the conductor element 43 is a metal thin film provided on the dielectric substrate 45. The power feeding unit 44 feeds power to the conductor element 43. In the dielectric substrate 45, a ground plate 46 is provided on one surface, and the conductor element 43 is provided on a surface opposite to the surface on which the ground plate 46 is provided.

The plurality of bowtie antennas 42 are provided on a surface parallel to the X-Y plane of the XYZ coordinates illustrated in FIG. 31. The ground plate 46 provided on one surface of the dielectric substrate 45 parallel to the X-Y plane is a conductor plate that functions as a common reflector for the plurality of bowtie antennas 42, and forms a ground potential of the array antenna device 1G. A metal plate 47 is provided on a surface parallel to the Z-X plane of the ground plate 46. The main radiation direction in the array antenna device 1G is the +Z direction. The radio wave fed to the conductor element 43 by the power feeding unit 44 is radiated to free space via the conductor element 43, the ground plate 46, and the metal plate 47.

The plurality of bowtie antennas 42 are provided on the ground plate 46 with the dielectric substrate 45 interposed therebetween, and constitute an "element antenna array" linearly arranged along the electric field direction (Y direction). As illustrated in FIG. 31, the metal plate 47 is a flat-plate shaped conductor member having a height H from the ground plate 46 higher than the position where the bowtie antenna 42 is provided in the dielectric substrate 45, and is provided at both ends in the element antenna array along the arrangement direction of the bowtie antennas 42. That is, as shown in FIG. 31, the metal plate 47 is orthogonal to the electric field direction (Y direction) of the antenna aperture formed in the element antenna array, and is orthogonal to the ground plate 46.

A mirror image of the element antenna array is formed on both sides of the real image by the metal plate 47 having a height higher than that of the bowtie antenna 42. Since the array antenna device 1G is an array antenna having an antenna aperture length larger than the antenna aperture length of the real image by the antenna aperture length of the mirror image, impedance matching can be achieved on the low frequency side (long wavelength side) of the operating frequency band.

In addition, the metal plate 47 has a flat plate shape elongated in the X direction, and is provided one by one at both ends along the arrangement direction of the bowtie antennas 42 in the plurality of element antenna arrays (four element antenna arrays in FIG. 31). That is, the common metal plate 47 is provided at both ends of the antenna aperture formed in each of the plurality of element antenna arrays. A mirror image is formed next to the real image of each of the plurality of element antenna arrays by the common metal plate 47. Since the aperture larger than the actual antenna aperture is virtually formed, impedance matching can be achieved on the low frequency side of the operating frequency band. As a result, the array antenna device 1G can improve the reflection characteristics on the low frequency side of the operating frequency band even if the antenna aperture is small.

Figure 32:
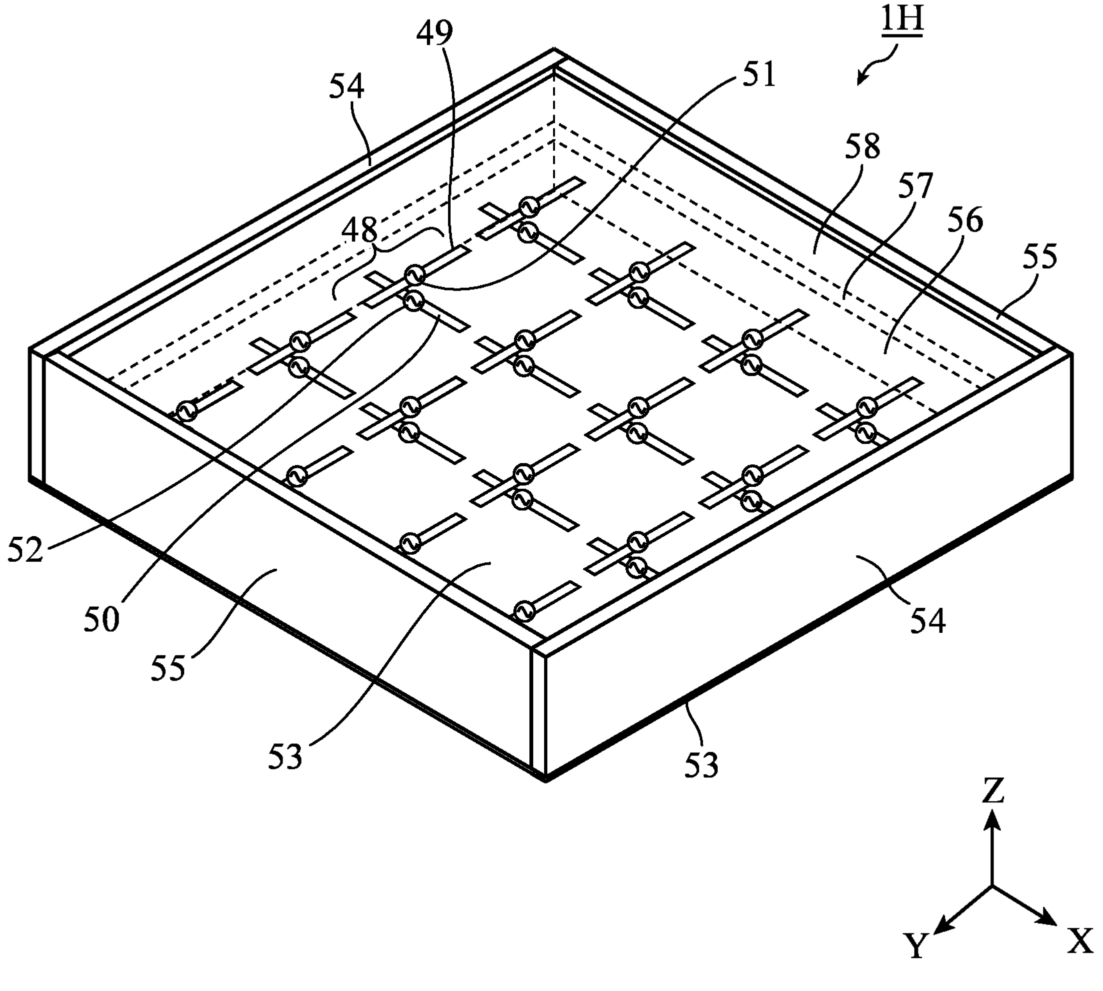
FIG. 32 is a perspective view illustrating an array antenna device in which an element antenna is an orthogonal dual-polarized antenna.

FIG. 32 is a perspective view illustrating an array antenna device 1H in which the element antenna is an orthogonal dual-polarized antenna 48. In FIG. 32, the array antenna device 1H includes a plurality of orthogonal dual-polarized antennas 48. Furthermore, the orthogonal dual-polarized antenna 48 is an element antenna constituting the array antenna device 1H, and includes a pair of first polarization elements 49, a pair of second polarization elements 50, a first power feeding unit 51, and a second power feeding unit 52.

The array antenna device 1H includes a dielectric substrate 56, a dielectric substrate 57, and a dielectric substrate 58. In FIG. 32, the dielectric substrate 56, the dielectric substrate 57, and the dielectric substrate 58 are illustrated in a transparent manner in order to make the components of the orthogonal dual-polarized antenna 48 visible. In the dielectric substrate 56, a ground plate 53 is provided on one surface, and the dielectric substrate 57 is stacked on a surface opposite to the surface on which the ground plate 53 is provided. The dielectric substrate 58 is further stacked on the dielectric substrate 57 in the Z direction.

The pair of first polarization elements 49 are linear metal thin films provided on the dielectric substrate 56. The first power feeding unit 51 feeds power to the first polarization element 49. The pair of second polarization elements 50 are linear metal thin films provided on a surface opposite to the surface on which the first polarization element 49 of the dielectric substrate 56 is provided. The second power feeding unit 52 feeds power to the second polarization element 50. When the first polarization element 49 and the second polarization element 50 are projected on the same plane, they are orthogonal to each other.

The plurality of orthogonal dual-polarized antennas 48 are provided on a surface parallel to the X-Y plane of the XYZ coordinates illustrated in FIG. 32. The ground plate 53 provided on one surface of the dielectric substrate 56 parallel to the X-Y plane is a conductor plate that functions as a common reflector for the plurality of orthogonal dual-polarized antennas 48, and forms the ground potential of the array antenna device 1H. The first metal plate 54 is provided on a surface parallel to the Z-Y plane, and the second metal plate 55 is provided on a surface parallel to the Z-X plane. The main radiation direction in the array antenna device 1H is the +Z direction. The radio wave fed to the first polarization element 49 by the first power feeding unit 51 is radiated to free space via the first polarization element 49, the ground plate 53, and the first metal plate 54. Further, the radio wave fed to the second polarization element 50 by the second power feeding unit 52 is radiated to free space via the second polarization element 50, the ground plate 53, and the second metal plate 55.

As illustrated in FIG. 32, the first metal plate 54 is a flat-plate shaped conductor member having a height H from the ground plate 53 higher than the position where the first polarization element 49 is provided in the dielectric substrate 56, and is provided at both ends in the element antenna array along the arrangement direction of the first polarization elements 49. The arrangement direction of the first polarization elements 49 is the electric field direction (X direction) of the antenna aperture formed in the element antenna array including the plurality of first polarization elements 49. That is, the first metal plate 54 is orthogonal to the electric field direction (X direction) of the antenna aperture formed in the element antenna array, and is orthogonal to the ground plate 53.

As illustrated in FIG. 32, the second metal plate 55 is a flat-plate shaped conductor member having a height H from the ground plate 53 higher than the position where the second polarization element 50 is provided in the dielectric substrate 56, and is provided at both ends in the element antenna array along the arrangement direction of the second polarization elements 50. The arrangement direction of the second polarization elements 50 is the electric field direction (Y direction) of the antenna aperture formed in the element antenna array including the plurality of second polarization elements 50. That is, the second metal plate 55 is orthogonal to the electric field direction (Y direction) of the antenna aperture formed in the element antenna array, and is orthogonal to the ground plate 53.

A mirror image of the element antenna array is formed on both sides of the real image by the metal plate 54 and the metal plate 55 having a height higher than that of the orthogonal dual-polarized antenna 48. Since the array antenna device 1H is an array antenna having an antenna aperture length larger than the antenna aperture length of the real image by the antenna aperture length of the mirror image, impedance matching can be achieved on the low frequency side (long wavelength side) of the operating frequency band in either polarization of the first polarization element 49 or the second polarization element 50.

In addition, the metal plate 54 has a flat plate shape elongated in the Y direction, and is provided one by one at both ends along the arrangement direction of the first polarization elements 49 in the plurality of element antenna arrays (four element antenna arrays constituted by the first polarization elements 49 in FIG. 32). That is, the common metal plate 54 is provided at both ends of the antenna aperture formed in each of the plurality of element antenna arrays. A mirror image is formed next to the real image of each of the plurality of element antenna arrays by the common metal plate 54. Similarly, in the four element antenna arrays constituted by the second polarization elements 50, a mirror image is formed next to the real image of each of the plurality of element antenna arrays by the common metal plate 55. Since the aperture larger than the actual antenna aperture is virtually formed, impedance matching can be achieved on the low frequency side of the operating frequency band. As a result, the array antenna device 1H can improve the reflection characteristics on the low frequency side of the operating frequency band even if the antenna aperture is small.

In the first embodiment, the second embodiment, and the third embodiment, the conductor member included in the array antenna device may be as follows.

Figure 33:
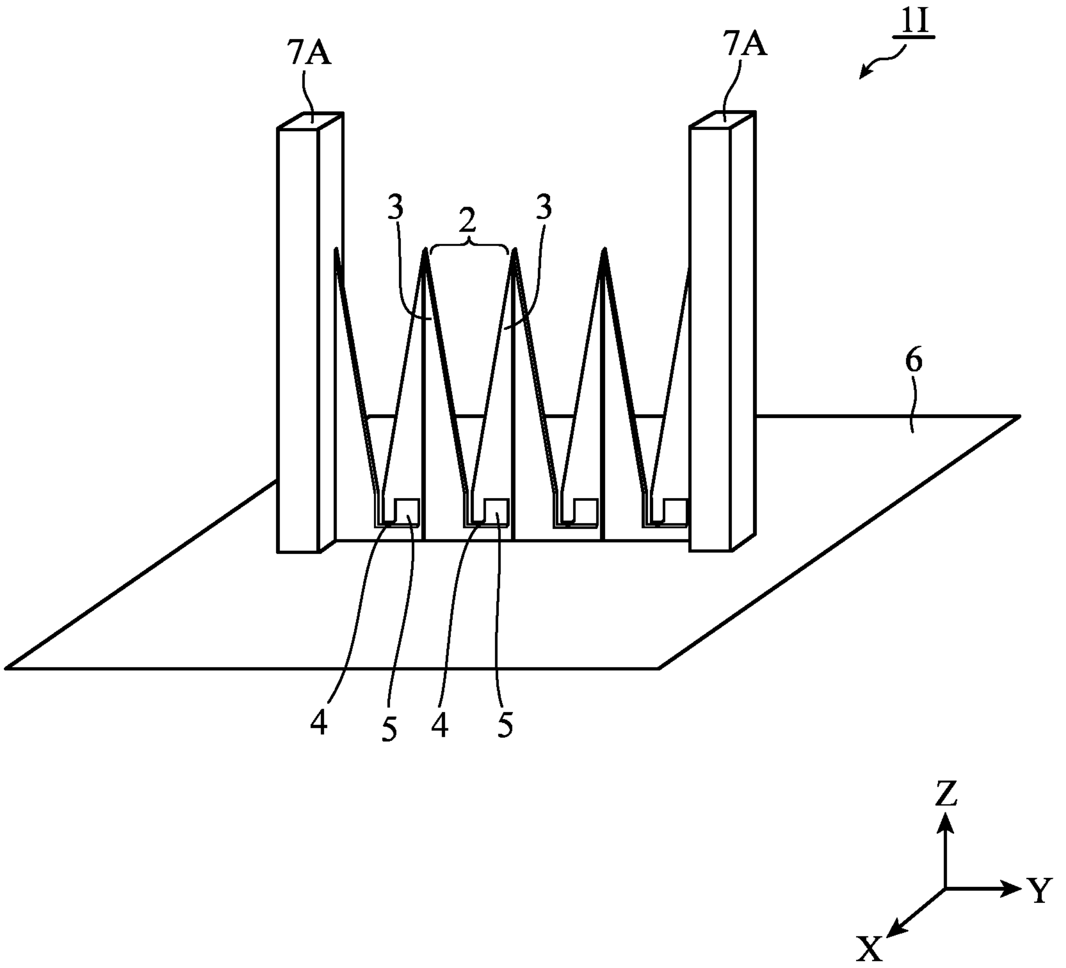
FIG. 33 is a perspective view illustrating an array antenna device including a quadrangular prism-shaped conductor member.

FIG. 33 is a perspective view illustrating an array antenna device 1I including a quadrangular prism-shaped conductor member 7A (Hereinafter, it is referred to as a quadrangular prism conductor member 7A.). In FIG. 33, the same components as those in FIG. 1 are denoted by the same reference numerals, and redundant description is omitted. The array antenna device 1I includes a plurality of tapered slot antennas 2. The tapered slot antenna 2 is an element antenna constituting the array antenna device 1I, and includes a pair of tapered conductor plates 3, a power feeding unit 4, and a matching stub 5.

As illustrated in FIG. 33, the quadrangular prism conductor member 7A is a quadrangular prism-shaped conductor member having a height H from the ground plate 6 higher than that of the tapered slot antenna 2, and is provided at both ends in the element antenna array along the arrangement direction of the tapered slot antennas 2. That is, the quadrangular prism conductor member 7A is orthogonal to the electric field direction of the antenna aperture formed in the element antenna array and orthogonal to the ground plate 6. The radio wave fed to the tapered conductor plate 3 by the power feeding unit 4 is radiated to free space via the tapered conductor plate 3, the ground plate 6, and the quadrangular prism conductor member 7A.

The height H (height in the Z direction) of the quadrangular prism conductor member 7A is a height that is an odd multiple of ¼ of the free space wavelength $\lambda_L$ at the lower limit frequency of the operating frequency band of the array antenna device 1I.

In the array antenna device 1I, a mirror image is electrically formed on both sides of a real image of the element antenna array by the quadrangular prism conductor member 7A having a height H higher than that of the tapered slot antenna 2.

Since the aperture larger than the actual antenna aperture is virtually formed, impedance matching can be achieved on the low frequency side of the operating frequency band. As a result, the array antenna device 1I can improve the reflection characteristics on the low frequency side of the operating frequency band even if the antenna aperture is small. Note that instead of the quadrangular prism conductor member 7A, a polygonal columnar conductor member including a triangular prism may be used.

Figure 34:
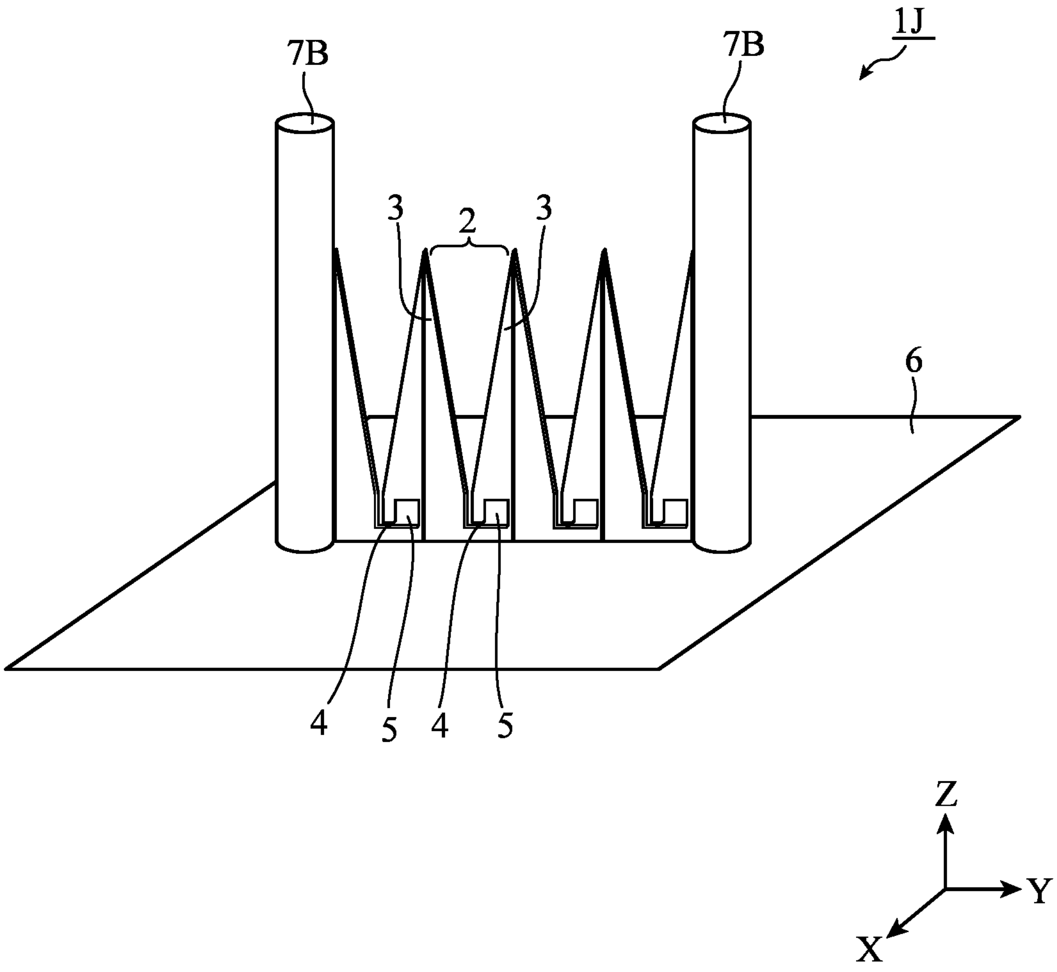
FIG. 34 is a perspective view illustrating an array antenna device including a cylindrical conductor member.

FIG. 34 is a perspective view illustrating an array antenna device 1J including a cylindrical conductor member 7B (Hereinafter, it is referred to as a cylindrical conductor member 7B.). In FIG. 34, the same components as those in FIG. 1 are denoted by the same reference numerals, and redundant description is omitted. The array antenna device 1J includes a plurality of tapered slot antennas 2. The tapered slot antenna 2 is an element antenna constituting the array antenna device 1J, and includes a pair of tapered conductor plates 3, a power feeding unit 4, and a matching stub 5.

As illustrated in FIG. 34, the cylindrical conductor member 7B is a cylindrical conductor member having a height H from the ground plate 6 higher than that of the tapered slot antenna 2, and is provided at both ends in the element antenna array along the arrangement direction of the tapered slot antennas 2. That is, the cylindrical conductor member 7B is orthogonal to the electric field direction of the antenna aperture formed in the element antenna array, and is orthogonal to the ground plate 6. The radio wave fed to the tapered conductor plate 3 by the power feeding unit 4 is radiated to free space via the tapered conductor plate 3, the ground plate 6, and the cylindrical conductor member 7B.

The height H (height in the Z direction) of the cylindrical conductor member 7B is, for example, higher than the tapered slot antenna 2 and is an odd multiple of ¼ of the free space wavelength at the lower limit frequency of the operating frequency band of the array antenna device 1J. In the array antenna device 1J, a mirror image is electrically formed on both sides of a real image of the element antenna array by the cylindrical conductor member 7B. Since the aperture larger than the actual antenna aperture is virtually formed, impedance matching can be achieved on the low frequency side of the operating frequency band. As a result, the array antenna device 1J can improve the reflection characteristics on the low frequency side of the operating frequency band even if the antenna aperture is small.

Figure 35:
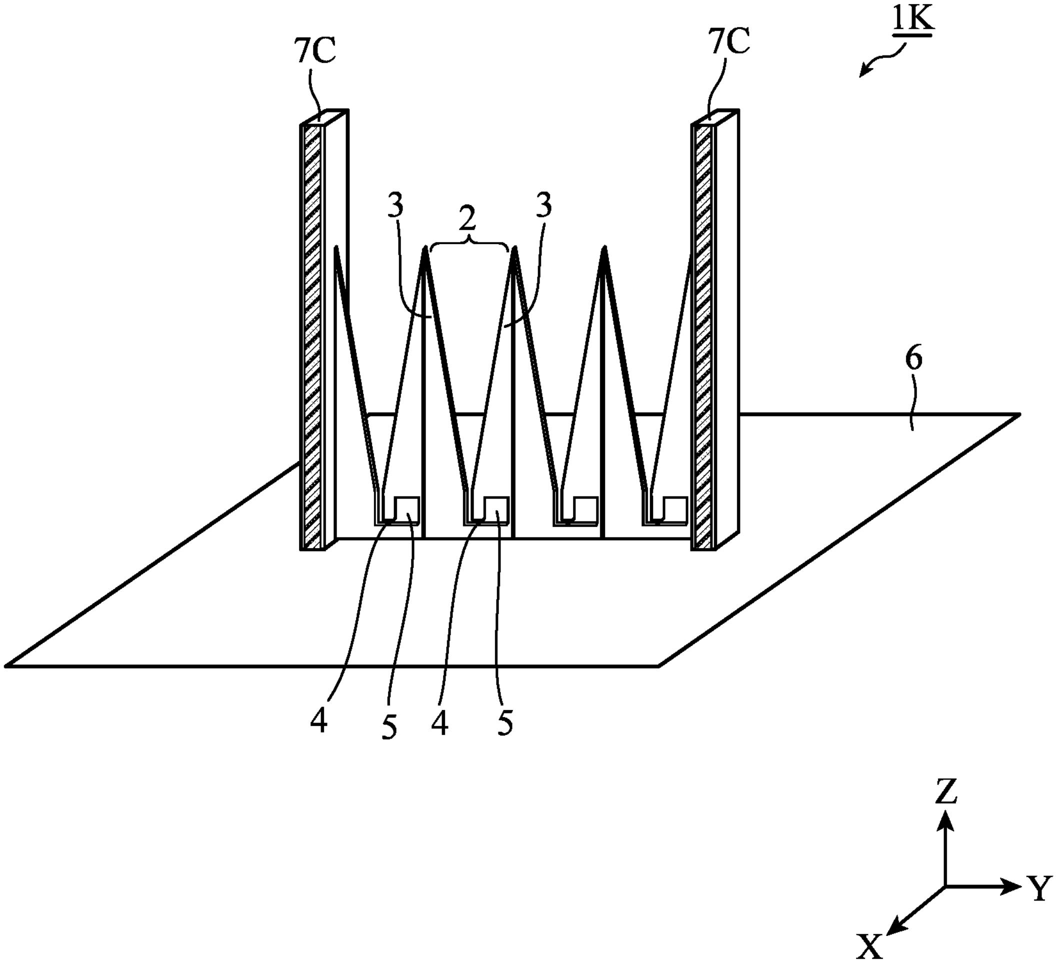
FIG. 35 is a perspective view illustrating an array antenna device including a conductor member made of a metal-plated resin member.

FIG. 35 is a perspective view illustrating an array antenna device 1K including a conductor member 7C (Hereinafter, it is referred to as a plated conductor member 7C.) made of a metal-plated resin member. In FIG. 35, the same components as those in FIG. 1 are denoted by the same reference numerals, and redundant description is omitted. The array antenna device 1K includes a plurality of tapered slot antennas 2. The tapered slot antenna 2 is an element antenna constituting the array antenna device 1K, and includes a pair of tapered conductor plates 3, a power feeding unit 4, and a matching stub 5.

The plated conductor member 7C is a conductor member in which a metal foil is provided on a surface of a flat-plate shaped resin member by metal plating or the like, and as shown in FIG. 35, the plated conductor member 7C is a member having a height from the ground plate 6 higher than that of the tapered slot antenna 2. Note that the plated conductor member 7C may be a polygonal columnar resin member including a triangular prism or a columnar resin member whose surface is metal-plated instead of the flat-plate shaped resin member.

The plated conductor member 7C is provided at both ends in the element antenna array along the arrangement direction of the tapered slot antennas 2, is orthogonal to the electric field direction of the antenna aperture formed in the element antenna array, and is orthogonal to the ground plate 6. The radio wave fed to the tapered conductor plate 3 by the power feeding unit 4 is radiated to free space via the tapered conductor plate 3, the ground plate 6, and the plated conductor member 7C.

The height H (height in the Z direction) of the plated conductor member 7C is an odd multiple of ¼ of the free space wavelength $\lambda_L$ at the lower limit frequency of the operating frequency band of the array antenna device 1K. In the array antenna device 1K, a mirror image is electrically formed on both sides of a real image of the element antenna array by the plated conductor member 7C having the height H higher than that of the tapered slot antenna 2.

Since the aperture larger than the actual antenna aperture is virtually formed, impedance matching can be achieved on the low frequency side of the operating frequency band. As a result, the array antenna device 1K can improve the reflection characteristics on the low frequency side of the operating frequency band even if the antenna aperture is small.

In the above description, the quadrangular prism conductor member 7A, the cylindrical conductor member 7B, and the plated conductor member 7C are provided instead of the metal plate 7 included in the array antenna device illustrated in FIG. 1, but the element antenna is not limited to the tapered slot antenna 2. For example, the quadrangular prism conductor member 7A, the cylindrical conductor member 7B, and the plated conductor member 7C may be provided in the array antenna device having the element antenna illustrated in FIGS. 7 and 27 to 32.

In the first embodiment, the second embodiment, and the third embodiment, the arrangement of the element antennas included in the array antenna device may be as follows.

Figure 36:
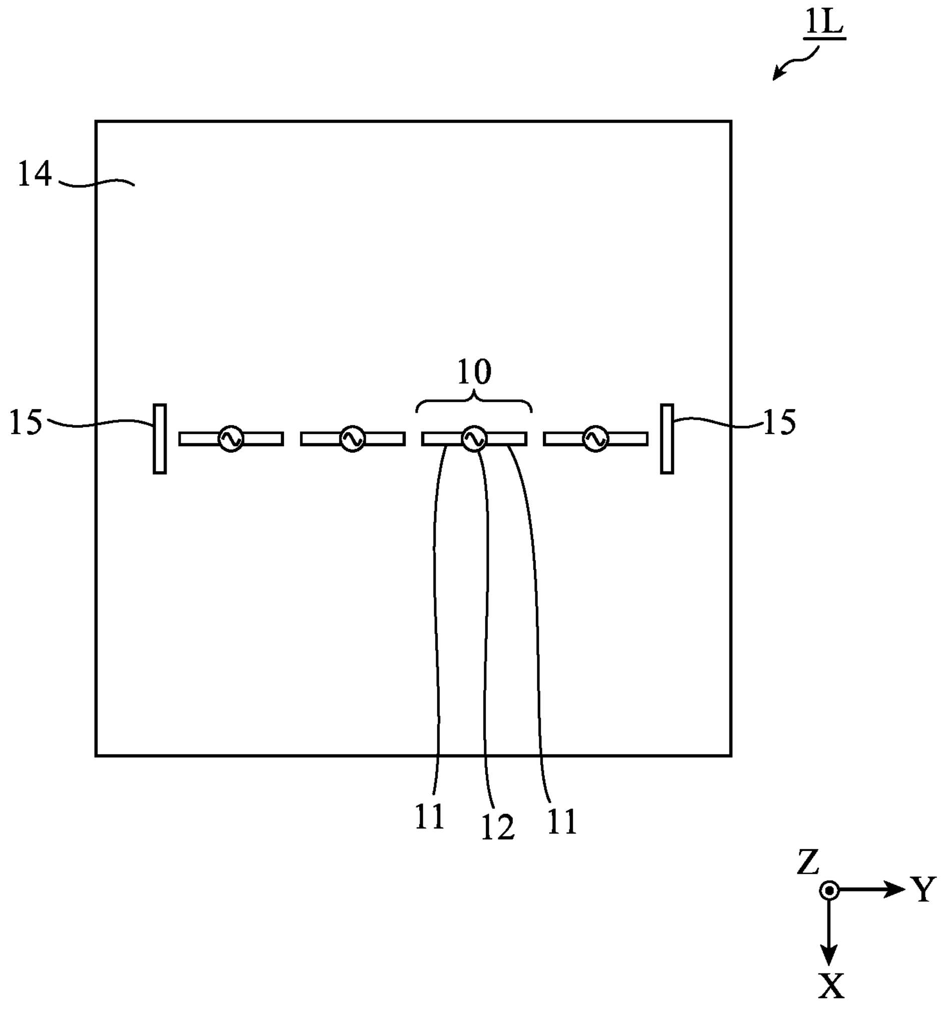
FIG. 36 is a top view illustrating an array antenna device in which element antennas are linearly arranged.

FIG. 36 is a top view illustrating an array antenna device 1L in which dipole antennas 10 as element antennas are linearly arranged. In FIG. 36, the dipole antenna 10 includes a pair of dipole elements 11 and a power feeding unit 12. In the array antenna device 1L, the plurality of dipole antennas 10 constitute an element antenna array linearly arranged along the electric field direction (Y direction) of the dipole antenna 10 on the ground plate 14.

In addition, the metal plate 15 is provided at both ends along the electric field direction of the antenna aperture formed in the element antenna array. A mirror image is electrically formed on both sides of a real image of the element antenna array by the metal plate 15. Since the aperture larger than the actual antenna aperture is virtually formed, impedance matching can be achieved on the low frequency side of the operating frequency band. As a result, the array antenna device 1L can improve the reflection characteristics on the low frequency side of the operating frequency band even if the antenna aperture is small.

Figure 37:
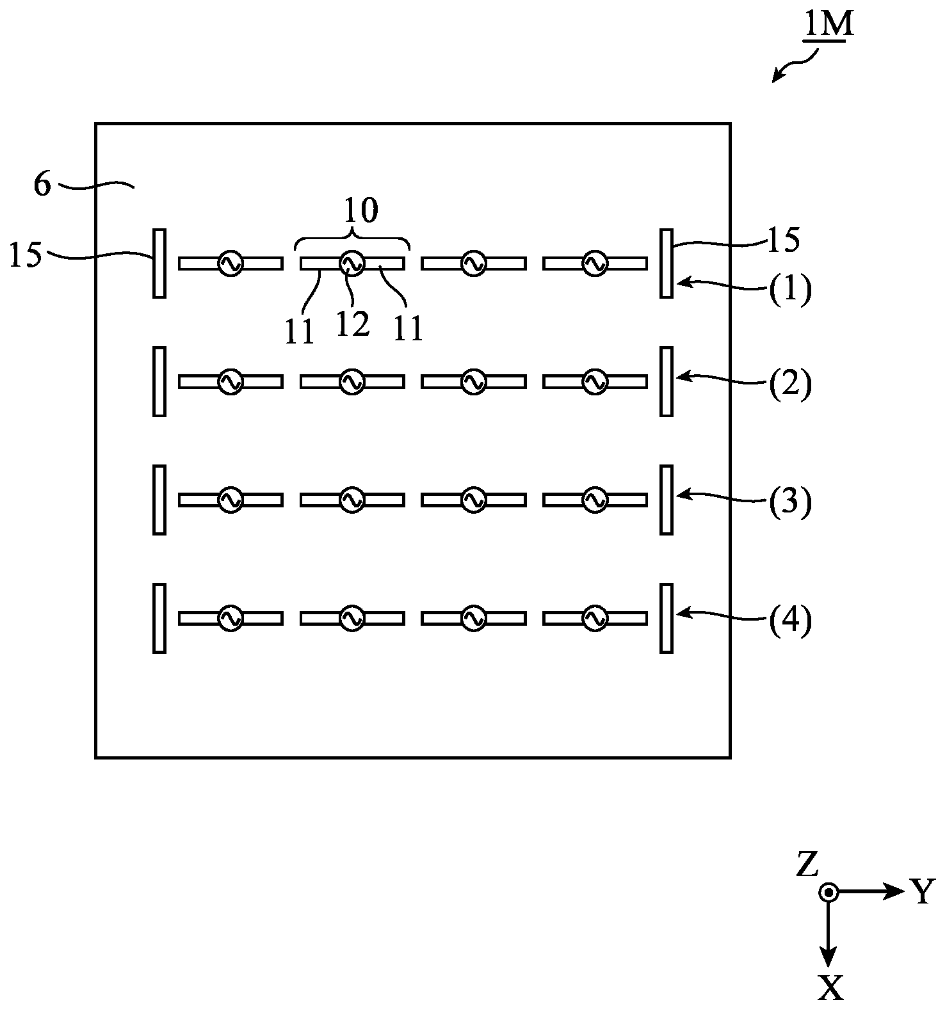
FIG. 37 is a top view illustrating an array antenna device in which element antennas are arranged in a quadrangular shape.

FIG. 37 is a top view illustrating an array antenna device 1M in which dipole antennas 10 as element antennas are arranged in a quadrangular shape. In FIG. 37, the dipole antenna 10 includes a pair of dipole elements 11 and a power feeding unit 12. The array antenna device 1M includes four element antenna arrays (1) to (4) in which four dipole antennas 10 are linearly arranged along an electric field direction (Y direction).

A metal plate 15 is provided at both ends along the electric field direction of the antenna aperture formed in the four element antenna arrays (1) to (4). The four element antenna arrays (1) to (4) have a quadrangular arrangement in which the dipole antenna 10 is located at a vertex of a quadrangle on the ground plate 14.

A mirror image is electrically formed on both sides of a real image of the element antenna array by the metal plate 15. Since the aperture larger than the actual antenna aperture is virtually formed, impedance matching can be achieved on the low frequency side of the operating frequency band. As a result, the array antenna device 1M can improve the reflection characteristics on the low frequency side of the operating frequency band even if the antenna aperture is small.

Figure 38:
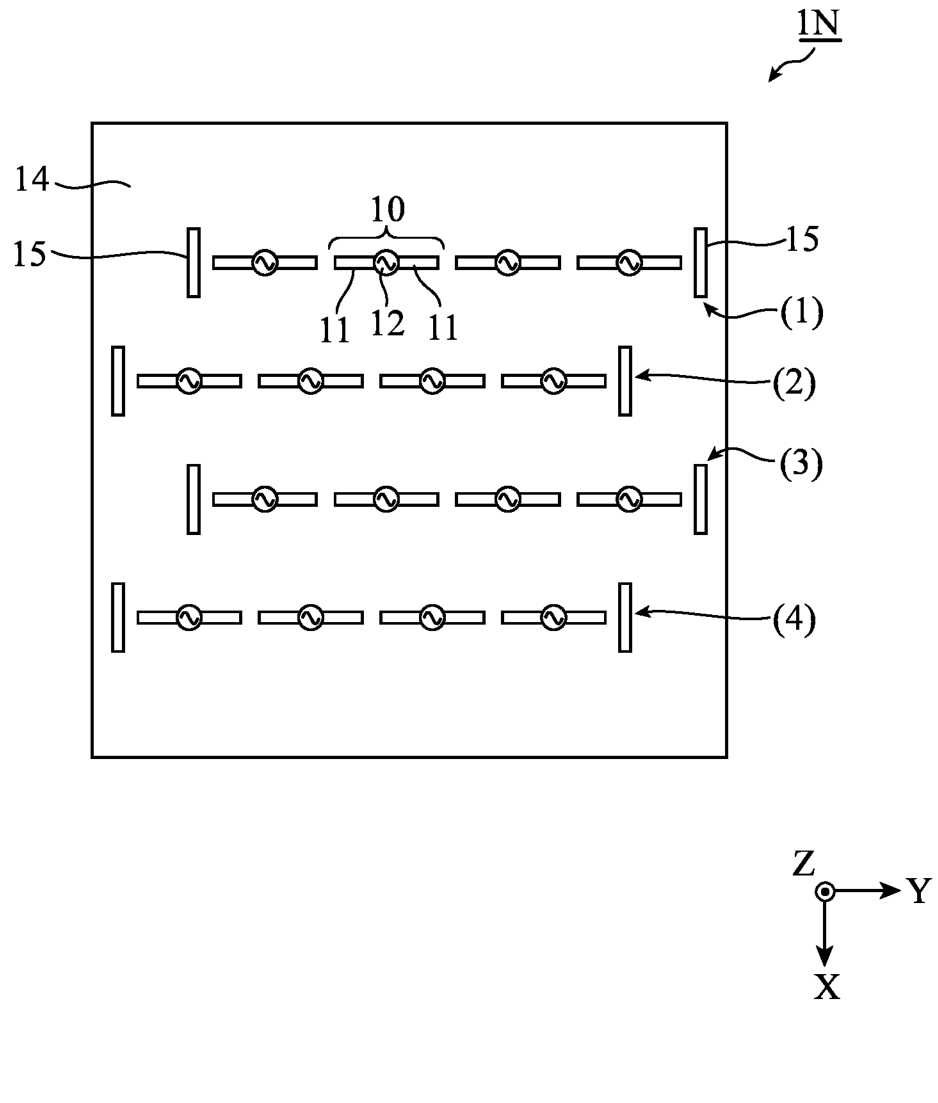
FIG. 38 is a top view illustrating an array antenna device in which element antennas are arranged in a triangular shape.

FIG. 38 is a top view illustrating an array antenna device 1N in which dipole antennas 10 as element antennas are arranged in a triangular shape. In FIG. 38, the dipole antenna 10 includes a pair of dipole elements 11 and a power feeding unit 12. The array antenna device 1N includes four element antenna arrays (1) to (4) in which four dipole antennas 10 are linearly arranged along an electric field direction (Y direction).

A metal plate 15 is provided at both ends along the electric field direction of the antenna aperture formed in the four element antenna arrays (1) to (4). The four element antenna arrays (1) to (4) have a triangular arrangement in which the dipole antenna 10 is located at a vertex of a triangle on the ground plate 14.

A mirror image is electrically formed on both sides of a real image of the element antenna array by the metal plate 15. Since the aperture larger than the actual antenna aperture is virtually formed, impedance matching can be achieved on the low frequency side of the operating frequency band. As a result, the array antenna device 1N can improve the reflection characteristics on the low frequency side of the operating frequency band even if the antenna aperture is small.

Figure 39:
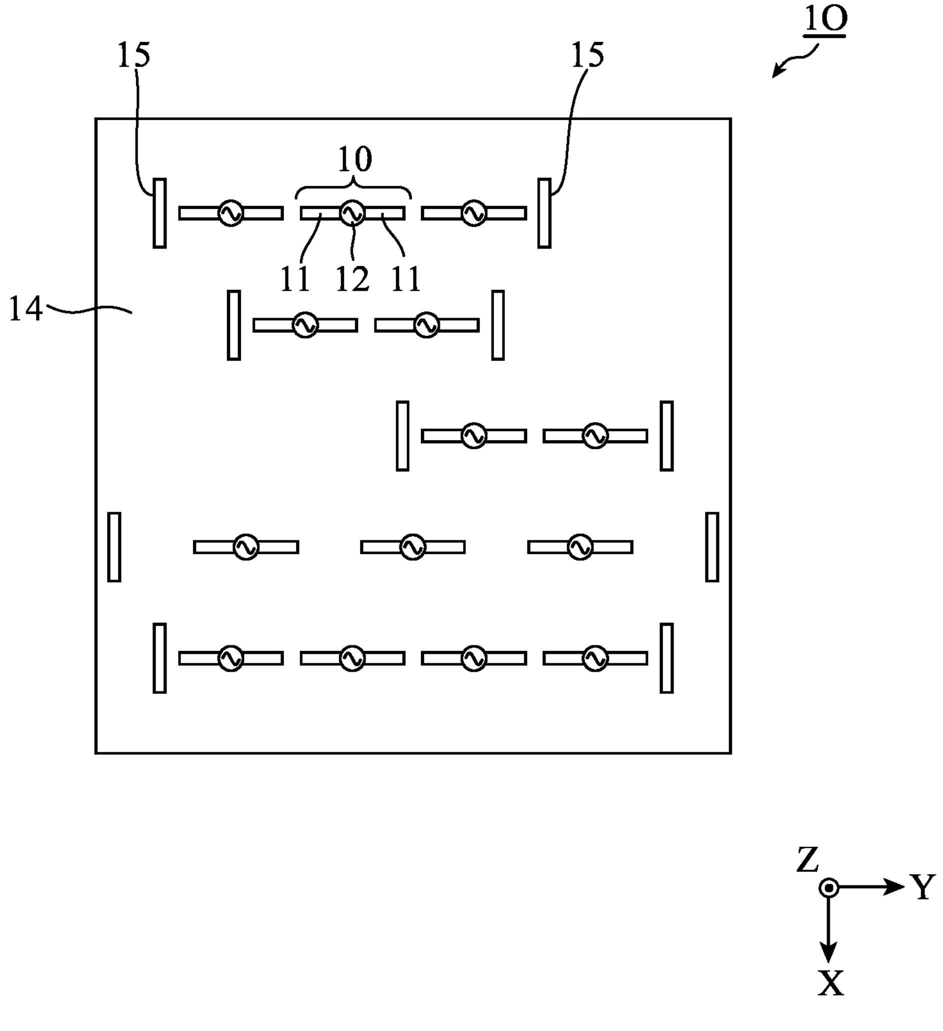
FIG. 39 is a top view illustrating an array antenna device in which element antennas are non-periodically arranged.

FIG. 39 is a top view illustrating an array antenna device 1O in which the dipole antennas 10 as element antennas are non-periodically arranged. In FIG. 39, the dipole antenna 10 includes a pair of dipole elements 11 and a power feeding unit 12. The array antenna device 1O includes two element antenna arrays in which two dipole antennas 10 are linearly arranged along the electric field direction, two element antenna arrays in which three dipole antennas 10 are linearly arranged along the electric field direction, and one element antenna array in which four dipole antennas 10 are linearly arranged along the electric field direction. A metal plate 15 is provided at both ends along the electric field direction of the antenna aperture formed in these element antenna arrays.

In the array antenna device 1O, the above-described five element antenna arrays are arranged non-periodically on the ground plate 14 as illustrated in FIG. 39. Also in the array antenna device 1O, a mirror image is electrically formed on both sides of a real image of the element antenna array by the metal plate 15. Since the aperture larger than the actual antenna aperture is virtually formed, impedance matching can be achieved on the low frequency side of the operating frequency band. As a result, the array antenna device 1O can improve the reflection characteristics on the low frequency side of the operating frequency band even if the antenna aperture is small.

Figure 40:
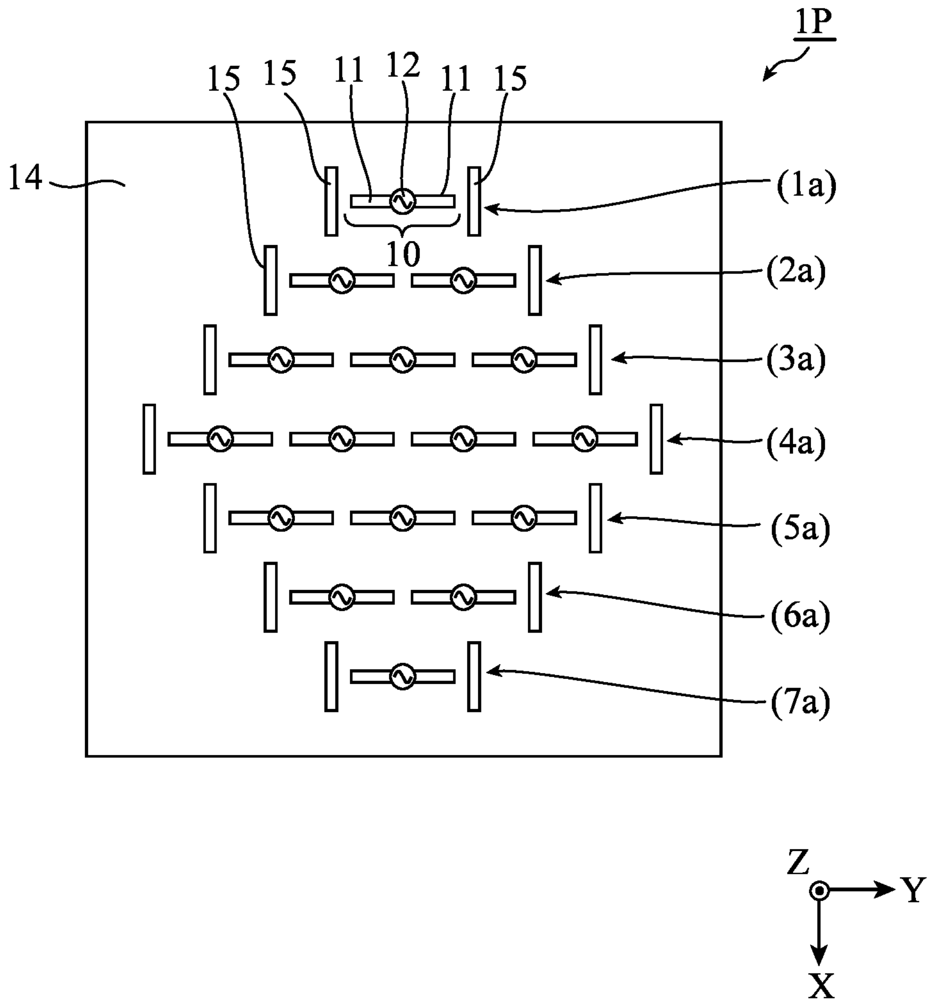
FIG. 40 is a top view illustrating an array antenna device having a plurality of element antenna arrays having different numbers of element antennas.

FIG. 40 is a top view illustrating an array antenna device 1P having a plurality of element antenna arrays having different numbers of dipole antennas 10 as element antennas. In FIG. 40, the dipole antenna 10 includes a pair of dipole elements 11 and a power feeding unit 12. The array antenna device 1P includes units (1*a*) to (7*a*) each including a dipole antenna 10 and a metal plate 15.

The units (1*a*) and (7*a*) are units (1*a*) each including one dipole antenna 10 and metal plates 15 provided at both ends along the electric field direction of the dipole antenna 10. The units (2*a*) and (6*a*) are units each including an element antenna array in which two dipole antennas 10 are linearly arranged along the electric field direction, and metal plates 15 provided at both ends of the element antenna array along the electric field direction. The units (3*a*) and (5*a*) are units each including an element antenna array in which three dipole antennas 10 are linearly arranged along the electric field direction, and metal plates 15 provided at both ends of the element antenna array along the electric field direction. The unit (4*a*) is a unit (4*a*) including an element antenna array in which four dipole antennas 10 are linearly arranged along the electric field direction and metal plates 15 provided at both ends of the element antenna array along the electric field direction.

In the array antenna device 1P, as illustrated in FIG. 40, the above-described seven units are arranged on the ground plate 14 at a cycle in which the number of dipole antennas 10 sequentially increases along the X direction, and the number of dipole antennas 10 decreases along the X direction with the unit (4*a*) as a boundary. Also in the array antenna device 1P, a mirror image is electrically formed on both sides of a real image of the element antenna array by the metal plate 15. Since the aperture larger than the actual antenna aperture is virtually formed, impedance matching can be achieved on the low frequency side of the operating frequency band. As a result, the array antenna device 1P can improve the reflection characteristics on the low frequency side of the operating frequency band even if the antenna aperture is small.

In the above description, the arrangement of the dipole antennas 10 illustrated in FIG. 7 has been described, but the present invention is not limited thereto. For example, the arrangement illustrated in FIGS. 36 to 40 may be adopted with respect to the arrangement of the element antennas illustrated in FIGS. 7 and 27 to 32.

The element antenna array included in each of the array antenna devices according to the first embodiment, the second embodiment, and the third embodiment may be fed with power as follows.

Figure 41:
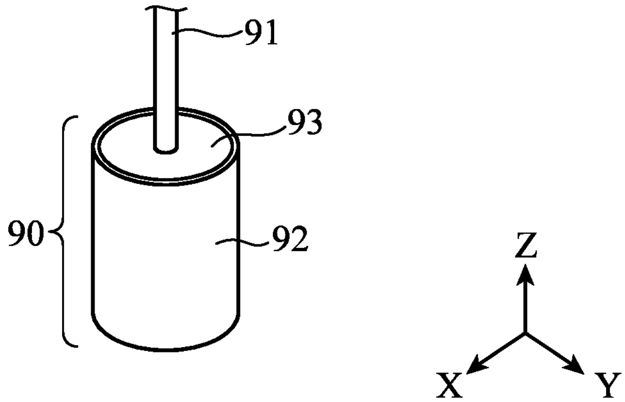
FIG. 41 is a perspective view schematically illustrating a coaxial line.
Figure 42:
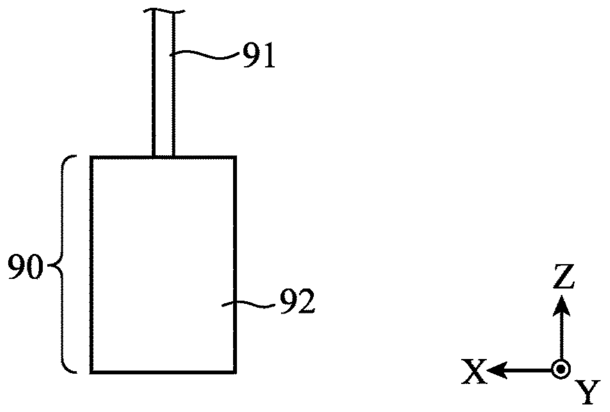
FIG. 42 is a side view illustrating the coaxial line of FIG. 41 as viewed from the +Y direction.
Figure 43:
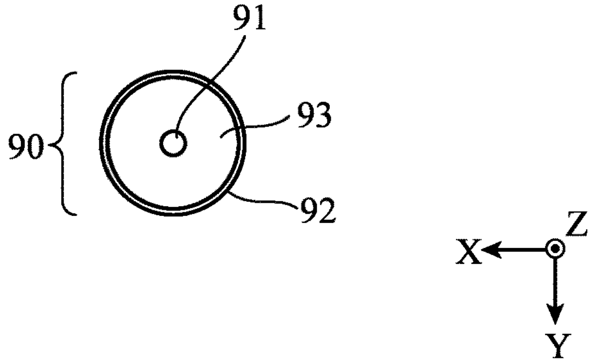
FIG. 43 is a top view illustrating the coaxial line of FIG. 41 as viewed from the +Z direction.

FIG. 41 is a perspective view schematically illustrating a coaxial line 90. In addition, FIG. 42 is a side view illustrating the coaxial line 90 of FIG. 41 when viewed from the +Y direction. FIG. 43 is a top view illustrating the coaxial line 90 of FIG. 41 when viewed from the +Z direction. As illustrated in FIGS. 41, 42, and 43, the coaxial line 90 includes an inner conductor 91, an outer conductor 92, and a dielectric 93. The inner conductor 91 is a core wire constituting the coaxial line 90, and the outer conductor 92 is a conductor provided on the outer periphery of the inner conductor 91 with the dielectric 93 interposed therebetween. The dielectric 93 may be air or a dielectric resin.

The element antenna array included in the array antenna device 1 according to the first embodiment may be fed with power by the coaxial line 90. For example, the inner conductor 91 of the coaxial line 90 is physically connected to a member constituting the element antenna array to feed power. In addition, in the dipole element pair 61 included in the array antenna device 1B according to the third embodiment, power is fed from the microstrip line 62 to the parallel two-wire line 64 by electromagnetic coupling without physical connection. Also with such a configuration, it is possible to feed power to the element antenna array included in the array antenna device.

Figure 44:
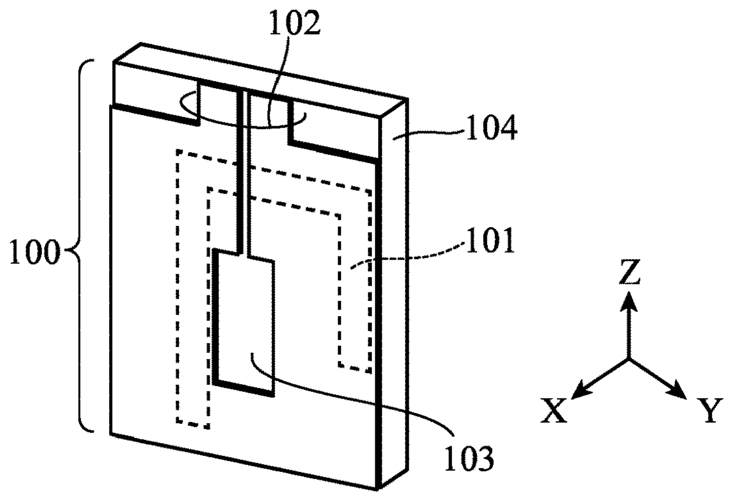
FIG. 44 is a perspective view illustrating a Marchand balun.
Figure 45:
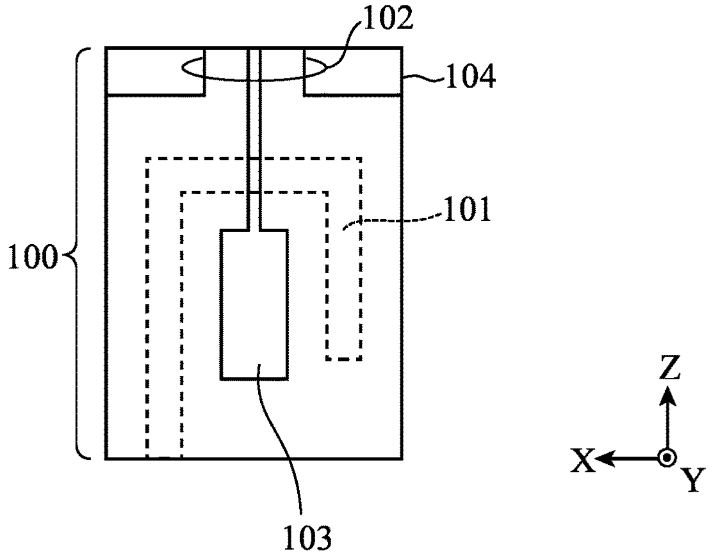
FIG. 45 is a side view illustrating the Marchand balun of FIG. 44 as viewed from the +Y direction.
Figure 46:
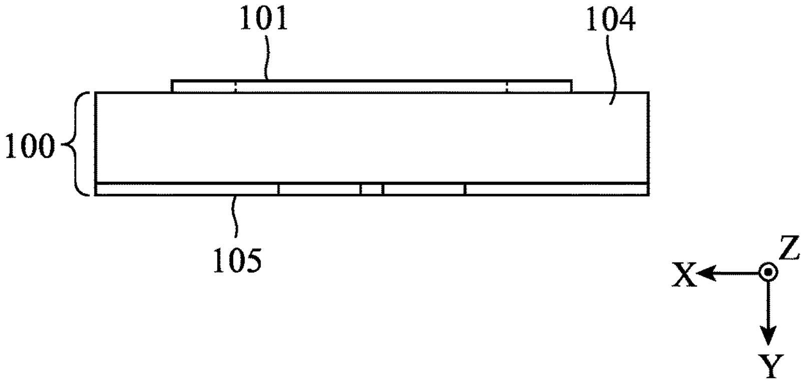
FIG. 46 is a top view illustrating the Marchand balun of FIG. 44 as viewed from the +Z direction.

FIG. 44 is a perspective view illustrating a Marchand balun 100. In addition, FIG. 45 is a side view illustrating the Marchand balun 100 of FIG. 44 when viewed from the +Y direction. FIG. 46 is a top view illustrating the Marchand balun 100 of FIG. 44 when viewed from the +Z direction. The Marchand balun 100 illustrated in FIGS. 44, 45, and 46 is formed on the dielectric substrate 104, and is a power feeding unit illustrated in FIGS. 12, 13 and 14. The microstrip line 62 illustrated in FIG. 14 is a microstrip line 101 of the Marchand balun 100. The parallel two-wire line 64 illustrated in FIG. 13 is a parallel two-wire line 102 of the Marchand balun 100. Further, the matching stub 63 illustrated in FIG. 13 is a matching stub 103 in the Marchand balun 100. The microstrip line 101, the parallel two-wire line 102, and the matching stub 103 function as a power feeding unit of the dipole element pair 61.

Figure 47:
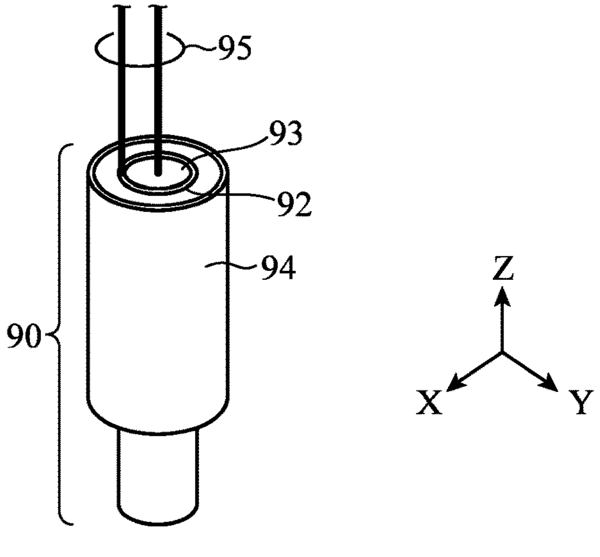
FIG. 47 is a perspective view illustrating a Spertopf balun.
Figure 48:
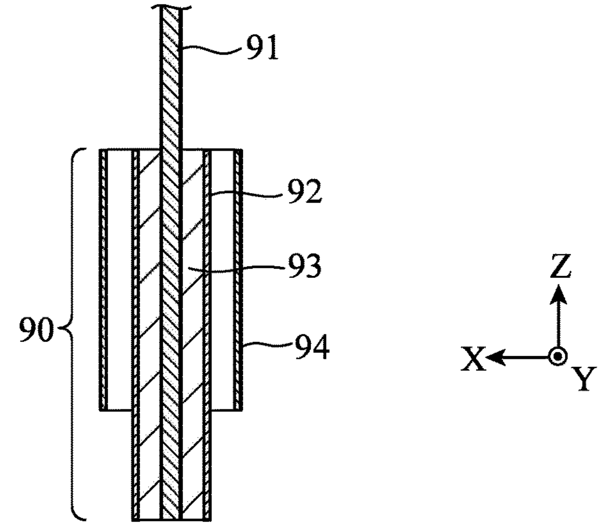
FIG. 48 is a cross-sectional view schematically illustrating a cross section of the Spertopf balun in FIG. 47 as viewed from the +Y direction.
Figure 49:
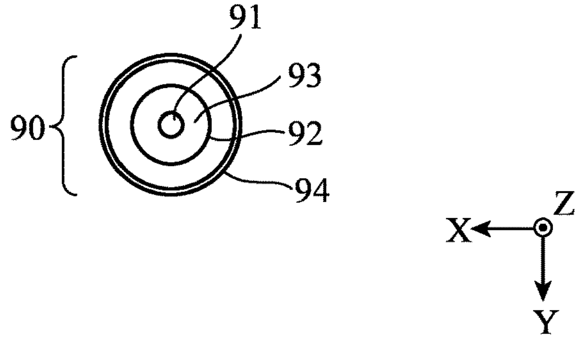
FIG. 49 is a top view illustrating the Spertopf balun in FIG. 47 as viewed from the +Z direction.

FIG. 47 is a perspective view illustrating a Spertopf balun. FIG. 48 is a cross-sectional view schematically illustrating a cross section of the Spertopf balun in FIG. 47 when viewed from the +Y direction. FIG. 49 is a top view illustrating the Spertopf balun in FIG. 47 when viewed from the +Z direction. The Spertopf balun illustrated in FIGS. 47, 48, and 49 is a coaxial line 90. The coaxial line 90 constituting the Spertopf balun includes an inner conductor 91, an outer conductor 92, a dielectric 93, and an outer conductor 94. The inner conductor 91 is a core wire constituting the coaxial line 90, and the outer conductor 92 is a conductor provided on the outer periphery of the inner conductor 91 with the dielectric 93 interposed therebetween. The dielectric 93 may be air or a dielectric resin. In addition, the outer conductor 94 is a conductor provided on the outer periphery of the outer conductor 92, and the outer conductor 92 and the outer conductor 94 are electrically connected.

The inner conductor 91 and the outer conductor 92 function as a parallel two-wire line 95. For example, by connecting the parallel two-wire line 95 to the dipole element pair 61 included in the array antenna device 1B according to the third embodiment, the Spertopf balun feeds power. Also with such a configuration, it is possible to feed power to the element antenna array included in the array antenna device 1B.

Figure 50:
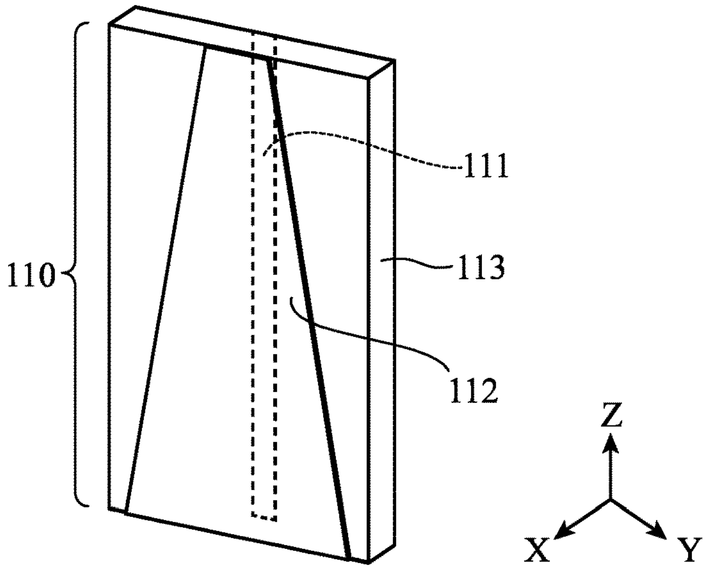
FIG. 50 is a perspective view illustrating a tapered balun.
Figure 51:
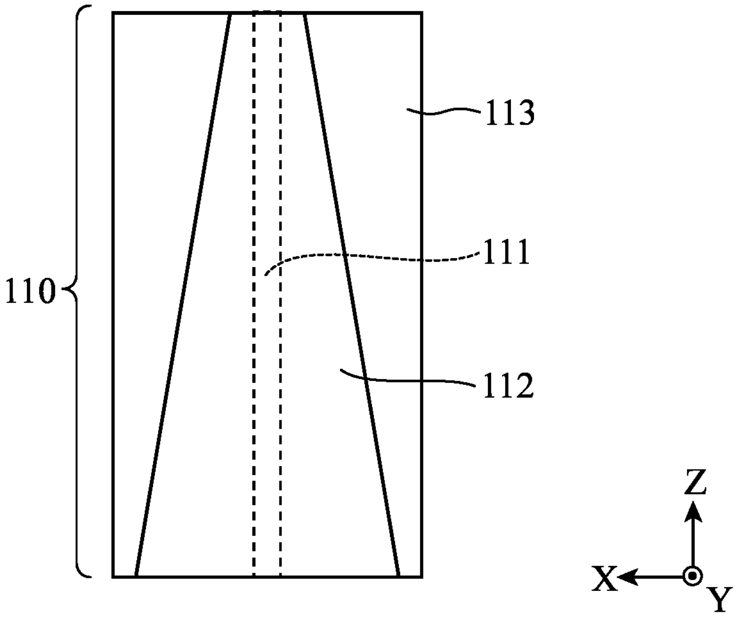
FIG. 51 is a side view illustrating the tapered balun in FIG. 50 as viewed from the +Y direction.
Figure 52:
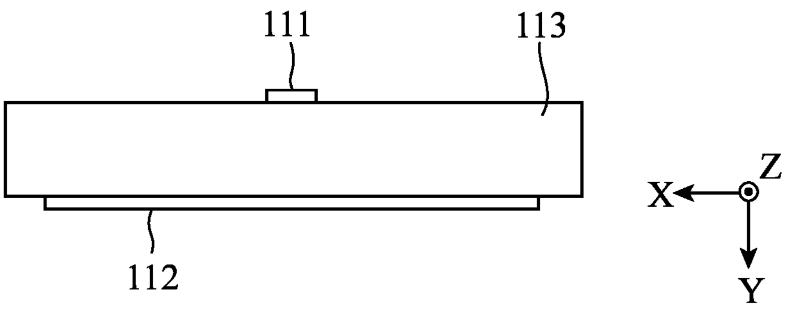
FIG. 52 is a top view illustrating the tapered balun in FIG. 50 as viewed from the +Z direction.

FIG. 50 is a perspective view illustrating a tapered balun 110. In addition, FIG. 51 is a side view illustrating the tapered balun 110 in FIG. 50 when viewed from the +Y direction. FIG. 52 is a top view illustrating the tapered balun 110 in FIG. 50 when viewed from the +Z direction. The tapered balun 110 illustrated in FIGS. 50, 51, and 52 includes a microstrip line 111, a tapered conductor 112, and a dielectric substrate 113. For example, by connecting the tapered balun 110 to the dipole element pair 61 included in the array antenna device 1B according to the third embodiment, the tapered balun 110 feeds power. Also with such a configuration, it is possible to feed power to the element antenna array included in the array antenna device 1B.

Figure 53:
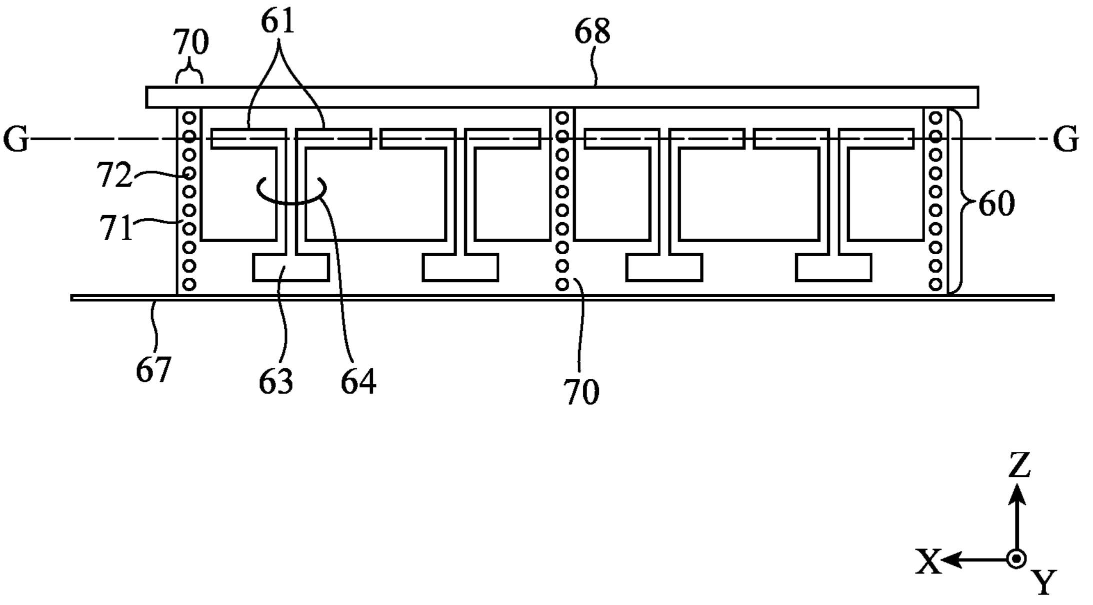
FIG. 53 is a side view illustrating a sixth modification of the array antenna device according to the first, second, and third embodiments when viewed from the +Y direction.
Figure 54:
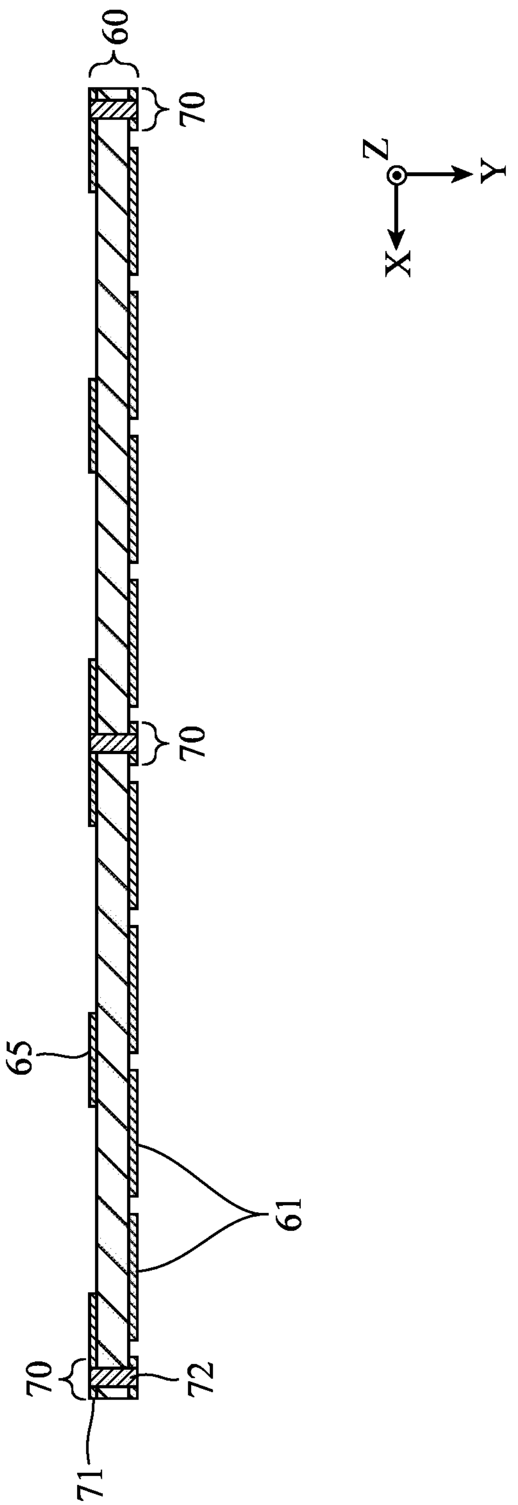
FIG. 54 is a cross-sectional view illustrating a cross section taken along line G-G of the sixth modification of the array antenna device when viewed from the +Z direction.

FIG. 53 is a side view illustrating a sixth modification of the array antenna devices 1, 1A to 1P according to the first, second, and third embodiments when viewed from the +Y direction. FIG. 54 is a cross-sectional view illustrating a cross section taken along line G-G of the sixth modification of the array antenna device 1, 1A to 1P when viewed from the +Z direction. As illustrated in FIGS. 53 and 54, in the array antenna device 1, 1A to 1P, the antenna substrate 60 is provided with a conductor wall 70 for each element antenna array including two dipole element pairs 61. The element antenna array may be an element antenna array including two or more dipole element pairs 61. In addition, a metal plate may be provided instead of the conductor wall 70. As a result, in the sixth modification of the array antenna device 1, 1A to 1P, a mirror image effect can be obtained in units of element antenna arrays.

Figure 55:
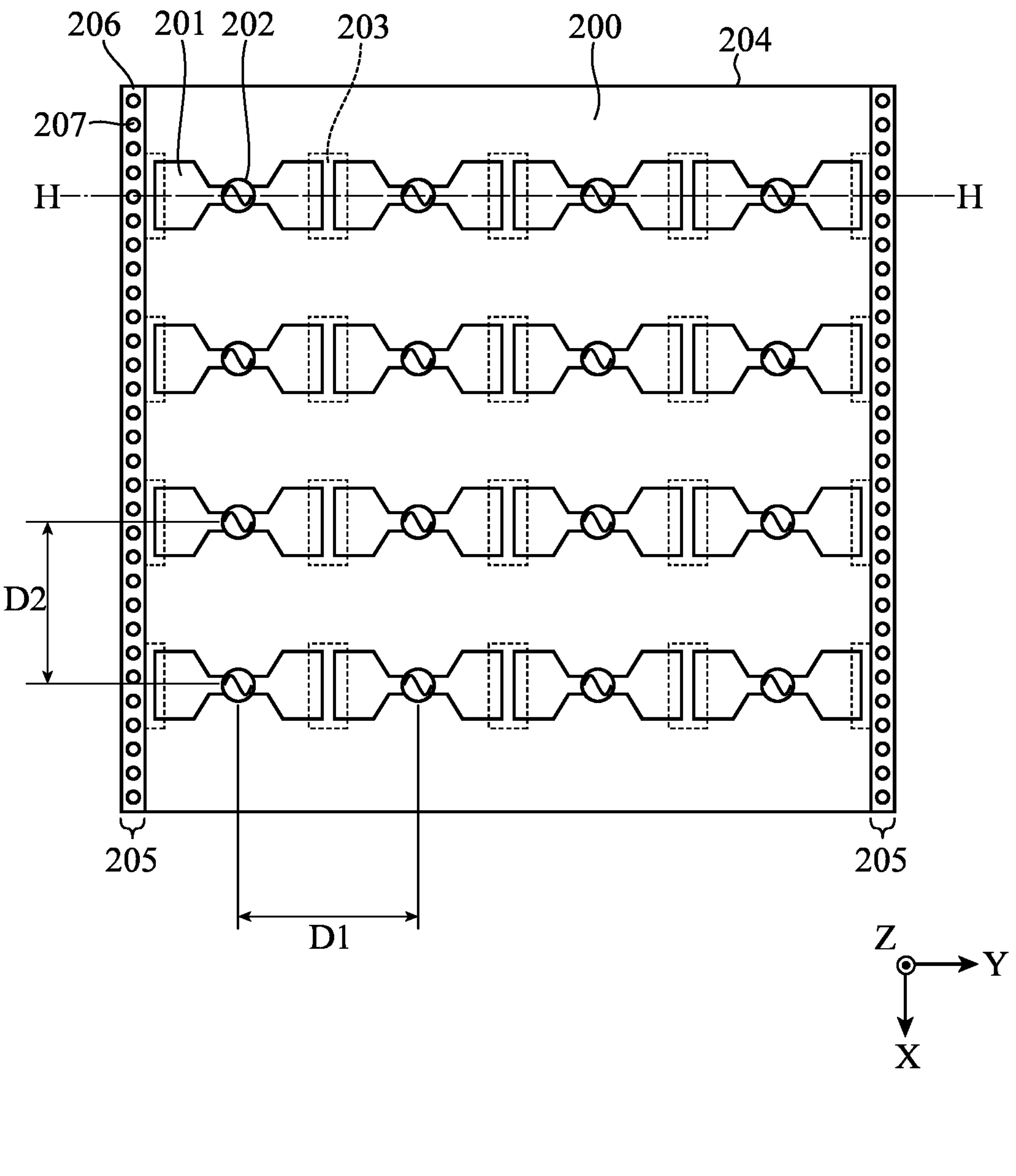
FIG. 55 is a top view illustrating a seventh modification of the array antenna device according to the first, second, and third embodiments when viewed from the +Z direction.
Figure 56:
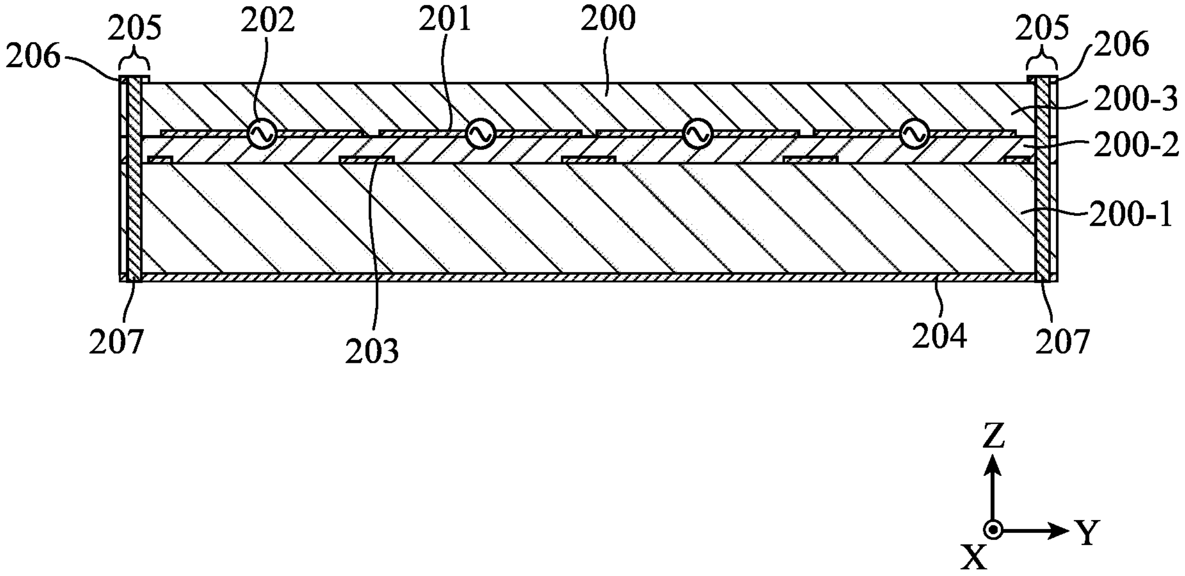
FIG. 56 is a cross-sectional view illustrating a cross section taken along line H-H of the seventh modification of the array antenna device when viewed from the +X direction.

FIG. 55 is a top view illustrating a seventh modification of the array antenna device 1, 1A to 1P according to the first, second, and third embodiments when viewed from the +Z direction. FIG. 56 is a cross-sectional view illustrating a cross section taken along line H-H of the seventh modification of the array antenna device 1, 1A to 1P when viewed from the +X direction. As illustrated in FIGS. 55 and 56, the seventh modification of the array antenna device 1, 1A to 1P is configured on a substrate on which a plurality of dielectrics are stacked. The substrate on which the plurality of dielectrics are stacked is an antenna substrate 200. The antenna substrate 200 is, for example, a substrate having dielectric layers 200-1 to 200-3 stacked in the Z direction. In the antenna substrate 200, a ground plate 204 is provided on one surface of the dielectric layer 200-1, the dielectric layer 200-2 is stacked on the other surface of the dielectric layer 200-1, and the dielectric layer 200-3 is stacked on the surface of the dielectric layer 200-2. A plurality of dipole element pairs 201 are formed on a surface on the dielectric layer 200-3 side in the dielectric layer 200-2 of the antenna substrate 200, and power is fed to the dipole element pair

201 by the power feeding unit 202. A coupling element 203 is formed on a surface on the dielectric layer 200-1 side in the dielectric layer 200-2.

The coupling element 203 is a conductor for adjusting mutual coupling of each dipole element pair 201 to achieve matching. On the surface on the dielectric layer 200-1 side in the dielectric layer 200-2, the coupling element 203 is provided at a position corresponding to between one dipole element and the other dipole element of the dipole element pair 201 adjacent to each other on the surface on the dielectric layer 200-3 side in the dielectric layer 200-2. That is, as illustrated in FIG. 55, the coupling element 203 projected on the surface on the dielectric layer 200-3 side in the dielectric layer 200-2 is arranged between the dipole elements adjacent to each other in the adjacent dipole element pairs 201. In addition, in the dipole elements arranged on both end portions of the antenna substrate 200, the coupling element 203 projected on the surface on the dielectric layer 200-3 side in the dielectric layer 200-2 is arranged between the dipole element and the conductor wall 205. As illustrated in FIG. 55, a width D1 between the dipole element pairs 201 is an interval in the electric field direction (Y direction) of the dipole antennas. An interval D2 between adjacent element antenna arrays is an interval in the magnetic field direction (X direction) of the antenna aperture formed in the element antenna array.

The conductor walls 205 are provided at both ends of the antenna substrate 200. The conductor wall 205 includes a copper foil 206 provided on the front side surface of the dielectric layer 200-3 and a through hole 207 that electrically connects and short-circuits the ground plate 204 and the copper foil 206. As described above, the conductor wall 205 is configured by connecting the ground plate 204 provided on the back side surface of the dielectric layer 200-1 and the copper foil 206 formed on the front side surface of the dielectric layer 200-3 by the through hole 207. Further, the dipole element pair 201 are formed in the dielectric layer 200-2. That is, the conductor wall 205 is at a position higher than the dipole element pair 201 in the Z direction. As a result, also in the seventh modification of the array antenna device 1, 1A to 1P, the mirror image effect can be obtained, and the reflection characteristic on the low frequency side of the operating frequency band can be improved even if the antenna aperture is small.

Figure 57:
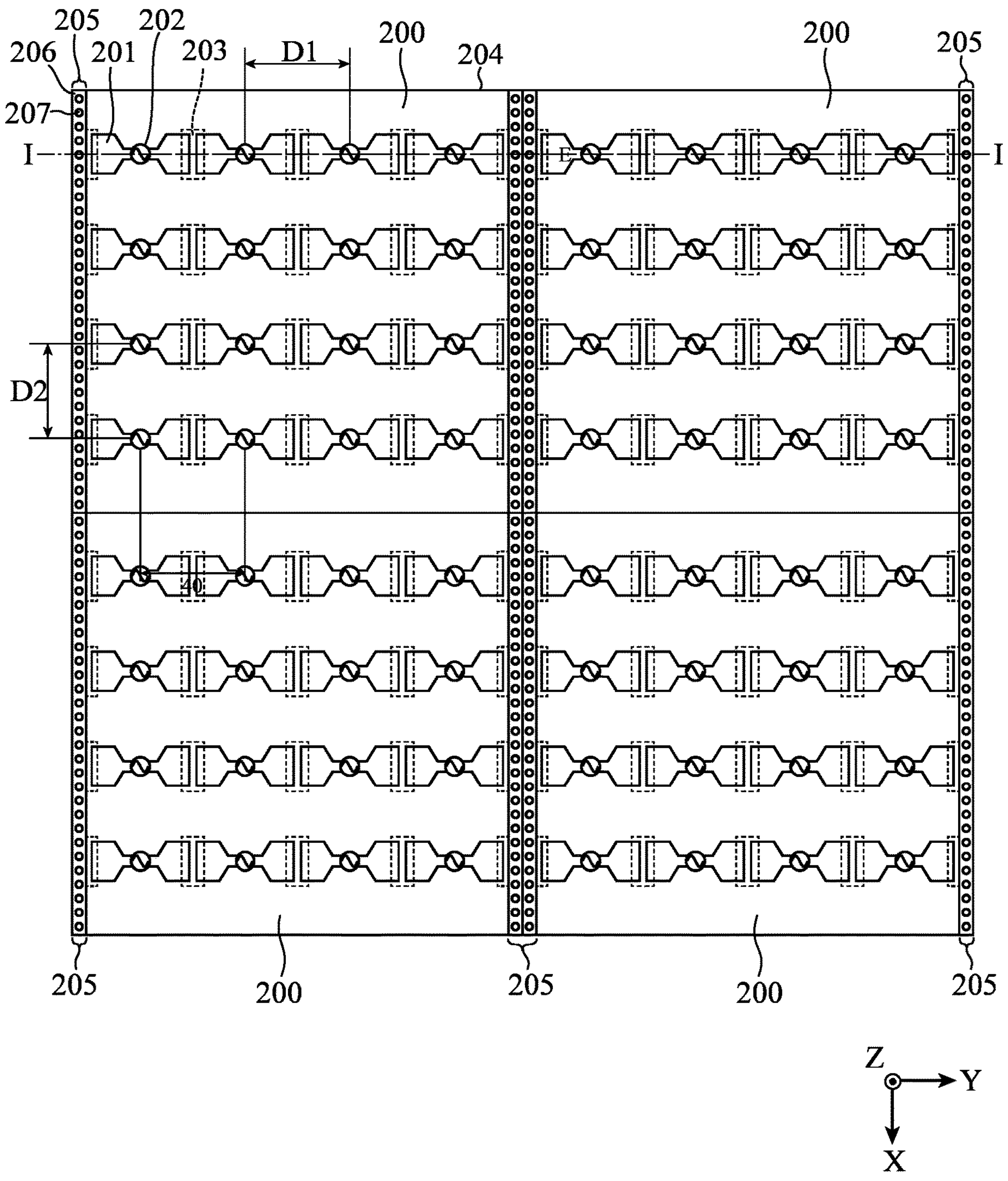
FIG. 57 is a top view illustrating an eighth modification of the array antenna device according to the first, second, and third embodiments when viewed from the +Z direction.
Figure 58:
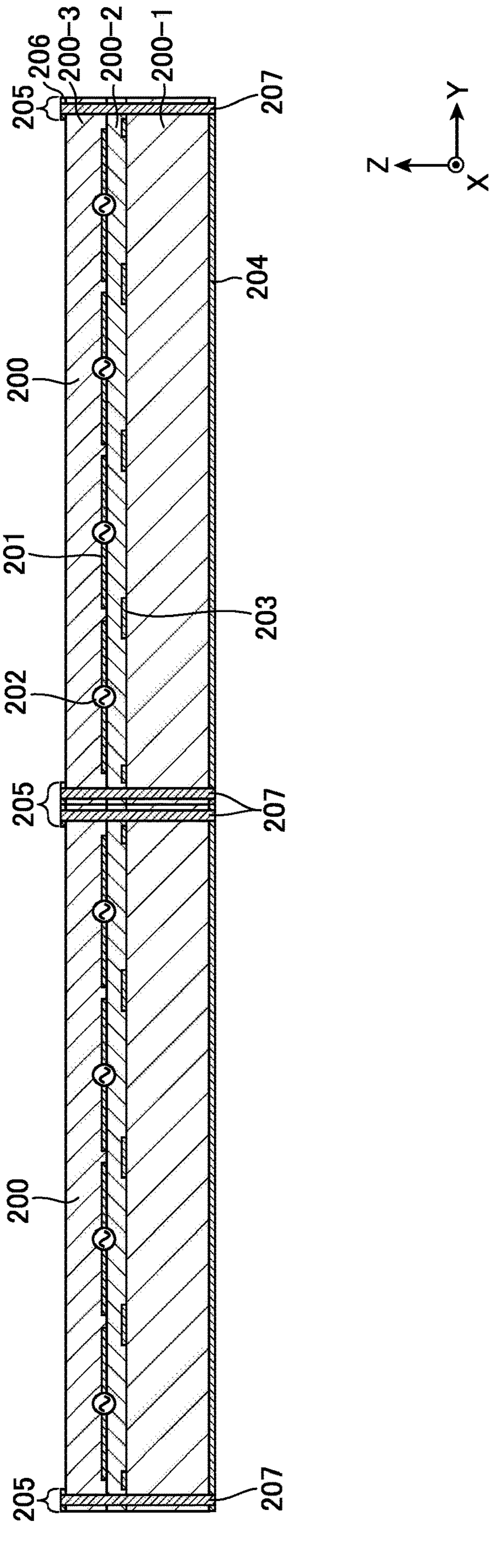
FIG. 58 is a cross-sectional view illustrating a cross section taken along line I-I of the eighth modification of the array antenna device when viewed from the +X direction.

FIG. 57 is a top view illustrating an eighth modification of the array antenna device 1, 1A to 1P according to the first, second, and third embodiments when viewed from the +Z direction. FIG. 58 is a cross-sectional view illustrating a cross section taken along line I-I of the eighth modification of the array antenna device 1, 1A to 1P when viewed from the +X direction. As illustrated in FIGS. 57 and 58, the eighth modification of the array antenna device 1, 1A to 1P is configured using four antenna substrates 200 illustrated in FIGS. 55 and 56, and has a structure in which the four antenna substrates 200 are arranged on a common plane. Note that the number of antenna substrates may be two or more.

Furthermore, in the eighth modification of the array antenna device 1, 1A to 1P, the conductor wall 205 is provided for each substrate on which the element antenna array is provided, that is, for each antenna substrate 200. As a result, in the eighth modification of the array antenna device 1, 1A to 1P, the mirror image effect can be obtained for each antenna substrate 200, and the reflection characteristics on the low frequency side of the operating frequency band can be improved even if the antenna aperture is small.

Note that combinations of each embodiments, modifications of any components of each of the embodiments, or omissions of any components in each of the embodiments are possible.

INDUSTRIAL APPLICABILITY

The array antenna device according to the present disclosure can be used for, for example, a radar or a mobile communication device.

REFERENCE SIGNS LIST

1, 1A to 1P: array antenna device, 2: tapered slot antenna, 3: tapered conductor plate, 4, 12, 23, 29, 34, 39, 44, 69, 202: power feeding unit, 5, 63, 103: matching stub, 6, 14, 25, 30, 35, 40, 46, 53, 67, 204: ground plate, 7, 15, 26, 31, 36, 41, 47: metal plate, 7A: quadrangular prism conductor member, 7B: cylindrical conductor member, 7C: plated conductor member, 8, 19: real image, 9, 20: mirror image, 10: dipole antenna, 11: dipole element, 13, 65, 203: coupling element, 16 to 18, 24, 45, 56 to 58, 68, 104, 113: dielectric substrate, 21: patch antenna, 22: patch element, 27: slot antenna, 28: slot, 32: Yagi-Uda antenna, 33: radiation element, 37: horn antenna, 38: horn element, 42: bowtie antenna, 43: conductor element, 48: orthogonal dual-polarized antenna, 49: first polarization element, 50: second polarization element, 51: first power feeding unit, 52: second power feeding unit, 54: first metal plate, 55: second metal plate, 60, 60-1 to 60-N, 200: antenna substrate, 61, 201: dipole element pair, 62, 101, 111: microstrip line, 64, 95, 102: parallel two-wire line, 70, 205: conductor wall, 71, 206: copper foil, 72, 207: through hole, 73: metal fitting, 74: screw, 75: nut, 90: coaxial line, 91: inner conductor, 92, 94: outer conductor, 93: dielectric, 100: Marchand balun, 110: tapered balun, 112: tapered conductor, 200-1 to 200-3: dielectric layer.

The invention claimed is:

1. An array antenna device comprising:

a ground plate that is a flat-plate shaped conductor;

an element antenna array in which a plurality of element antennas are linearly arranged on the ground plate along an electric field direction; and a conductor member provided only at both ends or one end of a linear arrangement along the electric field direction of the plurality of element antennas in the element antenna array arranged on the ground plate along the electric field direction, the conductor member having a height from the ground plate higher than a height of the element antenna and being short-circuited to the ground plate.

2. The array antenna device according to claim 1, wherein a plurality of the element antenna arrays are arranged in a quadrangular shape.

3. The array antenna device according to claim 1, wherein a plurality of the element antenna arrays are arranged in a triangular shape.

4. The array antenna device according to claim 1, wherein a plurality of the element antenna arrays are non-periodically arranged.

5. The array antenna device according to claim 1, wherein the conductor member is a flat-plate shaped conductor provided on the ground plate in such a way that the conductor member is orthogonal to an electric field direction of the element antenna array.

6. The array antenna device according to claim 1, wherein the conductor member is a polygonal columnar conductor provided on the ground plate in such a way that the conductor member is orthogonal to an electric field direction of the element antenna array.

7. The array antenna device according to claim 1, wherein the conductor member is a columnar conductor provided on the ground plate in such a way that the conductor member is orthogonal to an electric field direction of the element antenna array.

8. The array antenna device according to claim 1, wherein the conductor member is provided at a position separated from a center position of the element antenna at an end along an electric field direction of the element antenna array by a distance of half a width of the element antenna.

9. The array antenna device according to claim 1, wherein the conductor member has a height that is an odd multiple of ¼ of free space wavelength at a lower limit frequency of an operating frequency band.

10. The array antenna device according to claim 1, wherein the conductor member has a height that is an odd multiple of ¼ of an effective wavelength of a dielectric in which the element antenna is formed, at a lower limit frequency of an operating frequency band.

11. The array antenna device according to claim 1, wherein the element antenna is a tapered slot antenna.

12. The array antenna device according to claim 1, wherein the element antenna is a patch antenna.

13. The array antenna device according to claim 1, wherein the element antenna is a dipole antenna.

14. The array antenna device according to claim 1, wherein the element antenna is a slot antenna.

15. The array antenna device according to claim 1, wherein the element antenna is a Yagi-Uda antenna.

16. The array antenna device according to claim 1, wherein the element antenna is a horn antenna.

17. The array antenna device according to claim 1, wherein the element antenna is fed with power by a coaxial line.

18. The array antenna device according to claim 1, wherein the element antenna is fed with power by electromagnetic coupling without physical connection.

19. The array antenna device according to claim 1, wherein the element antenna is fed with power using a Spertopf balun.

20. The array antenna device according to claim 1, wherein the element antenna is fed with power using a Marchand balun.

21. The array antenna device according to claim 1, wherein the element antenna is fed with power using a tapered balun.

22. The array antenna device according to claim 1, wherein the element antenna is an antenna that radiates a plurality of polarized waves, and the conductor member is provided at both ends or one end of the antenna aperture formed in the element antenna array along an electric field direction of each of the polarized waves.

23. The array antenna device according to claim 1, wherein the conductor member is a member in which a metal foil is provided on a surface of a dielectric substrate.

24. The array antenna device according to claim 1, wherein the element antenna is an antenna including a conductor or an antenna including a metal thin film provided on a dielectric substrate.

25. The array antenna device according to claim 1, wherein the element antenna is provided on a surface of a substrate disposed on the ground plate, and the conductor member is formed on the substrate on which the element antenna is provided.

26. The array antenna device according to claim 25, wherein the conductor member includes: metal thin films formed on a front side surface and a back side surface of both ends or one end of the substrate on which the element antenna is provided; and a through hole that electrically connects and short-circuits the metal thin film formed on the front side surface and the metal thin film formed on the back side surface.

27. The array antenna device according to claim 25, wherein the substrate on which the element antenna is provided is the substrate on which a plurality of dielectrics are stacked, and the conductor member is formed in at least one of the plurality of stacked dielectric layers.

28. The array antenna device according to claim 27, wherein the conductor member is formed in at least two or more layers among the plurality of stacked dielectric layers, and at least one through hole that electrically connects and short-circuits the conductor members formed in the two or more layers is provided.

29. The array antenna device according to claim 25, further comprising an L-shaped fixing member that fixes the substrate on which the element antenna is provided on the ground plate and short-circuits the conductor members.

30. The array antenna device according to claim 25, wherein the substrate on which the element antenna is provided is the substrate on which the element antenna array including two or more of the element antennas is provided, the substrate on which the element antenna array is provided is provided in plurality on the ground plate, and the conductor member is provided for each of the substrates.

31. The array antenna device according to claim 25, wherein the conductor member is provided for each of the element antenna arrays.

* * * * *